US010040710B2

(12) United States Patent
Nichols et al.

(10) Patent No.: US 10,040,710 B2
(45) Date of Patent: Aug. 7, 2018

(54) USE OF A DUAL POLYMER SYSTEM FOR ENHANCED WATER RECOVERY AND IMPROVED SEPARATION OF SUSPENDED SOLIDS AND OTHER SUBSTANCES FROM AN AQUEOUS MEDIA

(71) Applicant: Dober Chemical Corporation, Woodridge, IL (US)

(72) Inventors: Everett J. Nichols, Edmonds, WA (US); James R. Scott, Bellevue, WA (US); Jeffrey F. Williams, Langley, WA (US); Yongjun Chen, Bothell, WA (US)

(73) Assignee: Dober Chemical Corporation, Woodridge, IL (US)

( * ) Notice: Subject to any disclaimer, the term of this patent is extended or adjusted under 35 U.S.C. 154(b) by 0 days.

(21) Appl. No.: 14/713,298

(22) Filed: May 15, 2015

(65) Prior Publication Data

US 2016/0046512 A1 Feb. 18, 2016

Related U.S. Application Data

(63) Continuation of application No. 12/830,949, filed on Jul. 6, 2010, now abandoned.
(Continued)

(51) Int. Cl.
*C02F 1/56* (2006.01)
*C02F 1/28* (2006.01)
(Continued)

(52) U.S. Cl.
CPC ............... *C02F 1/56* (2013.01); *B01J 20/26* (2013.01); *B01J 20/28023* (2013.01);
(Continued)

(58) Field of Classification Search
CPC ........................................................ C02F 1/56
See application file for complete search history.

(56) References Cited

U.S. PATENT DOCUMENTS 3,377,274 A 4/1968 Burke
3,617,568 A 11/1971 Ries, Jr.
(Continued)

FOREIGN PATENT DOCUMENTS

EP 1063201 A1 12/2000
EP 1 900 409 A1 3/2008
(Continued)

OTHER PUBLICATIONS

First Official Action dated Feb. 25, 2016, in related Australian Application No. 2010270652, filed Jul. 6, 2010, 3 pages.
(Continued)

*Primary Examiner* — Peter Keyworth
(74) *Attorney, Agent, or Firm* — Stout, Uxa & Buyan, LLP; Carlos A. Fisher

(57) ABSTRACT

A method uses anionic and cationic polymers added in, any order or simultaneously, to aqueous media for the removal of substances. The sequential addition of the two biopolymers, anionic xanthan, followed by cationic chitosan, causes the rapid formation of very large and cohesive fibrillar aggregates that may exhibit high solids to liquid ratios and that quickly settle out from the aqueous media. The aqueous media can be easily separated from the large fibrillar aggregates by settling under gravity or by filtration through a porous containment device, such as a synthetic or non-synthetic woven or non-woven fabric including a geotextile fabric or a solid containment device containing a solid mesh screen.

15 Claims, 27 Drawing Sheets
(16 of 27 Drawing Sheet(s) Filed in Color)

Related U.S. Application Data

(60) Provisional application No. 61/353,942, filed on Jun. 11, 2010, provisional application No. 61/303,485, filed on Feb. 11, 2010, provisional application No. 61/223,264, filed on Jul. 6, 2009.

(51) Int. Cl.

| B01J 20/28 | (2006.01) |
|---|---|
| B01J 20/26 | (2006.01) |
| C02F 1/54 | (2006.01) |
| C02F 9/00 | (2006.01) |
| C02F 101/10 | (2006.01) |
| C02F 101/20 | (2006.01) |
| C02F 101/32 | (2006.01) |
| C02F 101/36 | (2006.01) |
| C02F 103/00 | (2006.01) |
| C02F 103/10 | (2006.01) |
| C02F 101/30 | (2006.01) |

(52) U.S. Cl.
CPC ......... *B01J 20/28028* (2013.01); *C02F 1/281* (2013.01); *C02F 1/288* (2013.01); *C02F 1/283* (2013.01); *C02F 1/54* (2013.01); *C02F 9/00* (2013.01); *C02F 2101/103* (2013.01); *C02F 2101/20* (2013.01); *C02F 2101/30* (2013.01); *C02F 2101/32* (2013.01); *C02F 2101/325* (2013.01); *C02F 2101/363* (2013.01); *C02F 2103/001* (2013.01); *C02F 2103/008* (2013.01); *C02F 2103/10* (2013.01)

(56) References Cited

U.S. PATENT DOCUMENTS

| 4,018,678 | A |   | 4/1977  | Peniston |   |
|---|---|---|---|---|---|
| 4,080,290 | A |   | 3/1978  | Kläntschi |   |
| 4,233,444 | A |   | 11/1980 | Doonan |   |
| 4,432,959 | A |   | 2/1984  | Shimamura |   |
| 4,793,935 | A |   | 12/1988 | Stillman |   |
| 4,921,615 | A | * | 5/1990  | Lindoerfer | B01D 29/01 |
|   |   |   |   |   | 210/729 |
| 5,066,408 | A |   | 11/1991 | Powell |   |
| 5,204,452 | A |   | 4/1993  | Dingilian |   |
| 5,336,415 | A |   | 8/1994  | Deans |   |
| 5,362,717 | A |   | 11/1994 | Dingilian |   |
| 5,393,435 | A |   | 2/1995  | Deans |   |
| 5,433,865 | A | * | 7/1995  | Laurent | C02F 1/5263 |
|   |   |   |   |   | 210/727 |
| 5,503,766 | A |   | 4/1996  | Kulperger |   |
| 5,543,056 | A |   | 8/1996  | Murcott |   |
| 5,543,058 | A |   | 8/1996  | Miller |   |
| 5,681,475 | A |   | 10/1997 | Lamensdorf |   |
| 5,683,953 | A |   | 11/1997 | Mills |   |
| 6,059,978 | A |   | 5/2000  | Pacifici |   |
| 6,063,266 | A |   | 5/2000  | Grande |   |
| 6,197,201 | B1 |   | 3/2001 | Misra |   |
| 6,207,177 | B1 |   | 3/2001 | Jany |   |
| 6,210,460 | B1 |   | 4/2001 | Zuliani |   |
| 6,248,369 | B1 |   | 6/2001 | Nier |   |
| 6,350,383 | B1 |   | 2/2002 | Douglas |   |
| 6,409,926 | B1 |   | 6/2002 | Martin |   |
| 6,602,994 | B1 | * | 8/2003 | Cash | A61K 8/027 |
|   |   |   |   |   | 536/100 |
| 6,749,746 | B2 |   | 6/2004 | Mokrzycki |   |
| 6,749,748 | B1 | * | 6/2004 | Macpherson | C02F 1/5263 |
|   |   |   |   |   | 210/198.1 |
| 6,800,204 | B2 |   | 10/2004 | Harck |   |
| 6,821,427 | B2 |   | 11/2004 | Macpherson |   |
| 6,827,874 | B2 |   | 12/2004 | Souter |   |
| 6,863,825 | B2 |   | 3/2005  | Witham |   |
| 7,030,163 | B2 |   | 4/2006  | Duneas |   |
| 7,157,009 | B2 |   | 1/2007  | Nichols |   |
| 7,238,287 | B2 |   | 7/2007  | Kulperger |   |
| 7,374,690 | B2 |   | 5/2008  | Reddy |   |
| 7,384,573 | B2 |   | 6/2008  | Brummett |   |
| 7,728,132 | B2 |   | 6/2010  | Harvey |   |
| 7,790,042 | B2 |   | 9/2010  | Nichols |   |
| 2002/0074295 | A1 | * | 6/2002 | Cohen | C02F 1/56 |
|   |   |   |   |   | 210/723 |
| 2004/0235989 | A1 | * | 11/2004 | Kosub | C02F 5/10 |
|   |   |   |   |   | 524/55 |
| 2005/0242043 | A1 |   | 11/2005 | Nichols |   |
| 2006/0016723 | A1 |   | 1/2006  | Tang |   |
| 2006/0173083 | A1 |   | 8/2006  | Klipper |   |
| 2006/0196834 | A1 |   | 9/2006  | Nichols |   |
| 2007/0017871 | A1 |   | 1/2007  | Reddy |   |
| 2007/0119779 | A1 |   | 5/2007  | Muramoto |   |
| 2008/0146860 | A1 |   | 6/2008  | Doumbos |   |
| 2009/0071887 | A1 |   | 3/2009  | Ruech |   |
| 2009/0107925 | A1 |   | 4/2009  | Burba, III |   |
| 2009/0270253 | A1 |   | 10/2009 | Yang |   |
| 2010/0187178 | A1 |   | 7/2010  | Burba |   |
| 2010/0230359 | A1 |   | 9/2010  | Whitehead |   |

FOREIGN PATENT DOCUMENTS

| JP | 2003164708 A | 6/2003 |
|---|---|---|
| JP | 2004074146 A | 3/2004 |
| JP | 2006-341139 A | 12/2006 |
| JP | 2007326077 A | 12/2007 |
| JP | 2009000638 A | 1/2009 |
| KR | 1020010033053 A | 4/2001 |
| WO | 9931017 A1 | 6/1999 |

OTHER PUBLICATIONS

Korean Office Action, dated Jun. 8, 2016.
Avery, B.K., and A. Lemley, "Cryptosporidium: A Waterborne Pathogen," Water Quality Information Center, National Agricultural Library, May 1996, <http://www.nal.usda.gov/wqic/cornell.html> [retrieved Feb. 25, 2004], 6 pages.
International Search Report and Written Opinion of the International Searching Authority dated Nov. 18, 2010, in corresponding International Patent Application No. PCT/US2010/041107, filed Jul. 6, 2010, 4 pages.
Nichols, E.J., "Chitosan: Chemistry and Use in Water Clarification," Proceedings of the 2nd Annual Chemistry Symposium, National Spa and Pool Institute, Chicago, Nov. 1997, pp. 19-25.
Pal, B.N., "Granular Ferric Hydroxide for Elimination of Arsenic From Drinking Water," in M.F. Ahmed et al. (eds.), Technologies for Arsenic Removal From Drinking Water, May 2001, pp. 59-68.
"Sea-Klear® 4-in-1 Clarifier," product information, Vanson HaloSource, Redmond, Washington, 1 page, as early as 2002.
Arko, T., "Market Report: Solving the Phosphate Mystery," Swimming Pool / Spa Age, May 2000, 2 pages.
Fang, L., et al., "Removal of Fluoride Using Some Lanthanum(III)-Loaded Adsorbents With Different Functional Groups and Polymer Matrices," Journal of Chemical Technology and Biotechnology 78(10):1038-1047, Oct. 2003.
Limbach, L.K., et al., "Removal of Oxide Nanoparticles in a Model Wastewater Treatment Plant: Influence of Agglomeration and Surfactants on Clearing Efficiency," Environmental Science & Technology 42(15):5828-5833, Aug. 2008.
Nomura, J., et al., "Removal of Fluoride Ion From Wastewater by a Hydrous Cerium Oxide Adsorbent," in D.W. Tedder and F.G. Pohland (eds.), "Emerging Technologies in Hazardous Waste Management," Mar. 1990, pp. 157-172.
Shin, E.W., et al., "Orthophosphate Sorption Onto Lanthanum-Treated Lignocellulosic Sorbents," Environmental Science & Technology 39(16):6273-6279, Aug. 2005.
Thill, A., et al., "Cytotoxicity of CeO2 Nanoparticles for *Escherichia coli*. Physico-Chemical Insight of the Cytotoxicity Mechanism," Environmental Science & Technology 40(19):6151-6156, Oct. 2006.
Vu, K.B., et al., "Review of Arsenic Removal Technologies for Contaminated Groundwaters," Report No. ANL-CMT-03/2,

(56) References Cited

OTHER PUBLICATIONS

Argonne National Laboratory, Chemical Engineering Division, Argonne, Ill., Apr. 2003, 41 pages.
Wasay, S.A., et al., "Removal of Arsenite and Arsenate Ions From Aqueous Solution by Basic Yttrium Carbonate," Water Research 30(5):1143-1148, May 1996.
"ZeroPhos™: New Technology for Phosphate Removal," Technical Data Sheet, Vanson, Redmond, Wash., Jan. 1999, 1 page.
Jiao, Z.-Z., et al., "Removal of Fluoride Using Rare Earth Based Inorganic Adsorbent," Environmental Chemistry 21 (4):365-370, Jul. 2002 (English abstract).
Raichur, A.M., and M.J. Basu, "Adsorption of Fluoride Onto Mixed Rare Earth Oxides," Separation and Purification Technology 24(1-2):121-127, Jun. 2001.
Viswanathan, N., and S. Meenakshi, "Enhanced and Selective Fluoride Sorption on Ce(III) Encapsulated Chitosan Polymeric Matrix," Journal of Applied Polymer Science 112(3):1114-1121, May 2009.
Koray, E.F., "Effects of Dual Polymer Conditioning on Sludge Dewatering," master's thesis, Boğazici University, Istanbul, Turkey, 2006, 113 pages.
Fan, A., et al., "A Study of Dual Polymer Flocculation," Colloids and Surfaces A: Physicochemical and Engineering Aspects 162:141-148, Mar. 2000.
Yokoi, H., et al., "Flocculation Properties of Xanthan Produced by Xanthomonas campestris," Biotechnology Techniques 10(10):789-792, Oct. 1996.
Myllytie, P., et al., "Effect of Polymers on Aggregation of Cellulose Fibrils and Its Implication on Strength Development in Web Paper Web," Nordic Pulp and Paper Research Journal 24(2):125-134, 2009.
New Zealand First Examination Report dated Dec. 4, 2013, issued in corresponding New Zealand Application No. 618201, filed Jul. 6, 2010, 2 pages.
New Zealand First Examination Report dated Dec. 4, 2013, issued in corresponding New Zealand Application No. 618202, filed Jul. 6, 2010, 3 pages.
Chilean First Office Action issued in corresponding Chilean Application No. 15-2012, filed Jul. 6, 2010, and English translation of relevant portions as provided by foreign counsel, 13 pages.
Examination Report, application No. 10797744.9. dated Oct. 9, 2017.

\* cited by examiner

USE OF A DUAL POLYMER SYSTEM FOR ENHANCED WATER RECOVERY AND IMPROVED SEPARATION OF SUSPENDED SOLIDS AND OTHER SUBSTANCES FROM AN AQUEOUS MEDIA

CROSS-REFERENCES TO RELATED APPLICATIONS

This application is a continuation of U.S. patent application Ser. No. 12/830,949, filed Jul. 6, 2010, which claims the benefit of U.S. Provisional Application Nos. 61/353,942, filed Jun. 11, 2010, 61/303,485, filed Feb. 11, 2010, and 61/223,264, filed Jul. 6, 2009, all of which applications are expressly incorporated herein by reference.

BACKGROUND

Separation of suspended solids, miscible and immiscible liquids, soluble and partly soluble substances from water has many uses across a wide and diverse field of industries. The treatment of water can be necessary for reuse in the industry that generated the contaminated water or before being discharged to a body of water, such as a lake, river, or the ocean. The separation of suspended solids, miscible and immiscible liquids, soluble and partly soluble substances from water is also beneficial for improving the quality of water as many of these substances are contaminants and pollutants.

Disclosed is a process that is useful in the treatment of water for the removal of substances of all types of suspended solids, water miscible and water immiscible liquids, water soluble and partly soluble substances.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This disclosure relates to the field of water treatment for the removal of substances from the water. Substances can include solids, water miscible and water immiscible liquids, water soluble and partly soluble substances.

In one aspect, a method is disclosed that includes adding an anionic polymer or polymers, such as xanthan polymers, followed by adding a cationic polymer or polymers, such as chitosan polymers, to aqueous media containing any suspended or sedimented particles, water miscible, water immiscible, and water soluble substances in the water. Following addition of the one or more cationic polymers to the aqueous media, cohesive fibrillar aggregates are formed. The suspended or sedimented matter in the aqueous media can include particles that are created prior to the addition of the anionic polymer or polymers. Creating the suspended particle first allows the removal of substances that are initially soluble in the water. The disclosed method can therefore be used to remove not only suspended particles, but water soluble, water miscible and water immiscible liquids by creation of an insoluble particle first. When the substance is dissolved, miscible, or even immiscible in water, the substance may first be treated with removal media to provide a particulate out of the liquid or dissolved substance. When the substance is a solid or immiscible liquid in the water, the substance can be treated with the anionic and cationic polymers without the need for creating a particle. In the disclosed method, the suspended particles or immiscible liquids undergo a rapid aggregation into large aggregated fibrillar masses such that the aqueous medium can be easily separated from the aggregated fibrillar masses by filtration through screens, meshes, and the like. This allows a greater flow rate of water to be filtered.

In another aspect, a fibrillar aggregated product is disclosed that includes anionic polymers, such as xanthan polymers, cationic polymers, such as chitosan polymers, and an insoluble particle, wherein the xanthan polymers and chitosan polymers form a fibrillar aggregate comprising fibers and fibrils to which the insoluble product is adhered. The disclosed method causes the formation of large cohesive fibrillar aggregates that exhibit a high solid to liquid ratio—and due in part to their physicochemical nature—can rapidly and easily settle out from the aqueous media. The physical nature of the fibrillar aggregates is different from the floccules obtained through conventional flocculation/coagulation. It is the physical nature of the fibrillar aggregates and the high stability of the aggregates, which hold together under significant agitation, that distinguishes fibrillar aggregates from floccules generated by using current conventionally known polymers and/or chemical coagulants in processes of flocculation and/or coagulation of suspended particles. For some types of aqueous media, the insoluble particle will have been provided from combining two soluble compounds or from one soluble and one insoluble compound, such as adsorbent/adsorbate systems. For other types of aqueous media that contain primarily oils and/or water-immiscible hydrocarbons, the oil and/or water-immiscible hydrocarbons form fibrillar aggregates that may separate out from the aqueous media such that they can be removed by filtration, settling and/or skimming from the surface of the aqueous media, or by withdrawing the fibrillar aggregates from the surface of the water by an angled rotating conveyor belt partly submerged in the aqueous media that lifts the fibrillar aggregates out of the aqueous media. In other cases, the aqueous media can also contain suspended fine sediment, such as clays and fine sands, and the fibrillar aggregates will contain both oil and water-immiscible hydrocarbons combined with the fine sediments and clay fines. Other types of aqueous media can contain suspensions of live or dead microorganisms and/or viruses including bacteria, yeast, fungi and microalgae and, therefore, the fibrillar aggregates will include living matter or microorganisms. The fibrillar aggregates created through the disclosed method can be separated by filtration and/or settling.

In a first embodiment, a method for removing a substance from aqueous media is provided. The method includes treating a substance present in aqueous media to provide insoluble particles in the aqueous media; treating the aqueous media with an anionic polymer; and treating the aqueous media with a cationic polymer, wherein the anionic polymer and cationic polymer form aggregates comprising the insoluble particles; and collecting the aggregates to remove the substance from the aqueous media treated with the anionic and cationic polymers.

In a second embodiment, a method for forming aggregates in aqueous media is provided. The method includes treating a substance present in aqueous media to provide insoluble particles in the aqueous media; treating the aqueous media with an anionic polymer; and treating the aqueous media with a cationic polymer to form aggregates comprising the insoluble particles.

In the method of the first and second embodiments, the substance can be soluble in the aqueous media.

In the method of the first and second embodiments, the substance can be miscible in the aqueous media.

In the method of the first and second embodiments, the substance can be immiscible in the aqueous media, such as a liquid.

In the method of the first and second embodiments, the substance can be a submicron particle.

In the method of the first and second embodiments, the anionic polymer can be a xanthan or a mixture of xanthan and one or more different anionic polymers and/or nonionic polymers.

In the method of the first and second embodiments, the cationic polymer can be a chitosan or a mixture of chitosan and one or more different cationic polymers and/or nonionic polymers.

In the method of the first and second embodiments, the insoluble particle can comprise a water soluble substance, a water immiscible liquid, a water miscible liquid, or a submicron particle.

In the method of the first and second embodiments, the method may further comprises bonding the substance to removal media.

In the method of the first and second embodiments, the method may further comprise bonding the substance to removal medium, wherein the removal medium is an adsorbent.

In the method of the first and second embodiments, the method may further comprise bonding the substance to removal medium, wherein the removal medium is carbon.

In the method of the first and second embodiments, the method may further comprise bonding the substance to removal medium, wherein the removal medium is a metal oxide or hydrous metal oxide.

In the method of the first and second embodiments, the insoluble particle can comprise cyanuric acid and melamine.

In the method of the first and second embodiments, the insoluble particle can comprise carbon and a polychlorinated biphenyl compound.

In the method of the first and second embodiments, the insoluble particle can comprise arsenic and iron oxide hydroxide.

In the method of the first and second embodiments, the insoluble particle can comprise carbon and at least one of benzene, toluene and xylene.

In the method of the first and second embodiments, the insoluble particle can comprise carbon and naphthenic acid.

In the method of the first and second embodiments, the insoluble particle can comprise cerium oxide and a fluoride ion.

In the method of the first and second embodiments, the insoluble particle can comprise zirconium hydroxide and a fluoride ion.

In the method of the first and second embodiments, the method may further comprise adjusting the pH of the aqueous media to 6 or greater and the insoluble particle comprises a metal or a nonmetal.

In the method of the first and second embodiments, the method may further comprise adjusting the pH of the aqueous media to 6 or greater and the insoluble particle comprises a metal or a nonmetal, wherein the metal is one of lead, cadmium, beryllium, barium, thallium, iron, nickel, vanadium, copper, aluminum, zinc, manganese, chromium, cobalt, or any combination thereof.

In the method of the first and second embodiments, the method may further comprise adjusting the pH of the aqueous media to 6 or greater and the insoluble particle comprises a metal or a nonmetal, wherein the nonmetal is arsenic or selenium In the method of the first and second embodiments, the insoluble particle can comprise carbon and a hydrocarbon.

In the method of the first and second embodiments, the insoluble particle can comprise carbon and a hydrocarbon, wherein the hydrocarbon is an aromatic hydrocarbon.

In the method of the first and second embodiments, the insoluble particle can comprise carbon and a hydrocarbon, wherein the hydrocarbon is a halogenated hydrocarbon.

In the method of the first and second embodiments, the insoluble particle can comprise orthophosphate and a lanthanum compound.

In the method of the first and second embodiments, the insoluble particle can comprise carbon and a mercury compound.

In the method of the first and second embodiments, the insoluble particle can comprise a protein, immunoglobulin, antigen, lipid, or carbohydrate.

In the method of the first and second embodiments, the insoluble particle can comprise a bacterium, such as *E. coli* or *Entercoccus*, or a virus.

In the method of the first and second embodiments, the insoluble particle can comprise a bacterium, such as *E. coli* or *Entercoccus*, and dirt.

In the method of the first and second embodiments, the method may further comprise reducing or oxidizing the substance to provide the insoluble particle.

In the method of the first and second embodiments, the method may further comprise adjusting the pH of the aqueous media to provide the insoluble particle.

In the method of the first and second embodiments, the method may further comprise flowing the aqueous media through a porous material and collecting the aggregates on the material.

In the method of the first and second embodiments, the method may further comprise flowing the aqueous media through a porous material and collecting the aggregates on the material, wherein the porous material comprises pores approximately 100 µm in size.

In the method of the first and second embodiments, the method may further comprise flowing the aqueous media through a porous material and collecting the aggregates on the material, wherein the porous material comprises pores approximately 100 µm to 2 mm in size.

In the method of the first and second embodiments, the method may further comprise flowing the aqueous media through a porous material and collecting the aggregates on the material, wherein the porous material comprises pores in the range of approximately 100 µm to 850 µm in size.

In the method of the first and second embodiments, the method may further comprise flowing the aqueous media through a porous material and collecting the aggregates on the material, wherein the porous material comprises pores in the range of approximately 850 µm to 2 mm in size.

In the method of the first and second embodiments, the method may further comprise allowing the aggregates to settle before collecting the aggregates.

In the method of the first and second embodiments, the method may further comprise treating the aqueous media with the anionic polymer followed by the cationic polymer.

In the method of the first and second embodiments, the method may further comprise treating the aqueous media with the cationic polymer followed by the anionic polymer.

In the method of the first and second embodiments, the method may further comprise treating the aqueous media with the anionic polymer simultaneously with the cationic polymer.

In the method of the first and second embodiments, the method may further comprise diluting the aqueous media to lower a concentration of the substance to less than 10% by weight before treating with the anionic and the cationic polymers.

In the method of the first and second embodiments, the method may further comprise performing two or more steps selected from bonding the substance to removal media, adjusting the pH of the aqueous media to 6 or greater, and reducing or oxidizing the substance to provide the insoluble particle.

In the method of the first and second embodiments, the aggregates can be any one or more of the fibrillar aggregates according the fifth embodiment.

In a third embodiment, a method for removing a substance from aqueous media is provided. The method includes treating aqueous media containing a substance with an anionic polymer, treating the aqueous media with a cationic polymer to form fibrillar aggregates comprising fibers formed from the anionic polymer and the cationic polymer, wherein the substance is adhered to the fibers, and collecting the aggregates to remove the substance from the aqueous media.

In a fourth embodiment, a method for forming fibrillar aggregates in aqueous media is provided. The method includes treating aqueous media containing a substance with an anionic polymer and treating the aqueous media with a cationic polymer to form fibrillar aggregates comprising fibers formed from the anionic polymer and the cationic polymer to which the substance is adhered.

In the method of the third and fourth embodiments, the substance can be submicron in size.

In the method of the third and fourth embodiments, the substance can be water insoluble or water immiscible.

In the method of the third and fourth embodiments, the method may comprise treating the aqueous media with the anionic polymer followed by the cationic polymer.

In the method of the third and fourth embodiments, the method may comprise treating the aqueous media with the cationic polymer followed by the anionic polymer.

In the method of the third and fourth embodiments, the method may comprise treating the aqueous media with the anionic polymer simultaneously with the cationic polymer.

In the method of the third and fourth embodiments, the anionic polymer is a xanthan or a mixture of xanthan and one or more different anionic polymers and/or nonionic polymers.

In the method of the third and fourth embodiments, the cationic polymer is a chitosan or a mixture of chitosan and one or more different cationic polymers and/or nonionic polymers.

In the method of the third and fourth embodiments, the substance is one of oil, fats, grease, sand, coal, clay, dirt, bacterium, or virus.

In the method of the third and fourth embodiments, the method may further comprise retaining the aggregates on a sieve having pores of 2 mm.

In the method of the third and fourth embodiments, the method may further comprise retaining the aggregates on a sieve having pores of 850 μm or greater.

In the method of the third and fourth embodiments, the method may further comprise retaining the aggregates on a sieve having pores of 100 μm or greater.

In the method of the third and fourth embodiments, the method may further comprise flowing water through a screen, mesh, or porous filter to collect the aggregates.

In the method of the third and fourth embodiments, the method may further comprise allowing the aggregates to settle before collecting.

In the method of the third and fourth embodiments, the method may further comprise diluting the aqueous media to lower a concentration of the substance to less than 10% by weight before treating with the anionic and the cationic polymers.

In the method of the third and fourth embodiments, the fibrillar aggregates can comprise fibers and fibrils.

In the method of the third and fourth embodiments, the fibrillar aggregates can be cohesive.

In the method of the third and fourth embodiments, at least one fibrillar aggregate can comprise at least one fiber with a width from 0.02 mm to 0.5 mm.

In the method of the third and fourth embodiments, at least one fibrillar aggregate can comprise at least one fiber with a width from 0.03 mm to 0.4 mm.

In the method of the third and fourth embodiments, at least one fibrillar aggregate can comprise at least one fiber with a length from 0.5 mm to 6 mm.

In the method of the third and fourth embodiments, at least one fibrillar aggregate can comprise at least one fiber with a length from 0.65 mm to 5.5 mm.

In a fifth embodiment, a fibrillar aggregate is disclosed. The fibrillar aggregate can include anionic polymers; cationic polymers; and insoluble particles or an immiscible liquid, wherein the anionic polymers and cationic polymers form fibers to which the insoluble particles or immiscible liquid is adhered. The fibrillar aggregate disclosed herein and all the features disclosed below can be formed from the method of the first, second, third, and fourth embodiments.

In the fifth embodiment, the fibrillar aggregate can have anionic polymers that are xanthan polymers.

In the fifth embodiment, the fibrillar aggregate can have anionic polymers that are chitosan polymers.

In the fifth embodiment, the fibrillar aggregate can comprise a mixture of a xanthan and one or more different anionic polymers and/or nonionic polymers.

In the fifth embodiment, the fibrillar aggregate can comprise a mixture of a chitosan and one or more different cationic polymers and/or nonionic polymers.

In the fifth embodiment, the fibrillar aggregate can have the insoluble particle comprising a submicron substance.

In the fifth embodiment, the fibrillar aggregate can have the insoluble particle formed from a removal medium and a substance that is bonded to the removal medium.

In the fifth embodiment, the fibrillar aggregate can have the insoluble particle formed from a removal medium and a substance that is bonded to the removal medium, wherein the removal medium is an adsorbent.

In the fifth embodiment, the fibrillar aggregate can have the insoluble particle formed from a removal medium and a substance that is bonded to the removal medium, wherein the removal medium is carbon.

In the fifth embodiment, the fibrillar aggregate can have the insoluble particle formed from a removal medium and a substance that is bonded to the removal medium, wherein the removal medium is a metal oxide or hydrous metal oxide.

In the fifth embodiment, the fibrillar aggregate can have the insoluble particle comprising cyanuric acid bound to melamine.

In the fifth embodiment, the fibrillar aggregate can have the insoluble particle comprising a polychlorinated biphenyl compound bound to carbon.

In the fifth embodiment, the fibrillar aggregate can have the insoluble particle comprising arsenic bound to iron oxide hydroxide.

In the fifth embodiment, the fibrillar aggregate can have the insoluble particle comprising benzene, toluene, or xylene bound to carbon.

In the fifth embodiment, the fibrillar aggregate can have the insoluble particle comprising carbon and naphthenic acid.

In the fifth embodiment, the fibrillar aggregate can have the insoluble particle comprising cerium oxide and a fluoride ion.

In the fifth embodiment, the fibrillar aggregate can have the insoluble particle comprising zirconium hydroxide and a fluoride ion.

In the fifth embodiment, the fibrillar aggregate can have the insoluble particle comprising a metal or a nonmetal.

In the fifth embodiment, the fibrillar aggregate can have the insoluble particle comprising a metal or a nonmetal, wherein the metal is one of lead, cadmium, beryllium, barium, thallium, iron, nickel, vanadium, copper, aluminum, zinc, manganese, chromium, cobalt, or any combination thereof.

In the fifth embodiment, the fibrillar aggregate can have the insoluble particle comprising a metal or a nonmetal, wherein the nonmetal is arsenic or selenium.

In the fifth embodiment, the fibrillar aggregate can have the insoluble particle comprising a hydrocarbon bound to carbon.

In the fifth embodiment, the fibrillar aggregate can have the insoluble particle comprising orthophosphate and a lanthanum compound.

In the fifth embodiment, the fibrillar aggregate can have the insoluble particle comprising a mercury compound bound to carbon.

In the fifth embodiment, the fibrillar aggregate can have the insoluble particle comprising a protein, immunoglobulin, antigen, lipid, or carbohydrate.

In the fifth embodiment, the fibrillar aggregate can have the insoluble particle being a bacterium, such as *E. coli* or *Enterococcus*, or virus.

In the fifth embodiment, the fibrillar aggregate can comprise a bacterium and dirt. In the fifth embodiment, the fibrillar aggregate can comprise sand, coal, clay, dirt, a bacterium or a virus.

In the fifth embodiment, the fibrillar aggregate can comprise the immiscible liquid being oil, fats, or grease.

In the fifth embodiment, the fibrillar aggregate can comprise a size to be retained on a sieve having pores of 2 mm.

In the fifth embodiment, the fibrillar aggregate can comprise a size to be retained on a sieve having pores of 850 µm or greater.

In the fifth embodiment, the fibrillar aggregate can comprise a size to be retained on a sieve having pores of 100 µm or greater.

In the fifth embodiment, the fibrillar aggregate can have the insoluble particle comprise a immunoglobulin:antigen complex.

In the fifth embodiment, the fibrillar aggregate can have the insoluble particle comprise a first species and a second species bound to each other, which separately are water soluble and bound together are water insoluble.

In the fifth embodiment, the fibrillar aggregate can have the insoluble particle comprise a water soluble species bound to a water insoluble species.

In the fifth embodiment, the fibrillar aggregate can have the insoluble particle comprise a water miscible liquid and a water insoluble substance bound to each other.

In the fifth embodiment, the fibrillar aggregate can have the insoluble particle comprise a water immiscible liquid and water insoluble substance bound to each other.

In the fifth embodiment, the fibrillar aggregate can comprise at least one fiber with a width from 0.02 mm to 0.5 mm.

In the fifth embodiment, the fibrillar aggregate can comprise at least one fiber with a width from 0.03 mm to 0.4 mm.

In the fifth embodiment, the fibrillar aggregate can comprise at least one fiber with a length from 0.5 mm to 6 mm.

In the fifth embodiment, the fibrillar aggregate can comprise at least one fiber with a length from 0.65 mm to 5.5 mm.

In the fifth embodiment, the fibrillar aggregate can comprise fibrils.

In a sixth embodiment, a method for removing fluoride ions from aqueous media, is provided. The method includes treating aqueous media containing fluoride ions with cerium oxide to provide particles, each particle comprising cerium oxide and a fluoride ion; and removing the particles from the aqueous media to remove fluoride ions from the aqueous media.

In a seventh embodiment, a method for removing fluoride ions from aqueous media, is provided. The method includes treating aqueous media containing fluoride ions with zirconium hydroxide to provide particles, each particle comprising zirconium hydroxide and a fluoride ion; and removing the particles from the aqueous media to remove fluoride ions from the aqueous media.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
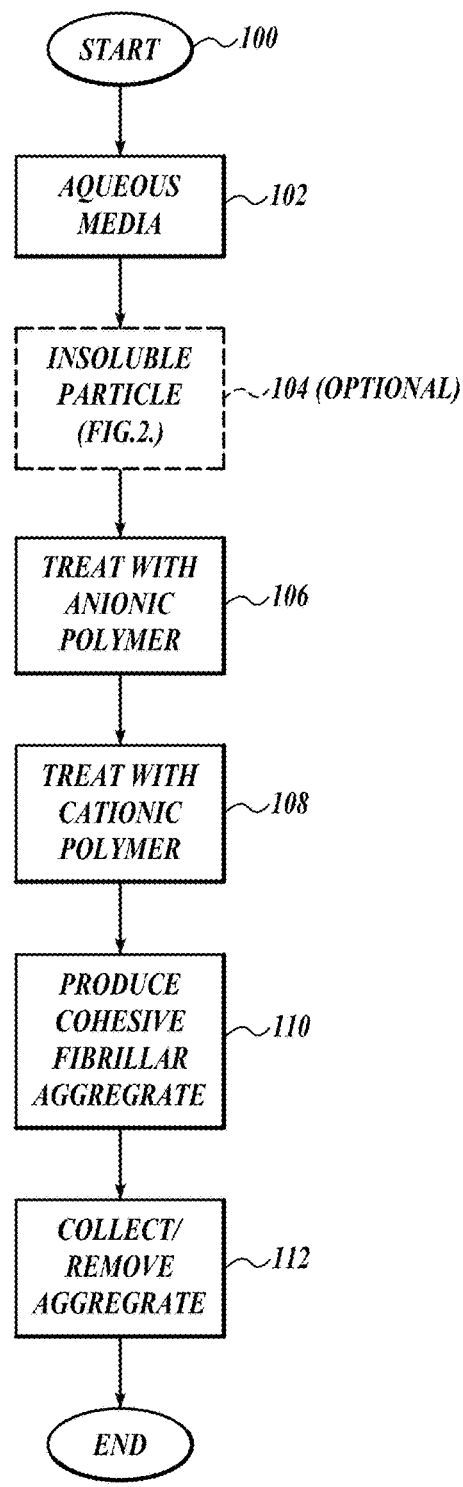
FIG. 1 is a flow diagram of a method in accordance with one embodiment of the invention.

This disclosure relates to the removal of substances from aqueous media. Substances include water soluble, water insoluble, water miscible and water immiscible substances from aqueous media by treatment of the aqueous media with one or more anionic polymers and one or more cationic polymers.

Water has many uses across a variety of industries, such as mining, drilling, construction, shipping, chemical and biochemical processing. Invariably, the use of water in industry results in pollution or contamination of the water that renders it unsuitable for reuse or discharge into lakes, rivers, streams, and oceans. Accordingly, there is a need for treatment to remove the contaminants and pollutants.

Disclosed is a method for the removal of substances from aqueous media (i.e., water). A used herein, "aqueous media" and "water" are interchangeable. The water to be treated can originate from any source or industry. The source can include a polluted stream, river, lake, or ocean. The substances that can be removed in accordance with the invention can be water soluble substances, water insoluble substances or particles, water miscible liquids or water immiscible liquids. The method includes adding an anionic polymer or polymers and a cationic polymer or polymers. In some embodiments of the method, the anionic and cationic polymers are added sequentially, while in other embodiments, the anionic and cationic polymers may be added simultaneously. In some embodiments, the method includes adding the anionic polymer or polymers followed by that cationic polymer or polymers, or in the reverse order of addition, meaning the cationic polymer or polymers is added followed by the anionic polymer or polymers.

As used herein the "anionic polymer" refers to one or more anionic polymers, such as an anionic polysaccharide, such as xanthan, or other anionic polymers different than xanthan such as anionic polyacrylamide (PAM), carrageenan, alginate, pectin, and any combination thereof. The use of the singular form of the term "anionic polymer" is not meant to exclude a mixture of more than one different anionic polymers. In one embodiment, the anionic polymer is xanthan. In another embodiment, the anionic polymer is a mixture of xanthan and one or more different anionic polymers. In another embodiment, a mixture of any one or more of the anionic polymers and nonionic polymers, such as, glucomannan, nonionic polyacrylamide, may be used. The anionic polymers can be natural biopolymers, such as xanthan, or inorganic polymers.

As used herein, the "cationic polymer" refers to one or more cationic polymers, such as a cationic polysaccharide, such as chitosan, or other cationic polymers different than chitosan such as cationic guar, cationic starch, cationic PAM, and any combination thereof. The use of the singular form of the term "cationic polymer" is not meant to exclude a mixture of more than one different cationic polymers. In one embodiment, the cationic polymer is chitosan. In another embodiment, the cationic polymer is a mixture of chitosan and one or more different cationic polymers. In another embodiment, a mixture of any one or more of the anionic polymers and nonionic polymers, such as, glucomannan, nonionic polyacrylamide, may be used. The cationic polymers can be natural biopolymers, such as chitosan, or inorganic polymers.

Referring to FIG. 1, a method is disclosed for treating any aqueous media, such as fresh, brackish or saltwater having a substance desired to be removed from the water. The method starts in block 100. From block 100, the method enters block 102. Block 102 is to identify the aqueous media that has one or more substances desired to be removed.

The aqueous media can include, but, is not limited to any water, such as fresh, brackish, or saltwater from any source, such as, but not limited to any industry, lake, pond, river, stream, tank, ditch, ocean, and the like. In some embodiments, if the water has high levels of suspended solids as the substance to be removed, the water may first undergo a diluting step to dilute the aqueous media to lower the concentration of solids to approximately 0.1% or less, 1% or less, 3% or less, 5% or less, 8% or less, and 10% or less, or any concentration that can be treated with the anionic and cationic polymers. Examples of aqueous media from industry that could be treated using the disclosed method or processes in which this method could be used include, but are not limited to: dredging water/dredging applications; mining tailings including acid mine tailings; mining process water; industrial process water; including biochemical process water; purification of chemical or biological products from industrial water; removal of reaction byproducts or additives from industrial process water; industrial wastewater; municipal waste water; municipal potable water treatment; treatment of contaminated water from power plants including coal burning plants; cooling water for power plants; remediation of contaminated groundwater, bilge water, ballast water, removal of pigments (e.g., titanium dioxide) from industrial waste or process water; treatment of stormwater; treatment of agricultural irrigation water to remove microorganisms (e.g., magnesium oxides or iron oxides that bind to viruses, bacteria, fungi or protozoa); treatment of agricultural irrigation water to remove selenium; clean up of produced water and flow back water generated and/or used in oil and gas mining; clean up of natural gas mining drilling water used for hydraulic fracturing; water clean-up for use in natural gas mining; harvesting of algae and components produced by algae such as triacylglycerols for use in biodiesel production; harvesting of molecules produced by algae; harvesting of molecules produced by algae and used for growing algae; clean-up of aqueous media for growing algae in order to remove substances that would be harmful to algae growth such as from power plant flue wash down; harvesting of microorganisms and components of microorganisms for vaccine development and production; isolation of biochemical entities such as DNA, RNA, proteins, carbohydrates, lipids, polysaccharides, albumin for use in biochemical diagnostic assays or for purification of such substances for use in diagnostic assays; tunneling operations and treatment of aqueous media such as water containing sediment, contaminated with chemical entities; treatment of agricultural run-off water to remove pesticides and herbicides; treatment of residential and/or commercial sewage water or gray water to remove substances, including microconstituents such as musk oils, drugs such as chemotherapeutic agents, triclosan, aspirin, pharmaceuticals such as aspirin, Prozac™, ibuprofen, endocrine disruptors including actives in birth control pills; remediation of superfund sites and toxic waste dumps; treatment of water for point of use and/or point of entry devices for use in drinking water; stormwater, rainwater or water generated during natural events such as tsunamis, earthquakes, ocean oil spills, monsoons where the water needs to be cleaned prior to use for drinking; well water used for drinking containing noxious or toxic substances such as arsenic and organic toxins such as cyanobacterial toxins; industrial water containing toxic heavy metals or paint pigments containing toxic heavy metals; water used for washing off planes or other transportation equipment; remediation or reclamation of water used in aquaculture, such as fish ponds used to grow either ornamental or food fish, shrimp and crayfish ponds used to grow shrimp and crayfish; treatment of brackish water containing petroleum contaminants derived from spills or oil mining operations such as offshore mining operations; lakes, rivers, oceans, and ponds that need remediation and treatment to remove pollutants such as toxic metals and nonmetals, including, but not limited to, fluoride and arsenic, organic pollutants, pesticides and herbicides, phosphates and nitrates, and nitrites.

As disclosed herein, a method is provided for the removal of substances from aqueous media. "Substances" as used herein can refer to one or more materials that are the target for removal, collection and/or aggregation in the aqueous media. When in the aqueous media, substances can be in solid phase, liquid phase, or gas phase. Substances can include suspended or sedimented solids, water miscible and water immiscible liquids, water soluble, water insoluble and partly soluble substances. Substances that are initially dissolved in the water and water miscible and immiscible liquids or submicron and small particles can optionally undergo a further step (block 104) to convert the soluble substance, miscible liquid, or immiscible liquid into an insoluble particle, whereas substances that are immiscible or insoluble in water can be treated directly by entering block 106. However, substances that are immiscible or insoluble in water can also be treated in block 104 in cases where the immiscible substance is a liquid or the insoluble substance is small, such as a bacterium or virus, to create a large particle that is more readily aggregated by the treatment with the anionic and cationic polymers.

Block 104 is optional when the substance to be removed from the water in block 102 is soluble, miscible, or immiscible in the water. Block 104 may use one or more processes to provide an insoluble particle which is then subjected to treatment with the anionic and cationic polymers. If the substance to be removed from the water in block 102 is already a large insoluble particle or an immiscible liquid, the method can proceed to block 106. Block 104 will be described in more detail in association with FIG. 2 below. One embodiment of the method is to provide an insoluble particle from substances that would not otherwise be aggregated sufficiently with the use of the anionic and cationic polymers.

Block 106 is for treating the aqueous media with the anionic polymer or polymers. In one embodiment, anionic polymers can be added before the cationic polymers. However, in other embodiments, the anionic and cationic polymers may be added simultaneously, and in other embodiments, the cationic polymers may be added before the anionic polymers. The aqueous media can be treated with the anionic polymers in a plurality of ways. For example, anionic polymers can be dispersed as a powder or granules, or some combination thereof, or as a solution added to the aqueous media. Alternatively, anionic polymers can be provided in a containment device, such as a porous bag, and the water containing the substance desired to be removed is allowed to flow through or over the containment device. After addition of the anionic polymer or polymers, the water may be mixed or agitated to distribute the anionic polymer or polymers in the aqueous media. The effective amount of anionic polymer or polymers to add for the removal of a substance or substances from aqueous media can be determined by conducting trials on the water and noticing when the desired effect is achieved. The effective amount of anionic polymer is also dependent on the amount or concentration of the substance that is in the aqueous media being treated. The effective amount of anionic polymer is that amount that, when combined with an amount of cationic polymer, produces cohesive fibrillar aggregates that entrap the substance or insoluble particles and are approximately at least 100 µm in size. A range of 0.01 ppm by weight to 1000 ppm by weight for each polymer and at a ratio of anionic to cationic polymers of 1:1 to 1:1000 are possible depending the substance and concentration. The concentration of the cationic polymer can be approximately the same, less than, or more than the concentration of the anionic polymer.

"Xanthan gum" or "xanthan" or "xanthan polymer" as used herein refers to the polysaccharide produced by aerobic fermentaion by a bacterium, such as *Xanthomonas campestris* bacterium. Alternatively, *Xanthomonas phaseoli* and *Xanthomonas juglandis* are possible. After a period for fermentation by the bacteria, the polysaccharide can be precipitated with alcohol from the medium in which it is grown, and thereafter, the polysaccharide can be dried and ground into a powder, which is readily soluble in water to form xanthan gum. Xanthan can be used in the disclosed method as the anionic polymer as a dry powder or in solution as the gum. It should be possible to agglomerate the powder into granules and use these as well. From block 106, the method enters block 108.

In block 108, the aqueous media is treated with the cationic polymer or polymers. In one embodiment anionic polymers can be added before the cationic polymers. However, in other embodiments, the anionic and cationic polymers may be added simultaneously, and in other embodiments, the cationic polymers may be added before the anionic polymers. The aqueous media can be treated with the cationic polymers in a plurality of ways. For example, cationic polymers can be dispersed as a powder, granules, flakes or as a solution added to the water. Alternatively, cationic polymers can be provided in a containment device, such as a porous bag, and the water containing the substance desired to be removed is allowed to flow through or over the containment device. After addition of the cationic polymer or polymers, the water may be mixed or agitated to distribute the cationic polymer or polymers in the aqueous media. The effective amount of cationic polymer or polymers to add for the removal of a substance from aqueous media can be determined by conducting trials on the water and noticing when the desired effect is achieved. The effective amount of cationic polymer is also dependent on the amount or concentration of the substance that is in the aqueous media being treated. The effective amount of cationic polymer is that amount that, when combined with an amount of anionic polymer, produces cohesive fibrillar aggregates that entrap the substance and are approximately at least 100 µm in size. A range of 0.01 ppm by weight to 1000 ppm by weight for each polymer and at a ratio of anionic to cationic polymers of 1:1 to 1:1000 are possible depending the substance and concentration. The concentration of the anionic polymer can be approximately the same, less than, or more than the concentration of the cationic polymer.

Chitosan as used herein refers to the polysaccharide having randomly distributed β-(1-4)-linked N-acetyl-D-glucosamine (acetylated units) and D-glucosamine (deacetylated units) in sufficient ratios to be soluble in weakly acidic media. Chitosan may be prepared from chitin, which is a polymer occurring widely in nature and a principal constituent of the exoskeleton of many arthropods and insects, and of the cell wall of many fungi. Chitin is frequently found in a mixture with proteins and calcium compounds. Chitin is essentially a polymer of 2-deoxy-2-acetamidoglucose monomer units that are linked in beta-1,4 fashion though a minor fraction of the units may be hydrolyzed to 2-deoxy-2-aminoglucose units. The terms chitin and chitosan are often considered as being on a spectrum. While there is no recognized degree of deactylation to mark the boundary between chitin and chitosan. Chitosan is sometimes applied to copolymers having greater than approximately 50% 2-deoxy-2-aminoglucose monomeric units and the remaining monomeric units being 2-deoxy-2-acetamidoglucose units. Chitosan is derived from chitin by hydrolysis of some 2-deoxy-2-acetamidoglucose units to 2-deoxy-2-aminoglucose units. Due to the presence of a greater number of free amino groups, chitosan may be provided as an aqueous acidic solution and is present in such solution as a polycation with the protonated amino group bearing a positive charge. Chitosan useful in the method disclosed herein typically has a molecular weight in the range of from 20,000 Daltons to two million Daltons, such as from 50,000 Daltons to one million Daltons, or such as from 100,000 Daltons to 900,000 Daltons. Chitosan useful in the disclosed methods typically has a percentage deacetylation of from 50% to 100%, such as from 60% to 95%, or from 70% to 90%. Chitosan for use in the disclosed method as the cationic polymer may be provided as an aqueous solution of a chitosan salt, a weakly acidic aqueous solution, or as a dry salt of chitosan with a $C_1$ to $C_{18}$ mono- or polycarboxylic acid, such as chitosan acetate or chitosan lactate. By way of non-limiting example, solid dry chitosan salts useful in the practice of the invention include: chitosan acetate, chitosan lactate, chitosan glutamate, chitosan hydrochloride, chitosan succinate, chitosan fumarate, chitosan adipate, chitosan glycolate, chitosan tartrate, chitosan formate, chitosan malate, and chitosan citrate. From block 108, the method enters block 110.

Block 110 signifies that the product of treating water containing substances with the anionic polymer and the cationic polymer is a cohesive fibrillar aggregate. The fibrillar aggregates are composed of a plurality of fibers and fibrils that surround and hold and entrap the substances. The formed aggregates include the anionic polymer, the cationic polymer and the insoluble particles (created in block 104, or initially present in the water in block 102) and/or substances, such as immiscible liquids interspersed and adhered within and to the aggregate. The aggregates produced according to the disclosed methods are unlike floccules in that the aggregates are much more cohesive and resistant to dispersion and have a higher tensile strength bonding the fibers and fibrils and particles together. An example demonstrating the cohesive property of aggregates formed in accordance with one embodiment of the invention is described below as Example 18. As shown in the FIGS. 9-10, for example, fibers appear to form the cohesive aggregates. These fibers appear to have a width of about 0.1 mm to about 0.2 mm. At higher magnification as seen in FIGS. 3, 4 and 6-9, much smaller fibrils are seen having widths possibly in the submicron range of 1 µm or less. As described further below, fibers can be formed from a plurality of substances and/or removal media with the addition of the anionic and cationic polymers, such as xanthan and chitosan. Fibers can make up the whole of the individual aggregates or the fibers can form less than the whole aggregate. In the former case, fibers can be tightly or loosely bound in aggregates. In the latter case, an individual aggregate can be formed from distinct masses held together by fibers. It is thought that fiber formation can be enhanced by greater dosage of anionic and cationic polymers, or by diluting the aqueous media to lower the solids concentration. Solids concentrations of less than 3%, or less than 2%, or less than 1%, are believed to form aggregates comprising at least some amounts of fibers, though higher solid concentrations may also have fiber formation with higher dosages of anionic and cationic polymers. At higher concentrations, the fibers tend to be short fibers, while at lower concentrations the fibers are more defined, and well formed, and longer in comparison to the width.

Figure 3:
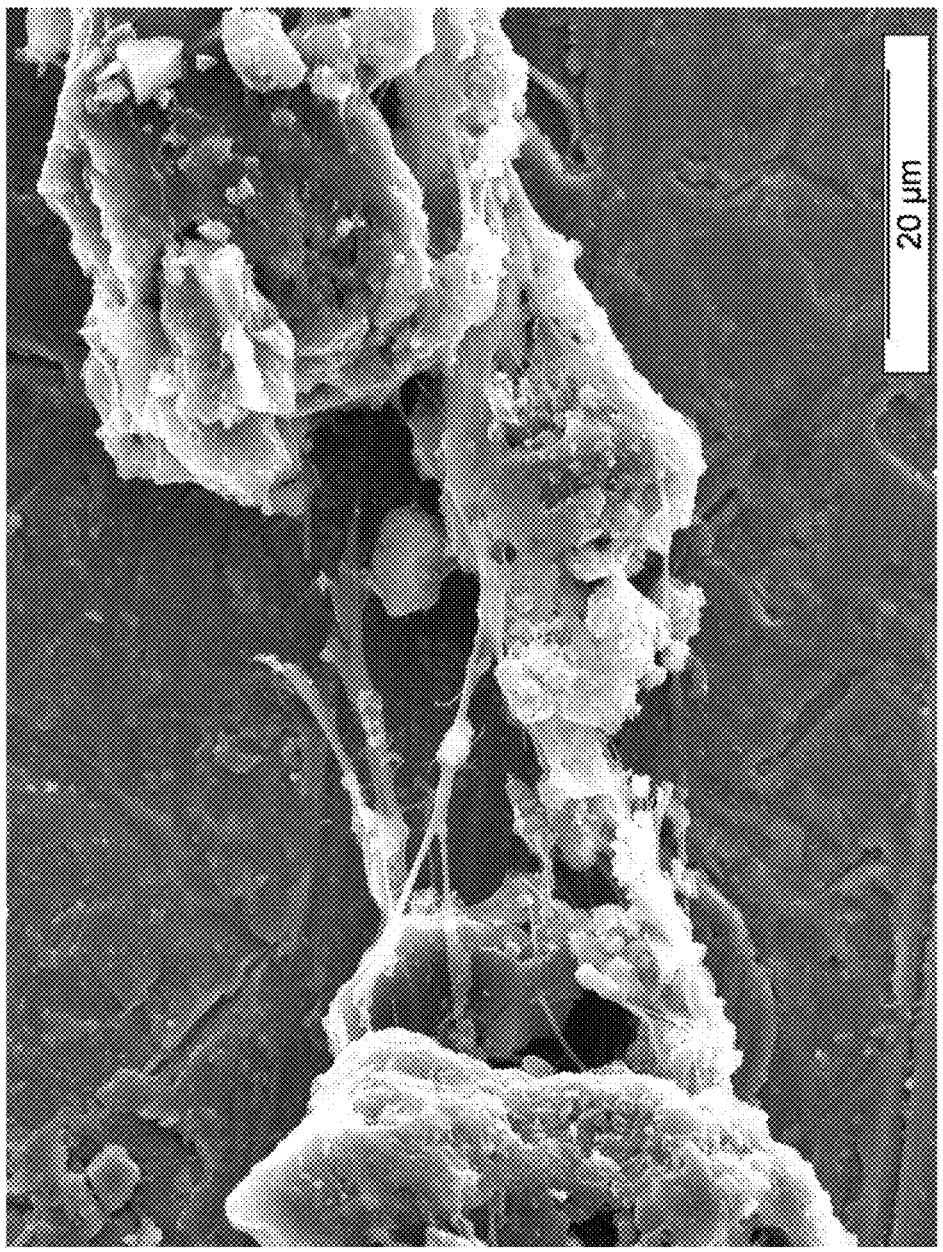
FIG. 3 is a micrograph of a xanthan/chitosan fibrillar aggregate including powdered activated carbon.

FIG. 3 is a micrograph of a fibrillar aggregate including powdered activated carbon and fibrils formed from xanthan and chitosan polymers having the carbon particles adhering to the fibrils.

Figure 4:
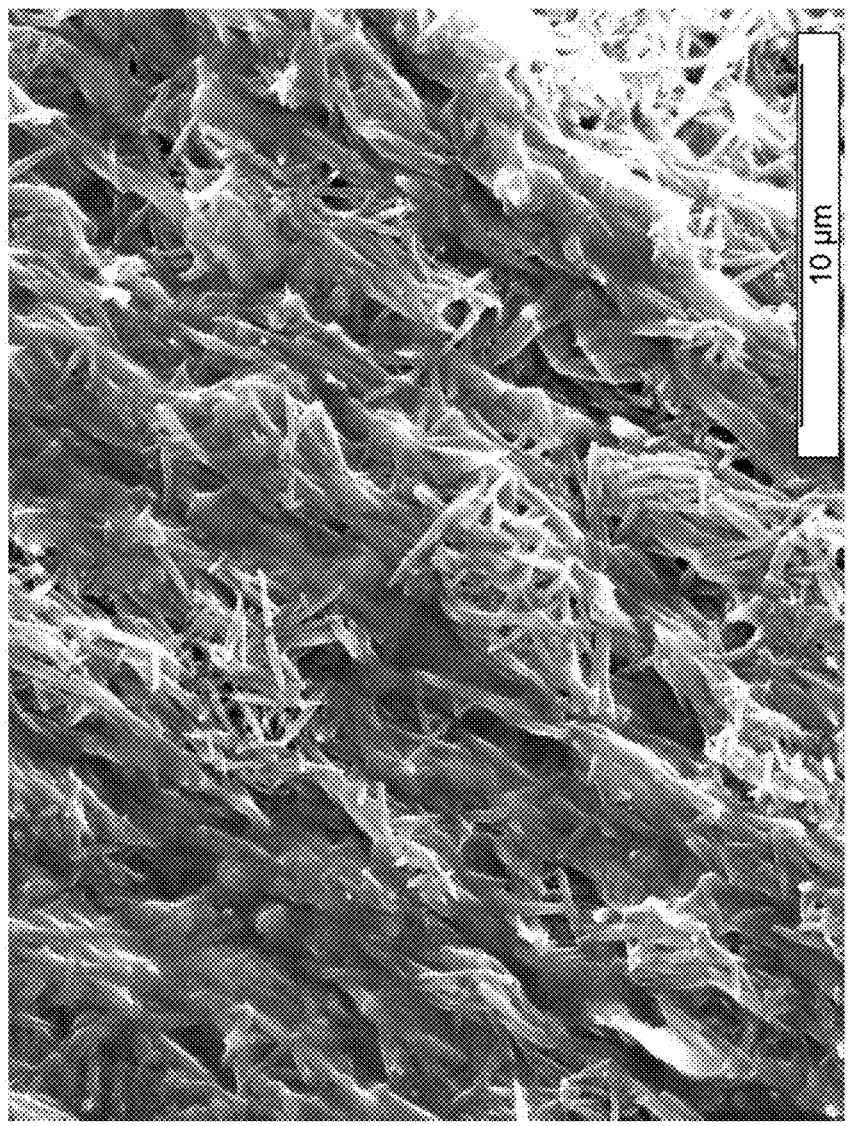
FIG. 4 is a micrograph of a xanthan/chitosan fibrillar aggregate including the rod-like cyanuric acid:melamine complex solids.

FIG. 4 is a micrograph of a fibrillar aggregate including the rod-like cyanuric acid:melamine complex solids and fibrils formed from xanthan and chitosan polymers having the particles adhering to the fibrils and in some cases wholly encasing the particles.

Figure 5:
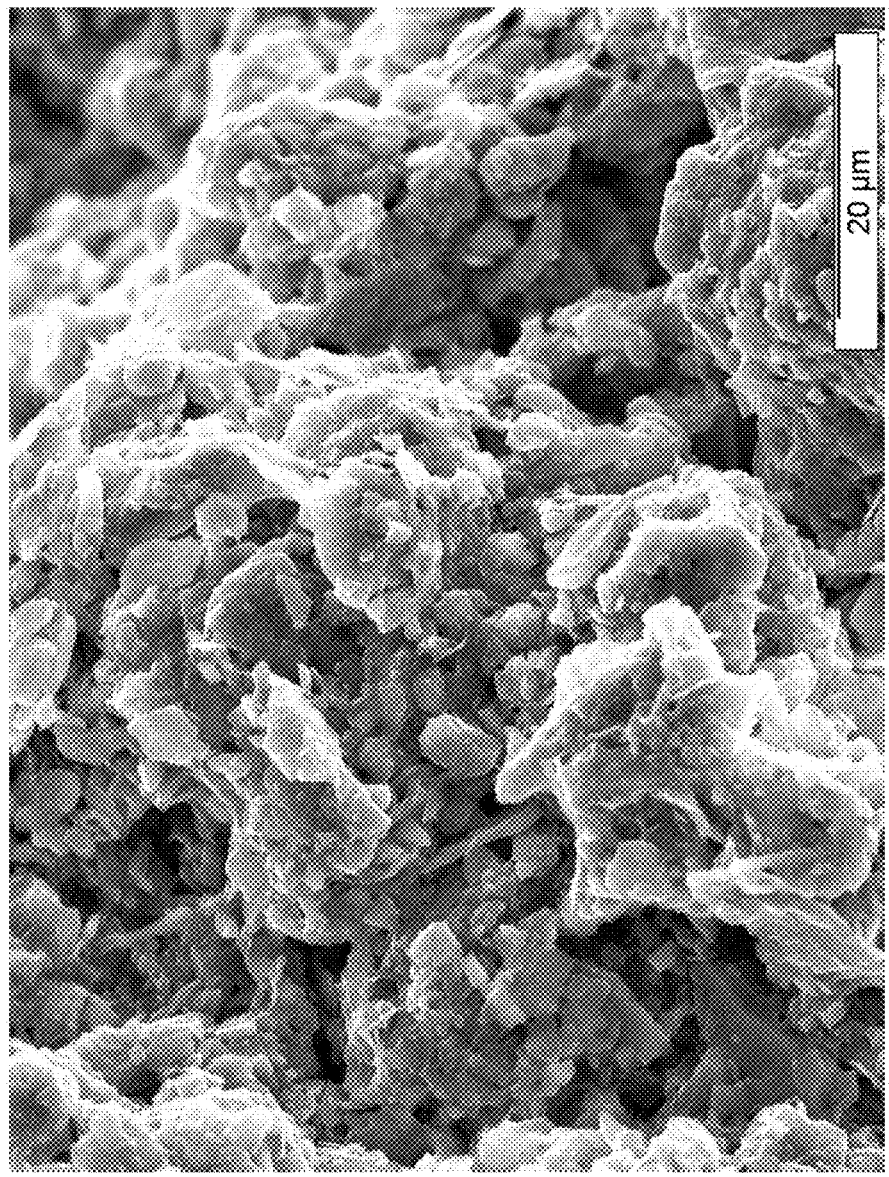
FIG. 5 is a micrograph of a xanthan/chitosan fibrillar aggregate including dirt at a high concentration.

FIG. 5 is a micrograph of a fibrillar aggregate including dirt at a high concentration. The solids content may need to be reduced for the fibrils to be evident. The fibrils are formed from xanthan and chitosan polymers having the dirt particles adhering to the fibrils.

Figure 6:
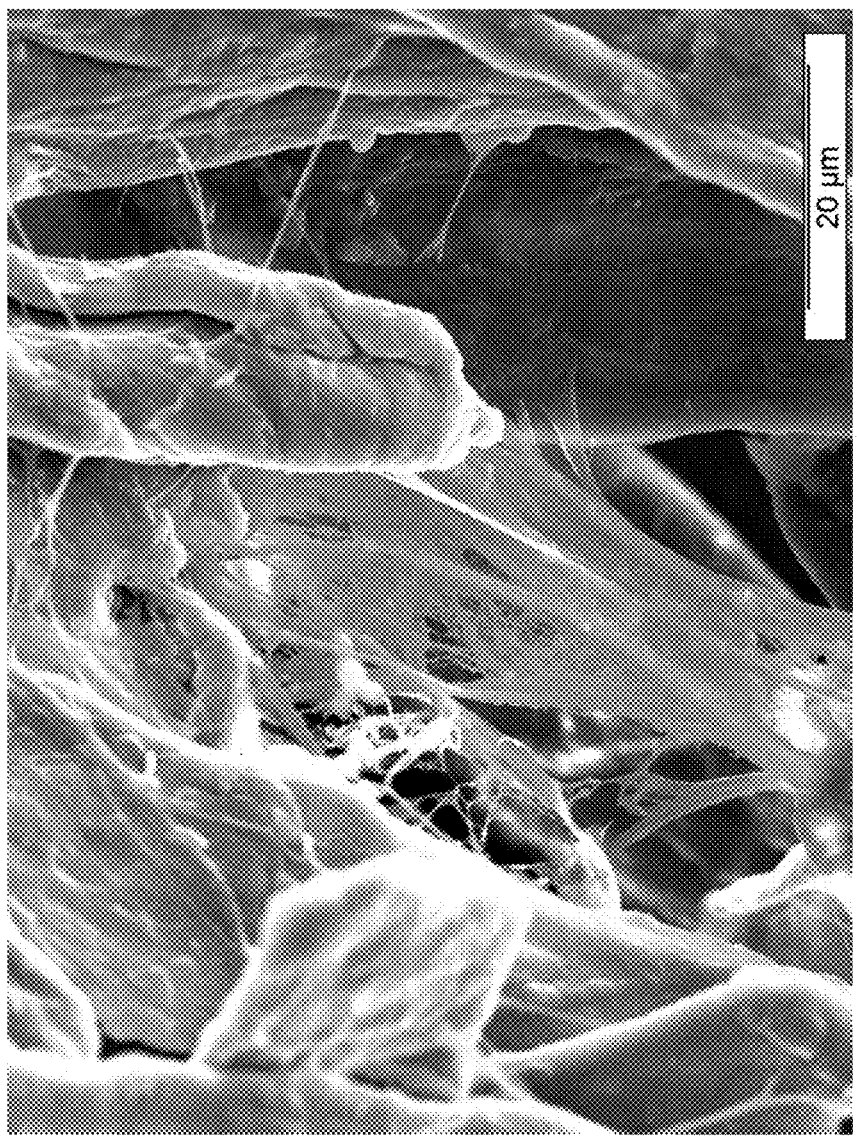
FIG. 6 is a micrograph of a xanthan/chitosan fibrillar aggregate including cellulose fibers.

FIG. 6 is a micrograph of a fibrillar aggregate including cellulose fibers and fibrils formed from xanthan and chitosan polymers adhering to the cellulose fibers.

Figure 7:
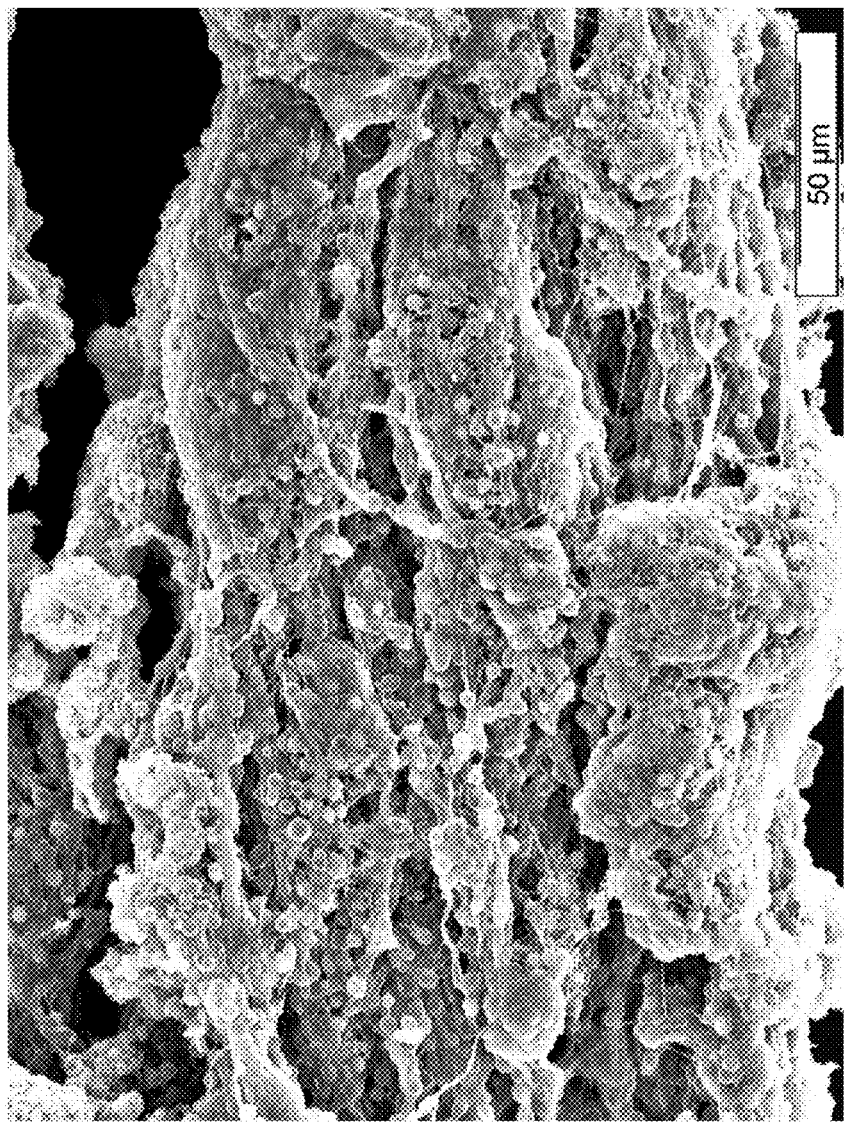
FIG. 7 is a micrograph of a xanthan/chitosan fibrillar aggregate including algae.

FIG. 7 is a micrograph of a fibrillar aggregate including microalgae and fibrils formed from xanthan and chitosan polymers having the algae adhering to the fibrils.

Figure 8:
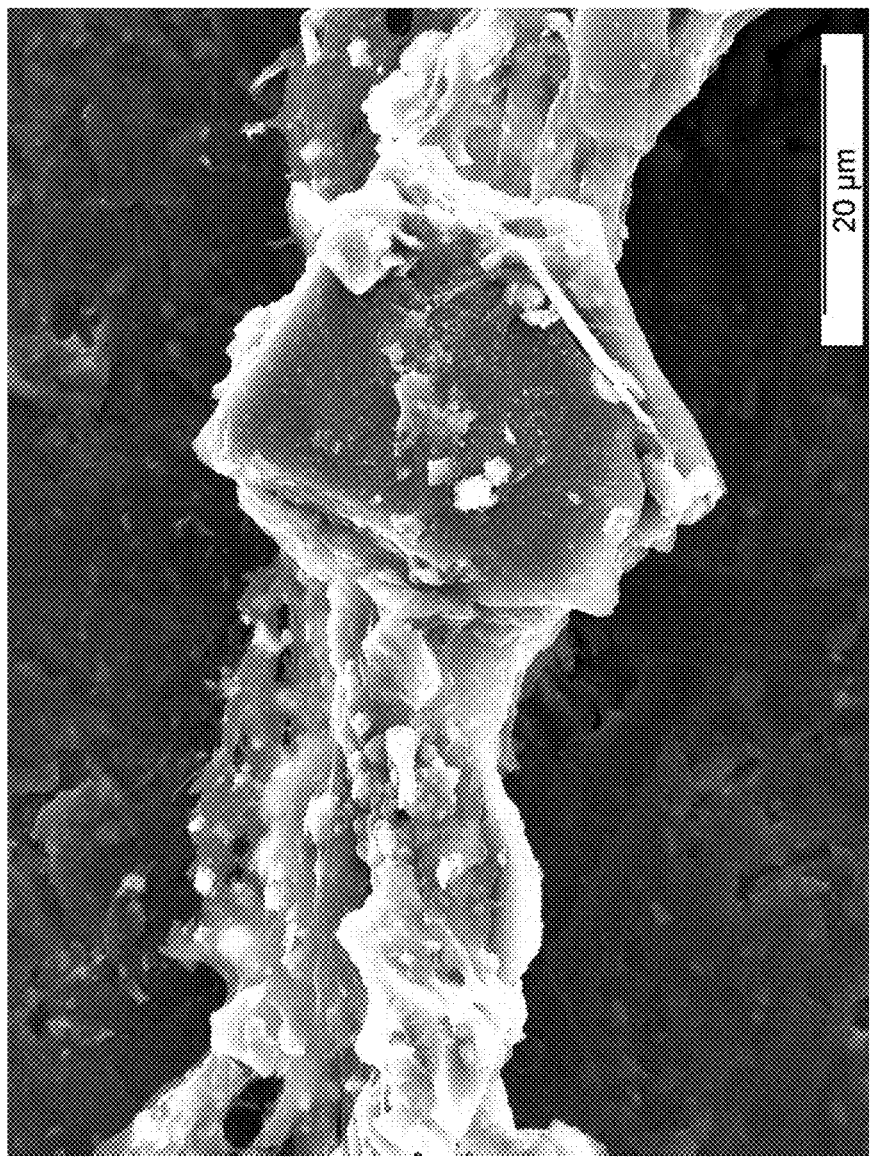
FIG. 8 is a micrograph of a xanthan/chitosan fibrillar aggregate including iron oxide hydroxide.

FIG. 8 is a micrograph of a fibrillar aggregate including iron oxide hydroxide and fibrils formed from xanthan and chitosan polymers having the iron oxide hydroxide particles adhering to the fibrils.

Figure 9:
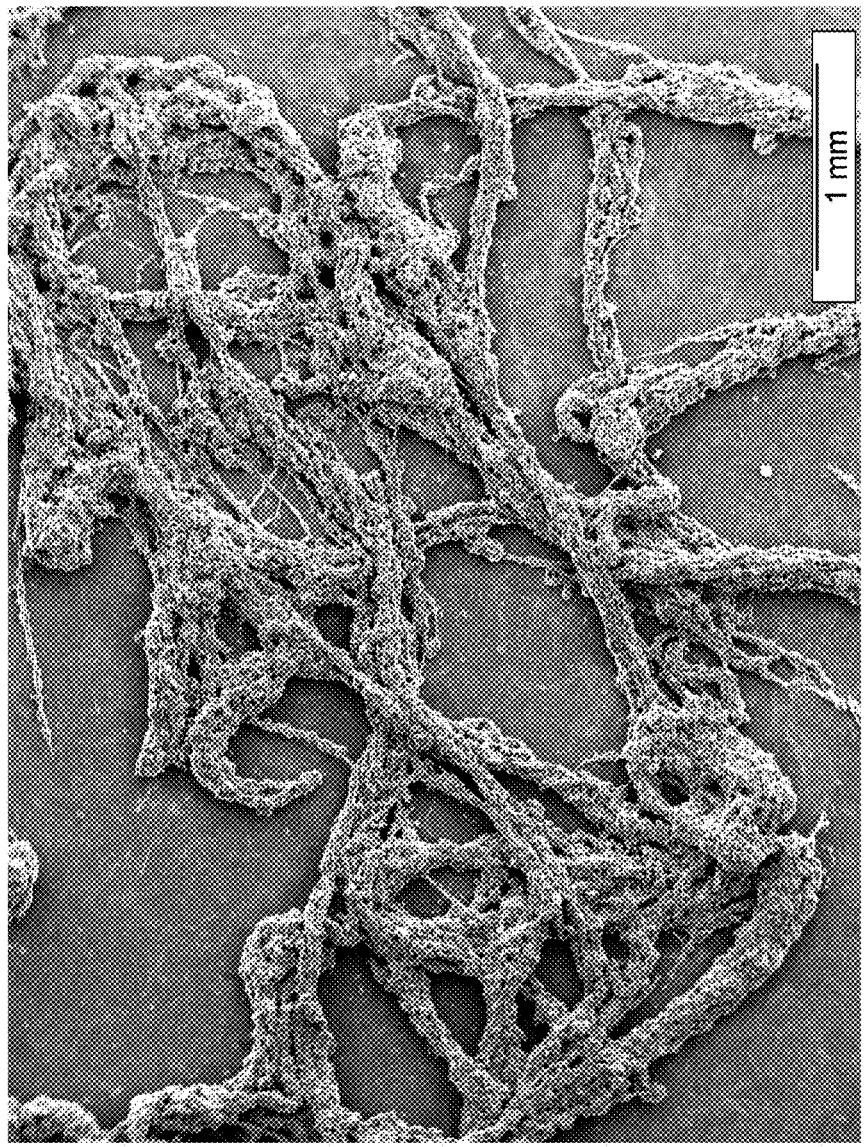
FIG. 9 is a photograph of a fibrillar aggregate including granular activated charcoal.
Figure 10:
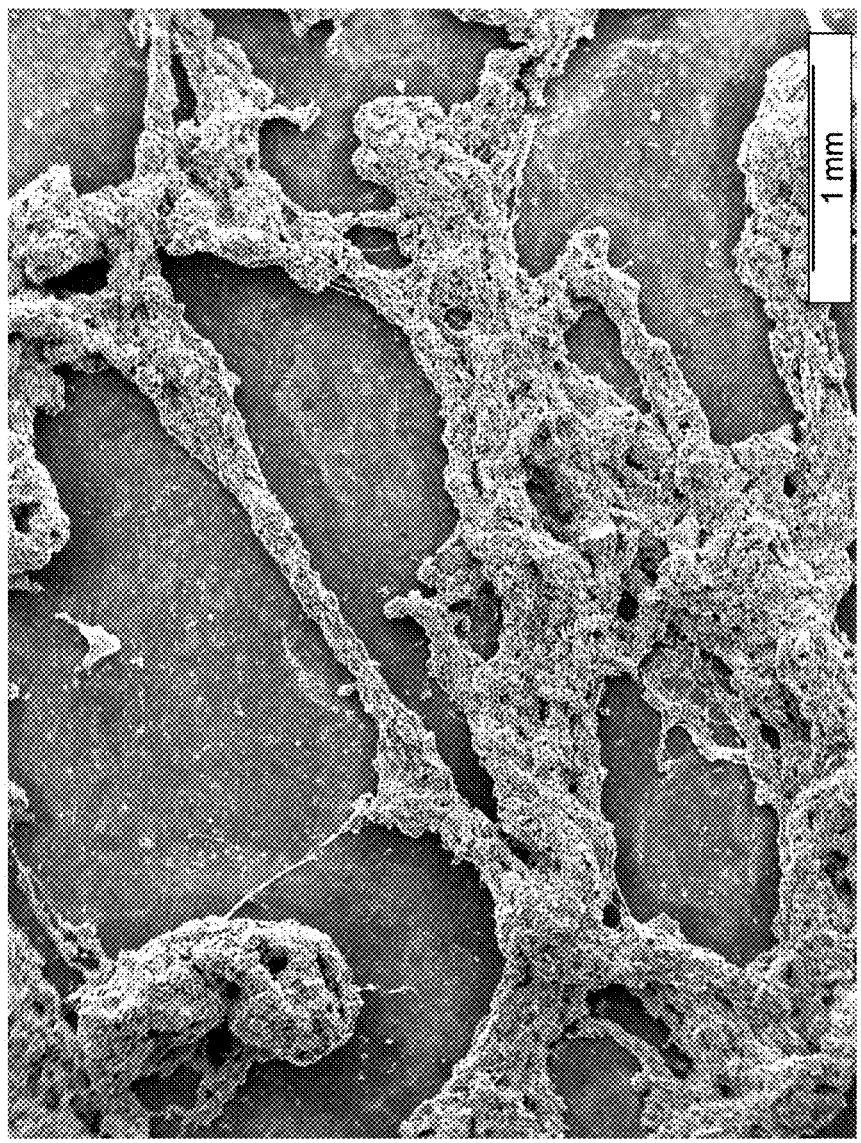
FIG. 10 is a photograph of a fibrillar aggregate including iron oxide hydroxide.
Figure 11:
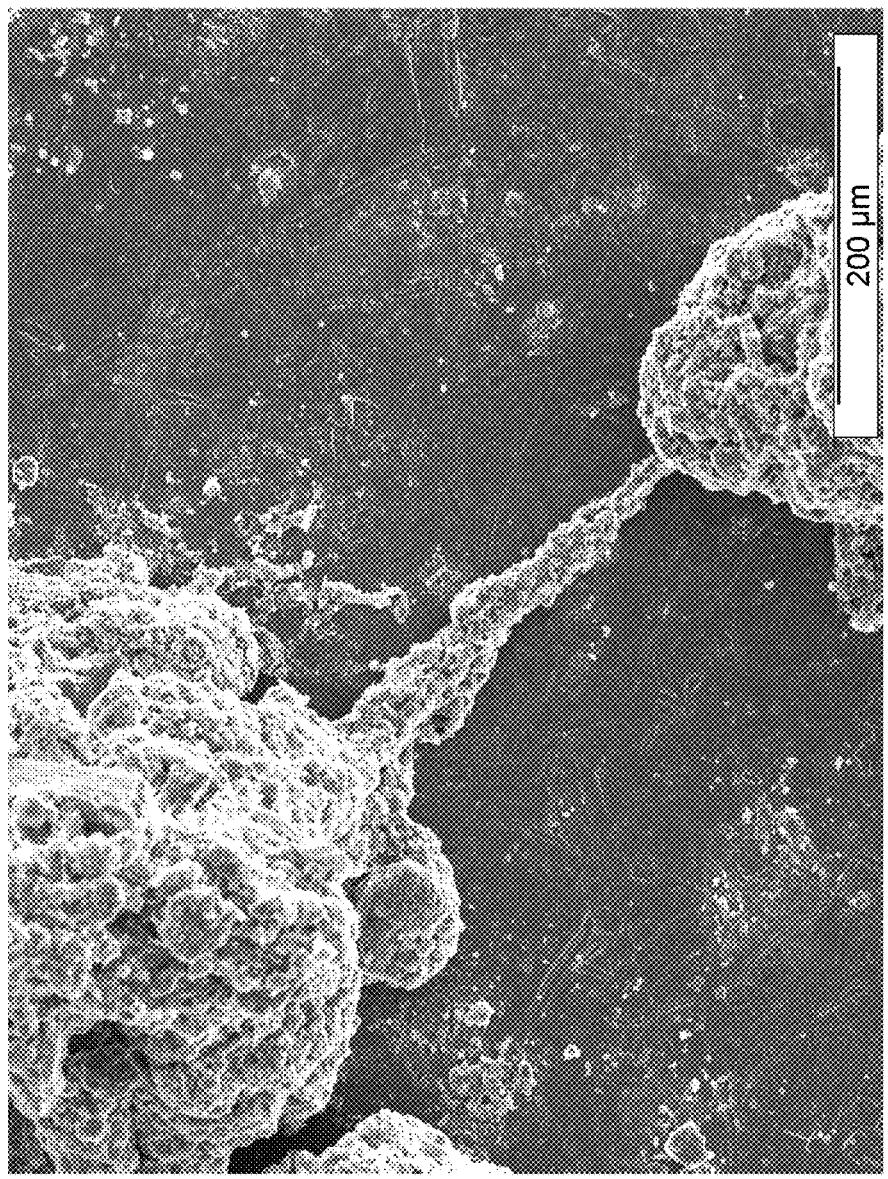
FIG. 11 is a photograph of a fibrillar aggregate including dirt.

FIG. 9 is a photograph of a fibrillar aggregate including granular activated charcoal fibers. FIG. 10 is a photograph of a fibrillar aggregate including iron oxide hydroxide fibers. FIG. 11 is a micrograph of a fibrillar aggregate including dirt fibers.

Figure 12A:
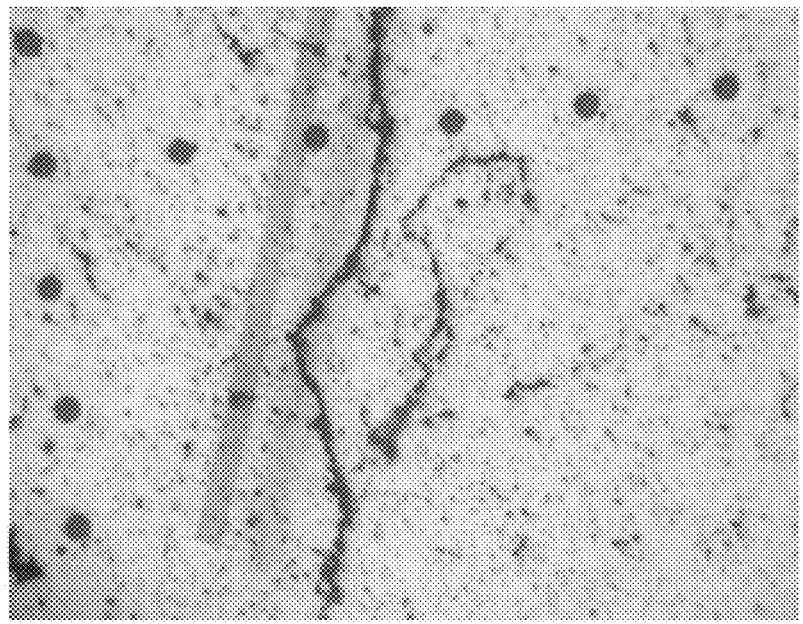
FIGS. 12A,B are photographs of a powered activated carbon aggregate fiber.
Figure 12B:
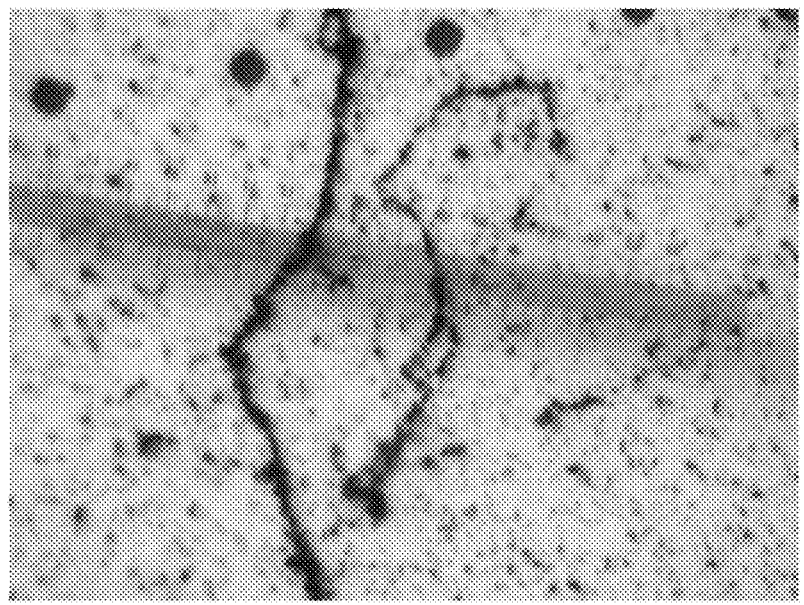

Fibrillar aggregates were prepared using 0.1 g of powdered activated carbon in 450 ml DI water and adding 20 ppm xanthan gum and 10 ppm chitosan. A fiber was isolated and is shown in FIGS. 12A and 12B. The fiber has a length of 1.4 mm and a width of 0.04 mm, for a length to width ratio of 35:1.

Figure 13A:
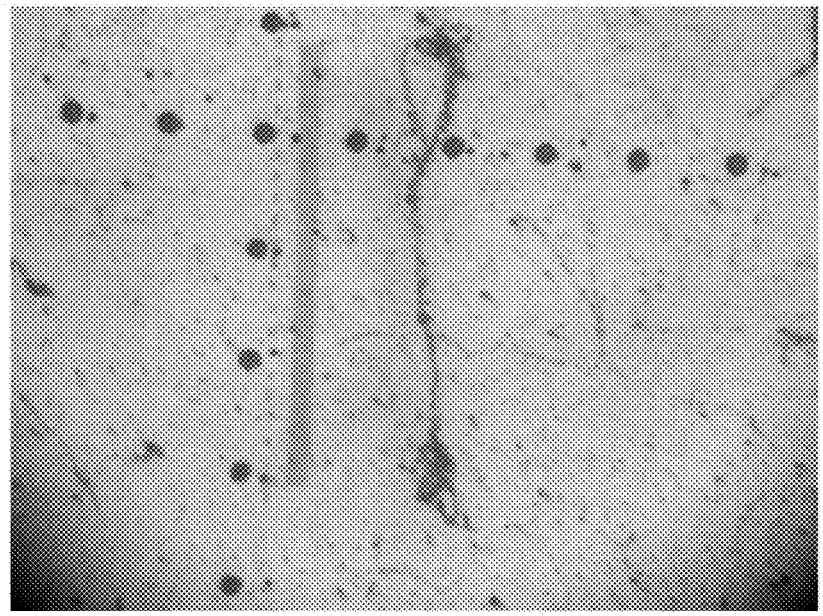
FIGS. 13A,B are photographs of an iron oxide hydroxide aggregate fiber.
Figure 13B:
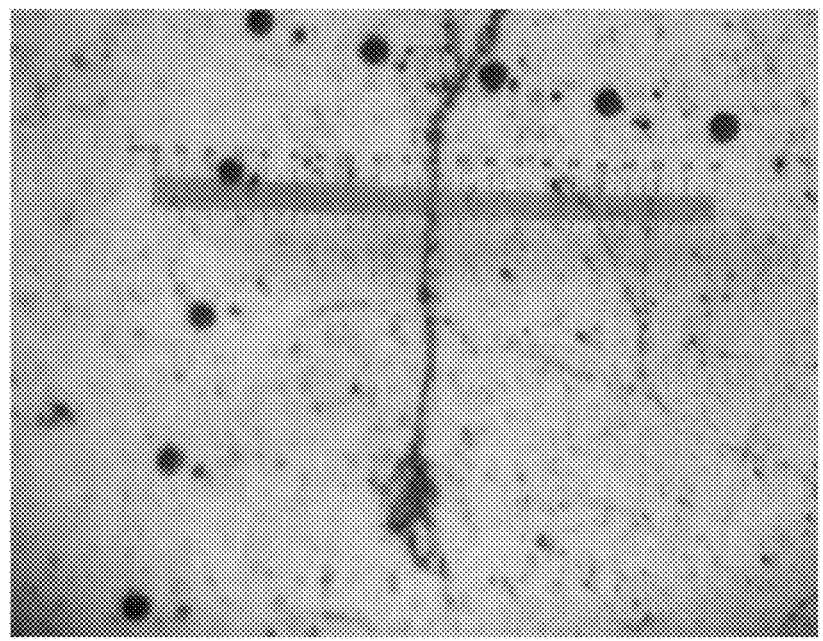

Fibrillar aggregates were prepared using 0.1 g of (−)120 mesh iron oxide hydroxide in 450 ml DI water and adding 20 ppm xanthan gum and 10 ppm chitosan. A fiber was isolated and is shown in FIGS. 13A and 13B. The fiber has a length of 2.6 mm and a width of 0.04 mm, for a length to width ratio of 65:1.

Figure 14A:
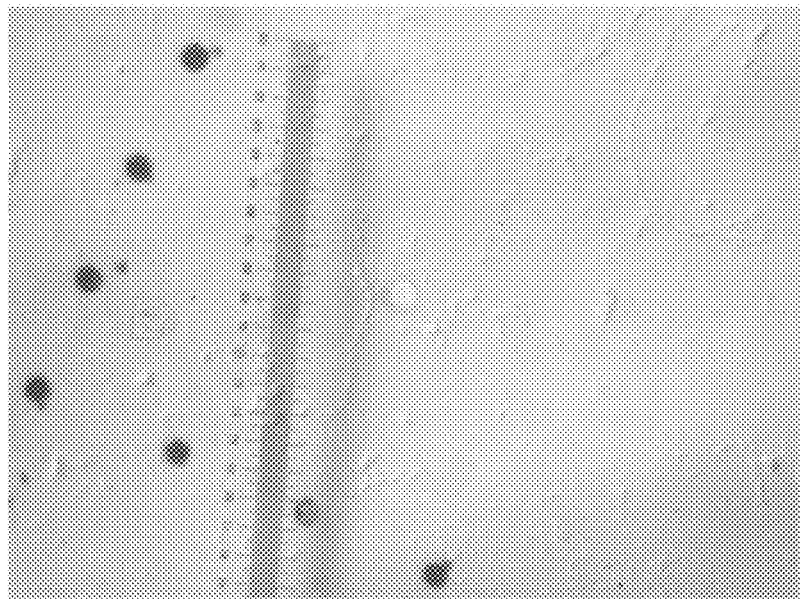
FIGS. 14A,B are photographs of a titanium oxide aggregate fiber.
Figure 14B:
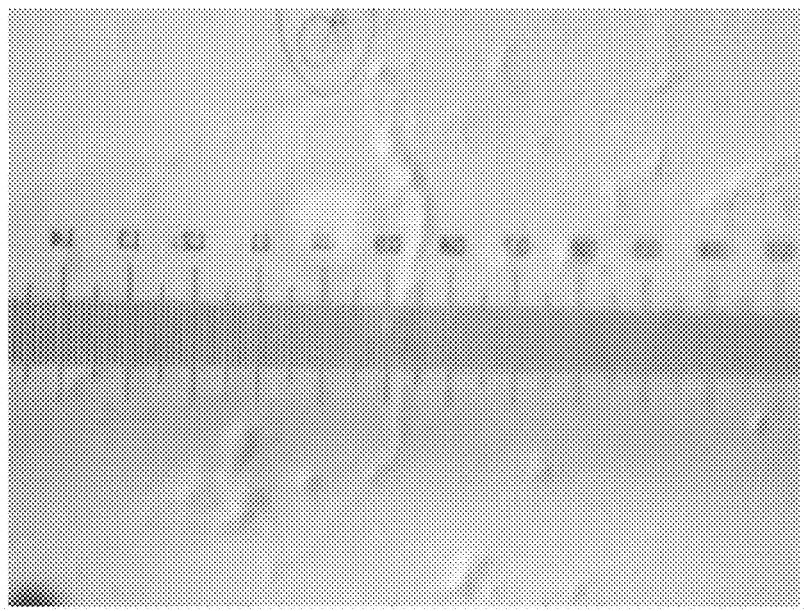

Fibrillar aggregates were prepared using 0.1 g of titanium dioxide in 450 ml DI water and adding 20 ppm xanthan gum and 10 ppm chitosan. A fiber was isolated and is shown in FIGS. 14A and 14B. The fiber has a length of 0.65 mm and a width of 0.04 mm, for a length to width ratio of 16.25:1.

Figure 15A:
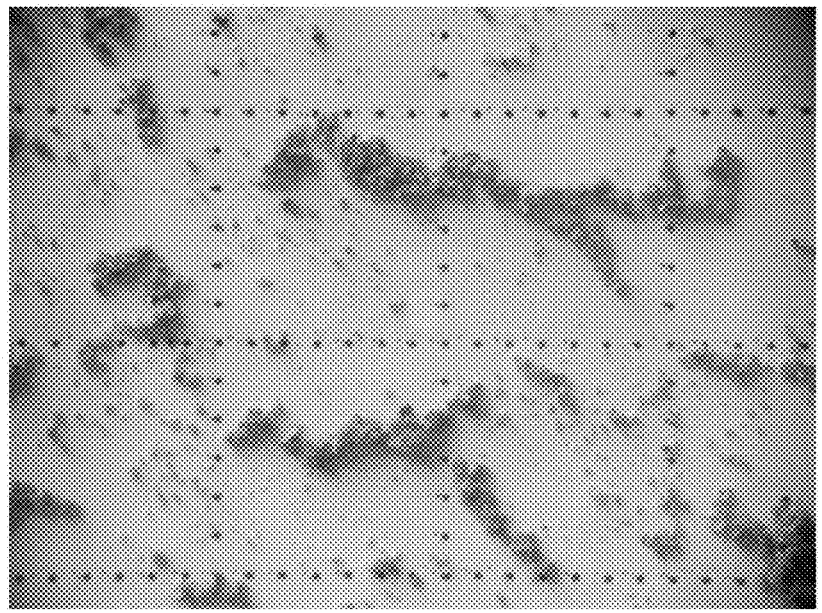
FIGS. 15A,B,C,D are photographs of Arizona clay aggregate fibers.
Figure 15B:
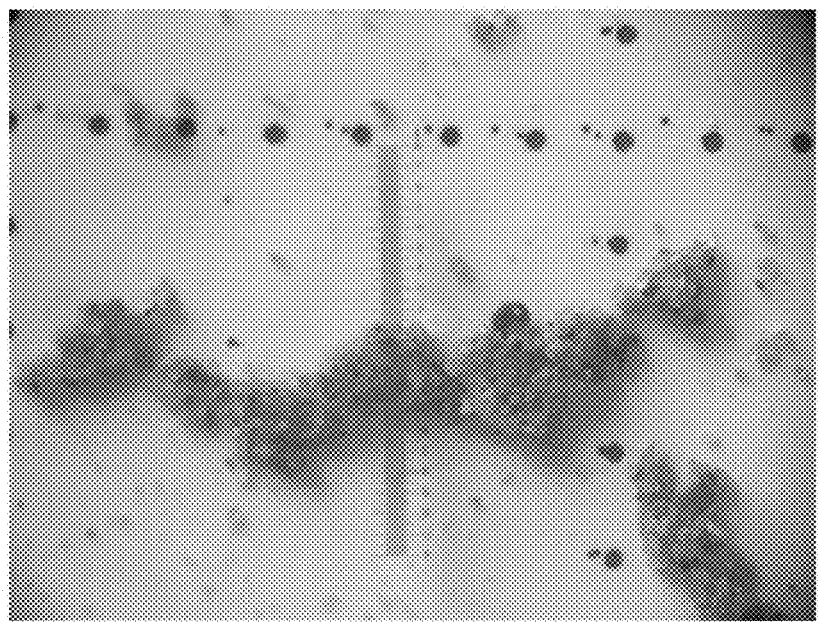
Figure 15C:
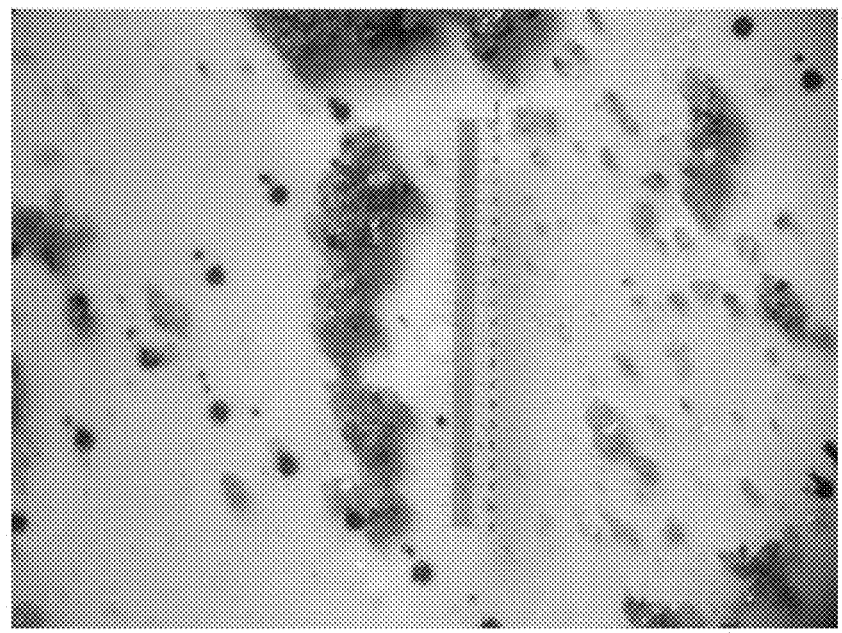
Figure 15D:
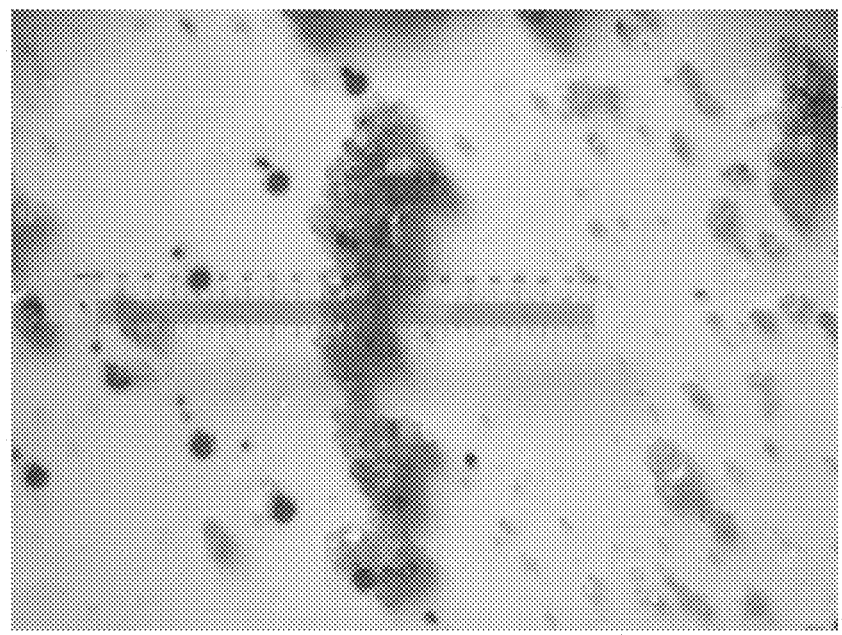

Fibrillar aggregates were prepared using 5.8 g of Arizona clay in 450 ml DI water and adding 20 ppm xanthan gum and 10 ppm chitosan. A first fiber was isolated and is shown in FIGS. 15A and 15B. The first fiber has a length of 4 mm and a width of 0.4 mm, for a length to width ratio of 10:1. A second fiber was isolated and is shown in FIGS. 15C and 15D. The second fiber has a length of 2 mm and a width of 0.25 mm, for a length to width ratio of 8:1.

Figure 16A:
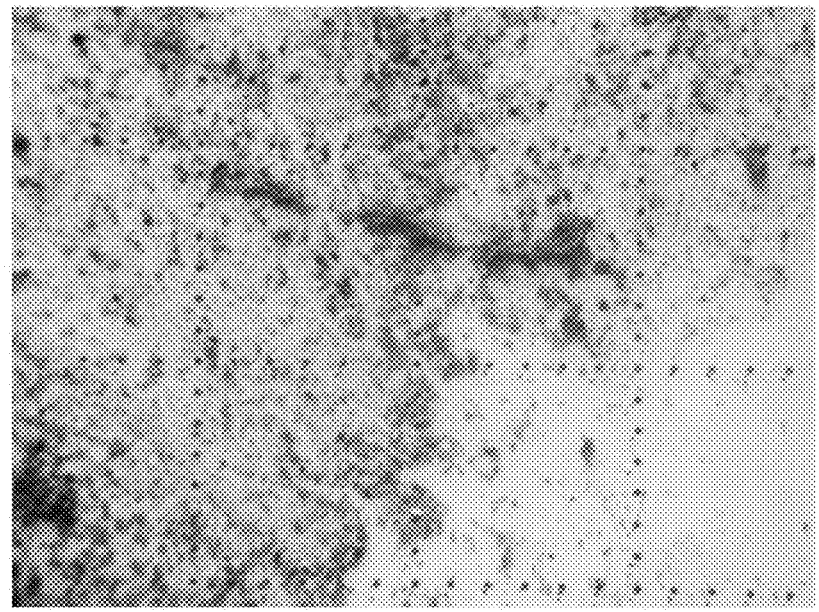
FIGS. 16A,B are photographs of Mature Fine Tailings aggregate fiber.
Figure 16B:
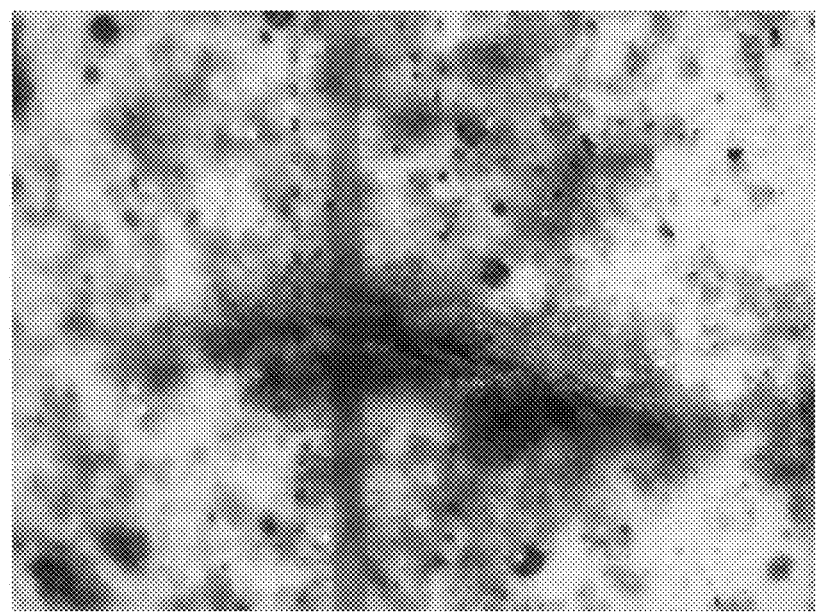

Fibrillar aggregates were prepared using 1 ml of 30% Mature Fine Tailings solids in 9 ml of DI water and adding 300 ppm of xanthan gum and 175 ppm of chitosan. A fiber was isolated and is shown in FIGS. 16A and 16B. The fiber has a length of 5.5 mm and a width of 0.4 mm, for a length to width ratio of 13.75:1.

Figure 17:
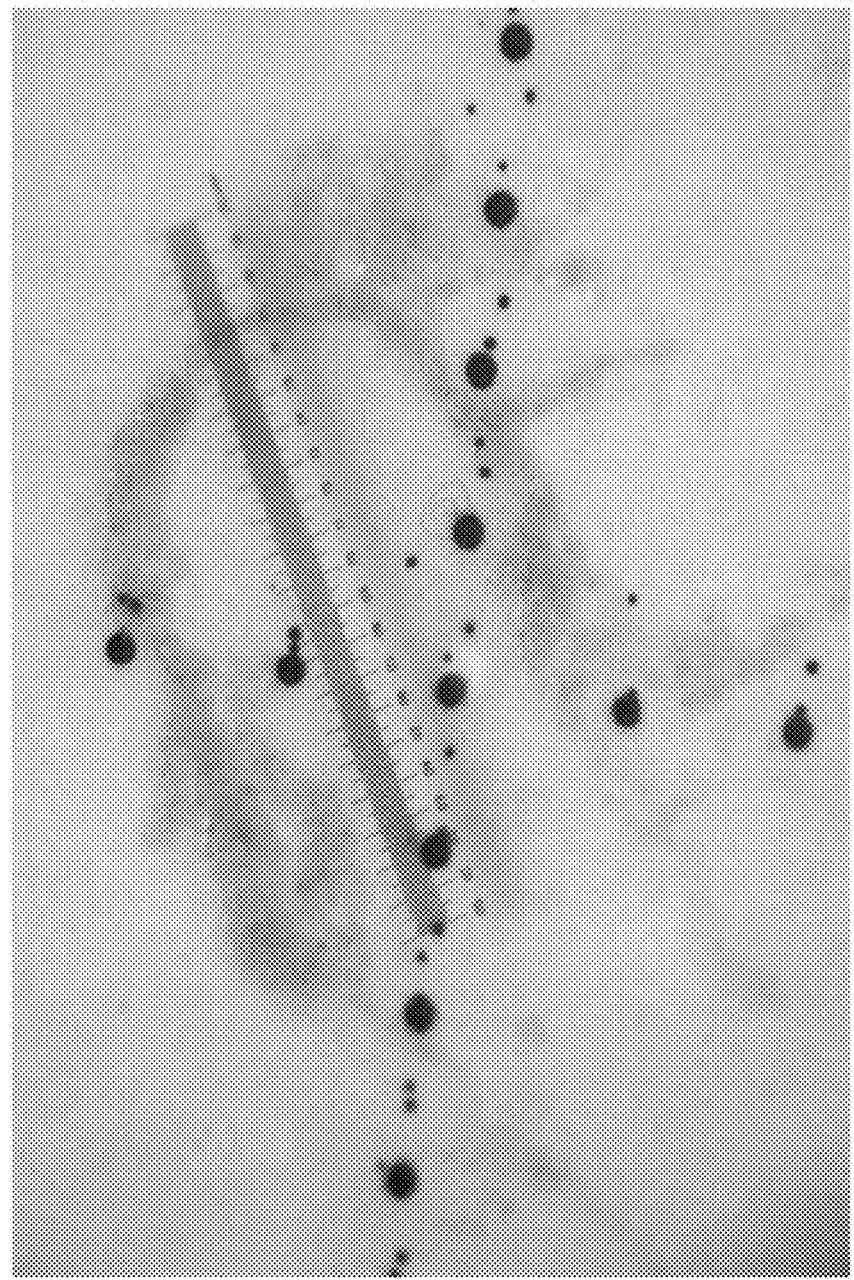
FIG. 17 is a photograph of an algae aggregate fiber.

Fibrillar aggregates were prepared using 450 ml of an algae solution and adding 40 ppm xanthan gum and 20 ppm chitosan. A fiber was isolated and is shown in FIG. 17. The fiber has a length of 3.4 mm and a width of 0.03 mm, for a length to width ratio of 113:1.

The above FIGURES demonstrate fibers from fibrillar aggregates can have lengths ranging from about 0.5 mm to about 6 mm or from about 0.65 mm to about 5.5 mm. Widths can range from about 0.02 mm to about 0.5 mm or from about 0.03 mm to 0.4 mm. Length to width ratios can range from 5:1 to 200:1 or from 8:1 to 113:1. However, there is variability in the length and width even among fibers from the same fibrillar aggregate. Furthermore, the fibrillar aggregates can have a size to be to be retained on a sieve having pores of 2 mm, or on a sieve having pores of 850 µm or greater, or on a sieve having pores of 100 µm or greater. Therefore, the size of the fibrillar aggregates can range from greater than 100 µm to greater than 2 mm.

The overall size of the fibrillar aggregates appears to be dependent on the amounts of the anionic and cationic polymers used. At lower doses of the anionic and cationic polymers, the aggregates can have a size starting in the range of about 100 µm and keep growing the more that one uses more of the anionic and cationic polymers. At higher doses, the fibers become tightly bound and can be difficult to discern. The fibers can be separated from the aggregate by inducing high turbulent conditions, such as violent shaking. In both the small and larger aggregates, a fibrillar structure is believed to occur with large fibers and small fibrils.

The fibrillar aggregates formed in block 110 can be collected and removed in block 112.

In block 112, a step is provided for collecting and/or removing the fibrillar aggregates from the aqueous media. The fibrillar aggregates include the anionic polymer or polymers, the cationic polymer or polymers, and the insoluble particle that was provided in step 104, if performed, or the insoluble particle or immiscible liquid or other substance initially present in the aqueous media in step 102. The aggregate may include additional components depending on the aqueous media being treated that may or may not be the target for removal. The advantage to creation of a cohesive aggregate comprising the anionic and cationic polymers is that it allows the aqueous media to be filtered through a coarse filter or screen and the like that can be made of metal, plastic, synthetic or natural materials. The aggregate is trapped on the screen and the aqueous media passes through the filter or screen, after which the aqueous media contains a reduced amount of the contaminant/pollutant substance. Because of the large and highly cohesive nature of the aggregates that are formed by the disclosed method, a high flow rate of filtration can be achieved resulting in higher efficiencies compared to merely flowing the aqueous media over a fixed bed of removal media. The aqueous media containing the aggregate can also be piped into a flexible bag such as a geotextile tube whereby the aggregate is contained within the tube, and the aqueous media free of the aggregate flows through the pores of the flexible tube to the outside of the tube, where it is collected or allowed to flow into the environment free of contaminant/pollutant substances. Alternatively, the aggregate could be allowed to settle by gravity within a collection basin or containment device, and the upper clear water or aqueous media could be transferred to another vessel or containment device leaving the settled aggregate at the bottom of the first containment device. The settled aggregate can then be separated from the water or aqueous media. Alternatively, the aggregate can be separated by centrifugation. The large aggregates formed using the disclosed method are easily removed by membrane filtration using synthetic or non-synthetic porous, woven or non-woven membranes. The physicochemical nature of the aggregates and water-holding capacity of the large aggregates formed provide the ability to separate the aggregates from the aqueous media by membrane, sand, or diatomaceous earth filtration without significant blinding of the filtration membrane or generation of high backpressures that require frequent backwashing. There are a plurality of devices and systems for the removal of the fibrillar aggregates. The following list is meant to be illustrative and not exhaustive.

In one embodiment, the aqueous media containing the suspended particles and/or water immiscible material can be contained inside of a vessel or container to which the sequential or otherwise, addition of the anionic polymer or polymers, and the cationic polymer or polymers is performed. The large stable fibrillar aggregates that form, appearing to exhibit high solids to liquid ratios, can be separated by decantation of the aqueous media or filtration through a porous screen, sand filter, or soft or hard filtering device containing pores. The recovered aqueous media can be recycled for further use in processing.

In one embodiment, the large aggregates that form may be removed from the aqueous media by membrane filtration using woven and/or nonwoven synthetic or non-synthetic porous materials without significant blinding of the membrane(s). The advantages offer reduced membrane cleaning and longer life. This method could be applied to membrane filtration used in desalination processes and/or hollow fiber membrane filtration used in microfiltration and/or ultrafiltration processes for reclamation of water for irrigation, potable drinking, oil/gas fraccing, industrial processes, wastewater discharge, construction water discharge to the environment, dredging water discharge.

It another embodiment, the large aggregates that form from fines generated by dredging operations can be separated from the aqueous media by sand filtration and/or diatomaceous earth filtration, or by filtration through a porous geotextile bag made of woven or nonwoven synthetic or natural materials, following which the clarified aqueous media can be discharged into environmentally sensitive areas.

In another embodiment, the anionic and cationic polymers may be added to a flowing stream of aqueous media containing the substance to be removed, the suspended particulate and/or water immiscible material. The polymers are added or continuously metered into the aqueous stream upstream from the addition of the chitosan that can also be continuously metered into the aqueous stream. The large aggregates that form in the aqueous stream can be collected downstream in a settling pond or detention pond. Alternatively, the aggregates can be separated from the aqueous media through a containment device such as a porous fabric bag made of a geotextile material. An example is the TenCate Geotube dewatering system. The aqueous stream containing the large stable aggregates can be directed into the Geotube dewatering container and solids retained within while the aqueous stream passes out through the pores where it can be discharged into the environment or collected for reuse.

In another embodiment, the anionic and cationic polymers are separately contained within a porous device such as, the porous segmented devices described in U.S. Pat. No. 6,749,748 and U.S. Pat. No. 6,821,427, both incorporated herein expressly by reference. Each device containing either the anionic or the cationic polymer can each be positioned and anchored inside of a plastic or steel pipe wherein the device containing the anionic polymer is located upstream of the device containing the cationic polymer, or alternatively, in reverse order. The aqueous stream containing the substance to be removed, the suspended solids and/or water immiscible liquid or substances can be directed into the pipe where it first passes over and through the device containing the xanthan; and after passing over and through the device containing the anionic polymer, it then passes over and through the device containing the cationic polymer that is also contained downstream inside the same pipe, or alternatively, in reverse order. The aqueous treated stream can then be directed into a holding pond, tailing pond, porous or non-porous containment vessel or recirculated back into the original aqueous media containing the suspended solids and/or water immiscible material after separation of the aggregates, or the aqueous media can be discharged directly into the environment. The aggregates formed within a pipe can be separated from the aqueous media by settling within the tailing pond or holding pond or nonporous containment vessel, or filtered out through the porous containment vessel, or allowed to settle out in a biofiltration zone after the aqueous media is discharged into the environment.

In another embodiment, the aqueous media containing the substance to be removed, the suspended particulate and/or water immiscible material is contained within a swimming pool or recreational body of water such as a water park, pool or a freshwater or saltwater aquarium to which the sequential, or otherwise, addition of the anionic and cationic polymers are added through a metering pump following a determined dosing schedule. The aggregates that form following treatment are comprised of water-immiscible substances such as body oils, suntan lotions, and other suspended particulate matter can be separated by filtration through sand, synthetic fabric cartridge or diatomaceous earth filtration through a porous screen, sand filter or soft, or hard filtering device containing pores. The filtered aqueous media is returned back to the swimming pool, water park pool or aquarium.

In another embodiment, the aqueous media containing the substance to be removed, the suspended particulate and/or water immiscible material is contained within a water feature or fountain to which the sequential, or otherwise, addition of the anionic and cationic polymers are added through a metering pump following a determined dosing schedule or dosed in sequence on a schedule manually. The aggregates that form following treatment can be separated by filtration through sand, synthetic fabric cartridge or diatomaceous earth filtration or simply allowed to settle to the bottom of the feature. If filtered, the filtered aqueous media is returned back to the fountain or water feature.

In another embodiment, the aqueous media can contain microalgae as the suspended particles to which the sequential, or otherwise, addition of the anionic and cationic polymers are added through a metering pump following a determined dosing schedule or dosed in sequence on a schedule as part of an algae harvesting application. The large aggregated masses of microalgae that rapidly form following treatment, can be separated by filtration, skimming from the aqueous media, scooping up with a fine mesh net, and/or screening from a rotating screener. The aqueous media can be recycled back to the original container or treated in other ways or discharged into the environment. The harvested algae can be further processed for extraction of lipids to be used for biodiesel or extracted for isolation of nutrients used for animal or fish consumption. The harvested algae could also be used as biomass for energy production or ethanol production.

Figure 2:
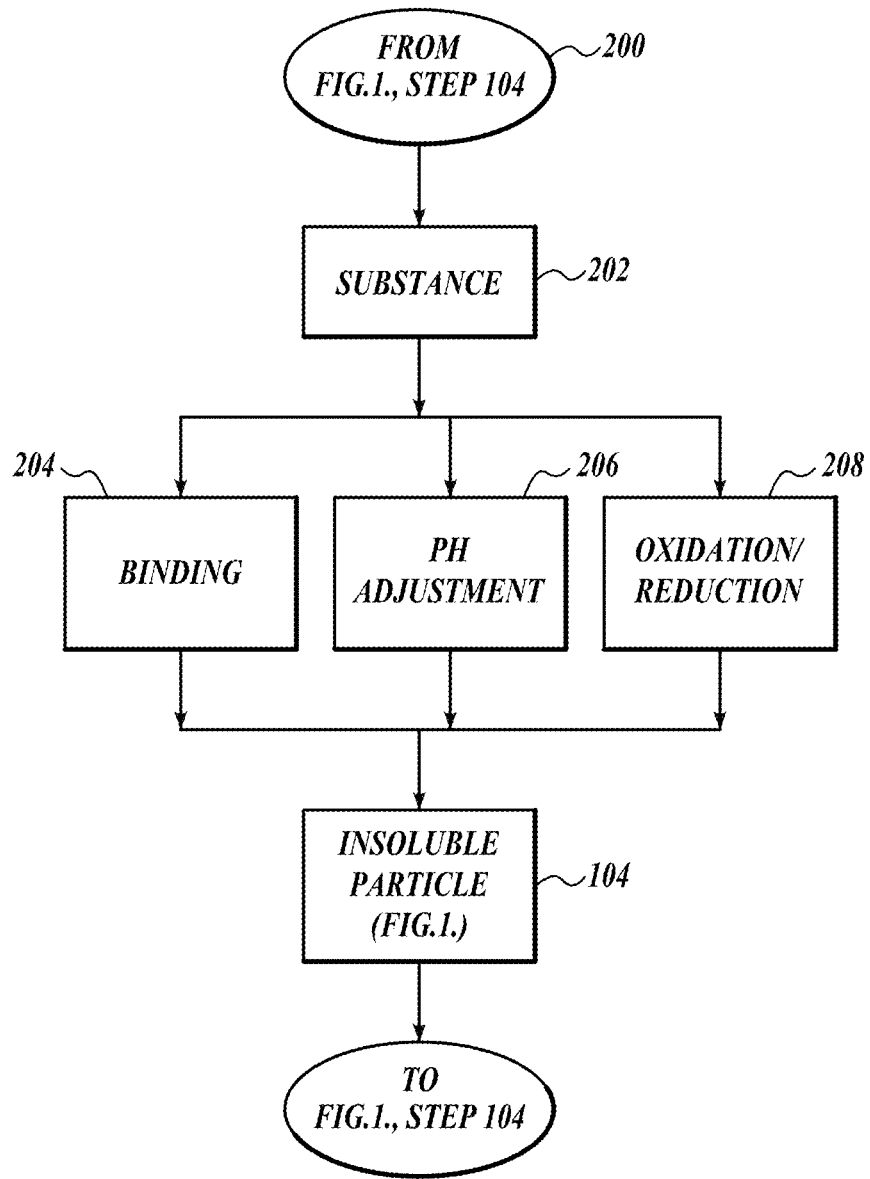
FIG. 2 is a flow diagram of a method in accordance with one embodiment of the invention.

Referring to FIG. 2, a method is illustrated for providing an insoluble particle from substances to be removed and/or collected, including, but not limited to, water soluble substances, water miscible liquids, water immiscible liquids, and insoluble or partly soluble substances. As described above, the disclosed method may remove substances initially dissolved in the aqueous media by first treating the soluble substance to provide an insoluble particle. The disclosed method may also remove insoluble substances initially present in the aqueous media by first treating the soluble substance to provide an insoluble particle that is more likely to be aggregated with the anionic and cationic polymers, such as combining submicron particles to other particles to create a bigger target for removal. The disclosed method may remove substances, such as miscible and immiscible liquids in the aqueous media by first treating the liquid to create an insoluble particle. The method to treat substances before treatment with the anionic and cationic polymers starts in block 200. From block 200, the method enters block 202. The purpose of block 202 is to identify one or more substances, as soluble, insoluble, miscible, immiscible, or small that are desired to be removed. Once the substance is identified, there are materials that can bind with the substance or processes performed on the substance to provide an insoluble particle that is more readily aggregated by the anionic and cationic polymers. From block 202, the method can enter one of three steps, 204, 206, and 208. Each of the steps of blocks 204, 206 and 208 discloses a process that can be used for creating or providing an insoluble particle. However, other processes for providing insoluble particles may also be used. Depending on the substance desired to be removed, a different step selected from blocks 204, 206, and 208 may be entered. Also, more than one process may be used. For example, a substance may be oxidized or reduced while still remaining a soluble substance, and oxidation or reduction can be followed by binding to provide an insoluble particle. There is no limit on the number of processes that may be performed on a substance to provide an insoluble particle.

Referring to block 204, a process for providing insoluble particles from a substance is through binding to removal media. Binding includes, but is not limited to, adsorption, ionic bonding, hydrogen bonding, covalent bonding, etc. While soluble or insoluble substances, miscible or immiscible liquids, or small particles alone may not be aggregated adequately with the treatment of the anionic and cationic polymers, the soluble or insoluble substance, miscible or immiscible liquid, or small particle can be readily removed from the aqueous media when bound to removal media first, wherein the combination of the soluble or insoluble, miscible or immiscible, or small substance combined with the removal media can be aggregated by the anionic and cationic polymers. Removal media as used herein refers to any compound or material to which a substance binds. Removal media may include insoluble or soluble compounds, provided that the soluble removal media compound combined with a soluble substance, miscible or immiscible liquid results in an insoluble particle.

Removal media, include, but are not limited to adsorbents, carbon, powdered activated carbon, granular activated carbon, activated carbon impregnated with sulfur or iodine, sulfurized carbon, charcoal, melamine, rice husk ash, bone char, bone meal, bone black, wood, sawdust, lignite, peat, coconut shells, metal oxides (such as iron oxide hydroxides and ferric hydroxide), carbonyl iron powder, cellulose, ion exchange resins, lanthanum carbonate, lanthanum chloride, zirconium carbonate, lanthanum oxide, zirconium oxide, cerium oxide, cerium carbonate, lanthanum sulfate, zirconium sulfate, zeolites, zero valent iron zeolites, surfactant modified zeolites, combinations of crushed zeolite and limestone, diatomaceous earth, phyllosilicates such as vermiculite, amorphous volcanic glass such as perlite, etc. The treatment of the soluble or insoluble substance, miscible or immiscible liquid, or small particle of block 202 can occur with one removal medium or more than one removal media to provide the insoluble particle of block 104. Also, more than one soluble or insoluble substance, miscible or immiscible liquid, or small particle can be treated with one or more of the removal media. Removal media described above, such as powdered carbonaceous material or metal oxides, that exhibit a fine particle size (high surface area including both microporous and macroporous material) can be added to an aqueous media containing the soluble or insoluble substance, miscible or immiscible liquid (could be considered a contaminant or pollutant), or small particle. The contaminant/pollutant adsorbs or otherwise bonds to the powdered fine suspended removal media and the removal media containing the bound contaminant/pollutant substance can then be aggregated with the use of the anionic and cationic polymers.

Representative substances that are candidates for adsorption or bonding to one or more removal media include, but are not limited, to hydrocarbons such as oils, BTEX (benzene, toluene, ethylbenzene, and xylene compounds) aromatic hydrocarbons, phenol, halogenated substances, fluoride, volatile organic compounds (including but not limited to acetone, bromoform, methyl ethyl ketone, carbon tetrachloride, chloroform, carbon tetrachloride, dibromomethane, 2-Hexanone, bromomethane, chloromethane, 1,1,1,2-tetrachloroethane, perchloroethylene, vinyl chloride, PCB's (polychlorinated biphenyls), organochlorine hydrocarbons, biocides, glutaraldehyde, N,n-dimethyl formamide, borate salts, polyacrylamide, mineral oil, hydroxyethylcellulose, ammonium bisulfate, ethylene glycol, pesticides including 2,4-D, 2,4,5-T, volatile chlorinated organics (PCE, TCE, cis-DCE and VC), mercury (various forms including mercury II, methylmercury), and nonvolatile compounds, such as bromates.

Granular or powered activated carbon as the removal media may be added to water to adsorb substances such as, but not limited to, oils, BTEX (benzene, toluene, ethylbenzene, and xylene compounds) aromatic hydrocarbons, phenol, halogenated substances. Petroleum products, including but not limited to benzene, benzene derivatives, chlorinated benzene derivatives, ethylene, ethylbenzene, toluene, xylenes, diesel range organics and gasoline range organics, naphthenic acids, dyes, etc., can bind to carbonaceous material. Certain soluble and insoluble metals such as arsenic, selenium, chromium, cadmium, lead, fluoride, etc. can also bind to carbonaceous materials and metal oxides. Ferric hydroxide ($Fe(OH)_3$) and/or ferric oxide hydroxide (FeO(OH)) may be used to adsorb arsenic, for example. Other substances that can be removed by adsorption include, endocrine disrupting chemicals (EDCs), bisphenol A, nonylphenol, and cyanobacterial toxins.

Metal oxides and hydrous metal oxides have been developed as various adsorbents to be used in the water treatment to remove most common anions from water, such as fluoride (F—), phosphate ($PO_4^{3-}$), and arsenic (arsenate and arsenite). Removal media using a metal oxide and/or hydrous metal oxide particles are selected from: transition metal oxides and/or hydrous transition metal oxides (Fe, Ti, Mn and the like); Aluminum oxide such as active alumina; Magnesium oxide (MgO); and or rare earth metal type oxides and or hydrous oxides (including Ce, La and the like). Some examples of the above-described metal oxide compounds include, but are not limited to granular, amorphous ferrous oxide; ferric oxide ($Fe_2O_3$), $Fe_3O_4$; magnesium oxide; aluminum oxide such as active alumina; lanthanum oxide ($La_2O_3$); cerium(IV) oxide (CeO2); titanium dioxide (TiO2); zirconium oxide ($ZrO_2$). Some examples of the above-said hydrated metal oxide compounds include, but are not limited to, hydrates of titanium oxide, zirconium oxide and tin oxide, cerium(IV) oxide ($CeO_2$). Wherein, the term "hydrated iron oxide" designates hydrates (monohydrates, dihydrates, trihydrates, tetrahydrates, etc.) of iron oxides such as FeO, $Fe_2O_3$ and $Fe_3O_4$. A ratio of a hydrated ferrite to a hydrated iron oxide such that the hydrated ferrite may occupy about 24 to 100 weight %. The term, "hydrated titanium oxide", as used herein, denotes compounds represented by the general formula of $TiO_2.nH_2O$ (wherein n is a positive number of 0.5 to 2.0). Specifically, there may be mentioned, for example, $TiO_2.H_2O[TiO(OH)_2]$, $TiO_2.2H_2O$ [$Ti(OH)_4$], $TiO_2.nH_2O$ (n=1.5 to 2.0), etc. The term, "hydrated zirconium oxide", denotes compounds represented by the general formula of $ZrO_2nH_2O$ (wherein n is a positive number of 0.5 to 2.0). Specifically, there may be mentioned, $ZrO_2.H_2O[ZrO(OH)_2]$, $ZrO_22H_2O[Zr(OH)_4]$, $ZrO_2.nH_2O$ (n=1.5 to 2.0), etc. The expression, "hydrated tin oxide", means compounds represented by the general formula of $SnO_2.nH_2O$ (wherein n is a positive number of 0.5 to 2.0). Specifically, there may be mentioned $SnO_2.H_2O$ [$SnO(OH)_2$], $SnO_2.2H_2O[Sn(OH)_4]$, $SnO_2.nH_2O$ (n=1.5 to 2.0), etc. The above metal oxide and or hydrated metal oxide compounds could be used as the removal media separately by itself from each individual compound, and or any composites from them in the method disclosed herein for providing insoluble particles from substances in block 204 of FIG. 2; followed by removal of the insoluble particles by treatment using anionic and cationic polymers, such as xanthan and chitosan. The above metal oxide and or hydrated metal oxide compounds will work together in the water treatment system with the anionic and cationic polymers together to remove the common anions from the various water sources. As examples of the common anions from the various water sources include, but are not limited to, fluoride (F—); phosphate ($PO_4^{3-}$); and arsenic (arsenate and arsenite); nitrate et al.

One particular application of the disclosed method relates to the removal of cyanuric acid from pool water. It is known to use halogens, such as chlorine and bromine compounds, to sanitize swimming pool water and spas. However, the halogen compounds are susceptible to degradation by ultraviolet radiation. Cyanuric acid is often used to stabilize the chlorine compounds. Dichloroisocyanuric or trichloroisocyanuric acids are commonly used in recreational water to deliver oxidative chlorine and to stabilize chlorine. The repetitive use of cyanuric acid or dichloroisocyanuric acid or trichloroisocyanuric acid increases the level of cyanuric acid to a point where the cyanuric acid needs to be removed. Conventionally, water is simply drained from a pool to reduce the concentration of cyanuric acid. Melamine bonds with cyanuric acid through hydrogen bonding to create a complex that precipitates or is suspended in the water. In accordance with one embodiment of the invention, the melamine:cyanuric acid complex solids can be removed from the water through the addition of the anionic and cationic polymers, added sequentially or otherwise. The product that results from the treatment of the melamine:cyanuric acid complex with the anionic and cationic polymers is a fibrillar aggregate having the melamine:cyanuric acid complex solids interspersed therein. The fibrillar aggregates are large and cohesive and, as such, can be removed by passing the aqueous media through a screen or mesh and the like, for example.

The use of binding to form an insoluble particle from a soluble substance desired to be removed from water may be used for the removal of phosphate (orthophosphate) from swimming pool water. It is known that deterring the growth of algae may be done through the removal of phosphates from water. Phosphates can be removed by the use of a lanthanum compound, such as lanthanum chloride. The addition of lanthanum chloride to water containing soluble phosphates results in a lanthanum phosphate precipitate. However, lanthanum phosphate precipitate is composed of fine particles that are slow to remove using conventional sand filters. In accordance with one embodiment of the invention, the lanthanum phosphate precipitate and water is mixed with the anionic polymer and the cationic polymer to produce a fibrillar aggregate with the lanthanum phosphate solids interspersed therein. The fibrillar aggregates are more rapidly and easily removed from the water than the lanthanum phosphate precipitate alone. The fibrillar aggregates are large and cohesive, and as such, can be removed by passing the aqueous media through a screen or mesh and the like, for example.

Another such example of binding to create an insoluble particle is in the removal of arsenic or selenium from an aqueous media through binding to iron oxide hydroxide followed by fibrillar aggregation induced by the use of the anionic and cationic polymers. Another example is the removal of mercury compounds from an aqueous media through binding of such mercury forms to activated carbon followed by formation of a fibrillar aggregate induced by the use of the anionic and cationic polymers. Another example is the removal of fluoride ions from an aqueous media through binding to cerium oxide or lanthanum oxide or zirconium hydroxide, followed by formation of a fibrillar aggregate induced by the use of the anionic and cationic polymers.

As an alternative to employing bonding as a means for creating an insoluble particle, certain substances may create an insoluble particle by undergoing pH adjustment in block 206.

Aqueous media containing contaminant/pollutant metals or nonmetals (such as arsenic, lead, cadmium, beryllium, barium, thallium, iron, nickel, vanadium, copper, boron, aluminum, zinc, selenium, manganese, zinc, chromium, cobalt) could be removed by pH adjustment upwards to greater than a pH of 6.0 to create suspended particles, followed by the addition of the anionic and cationic polymers to remove such particles, thereby removing the metals/nonmetals. First, the aqueous media containing the metal(s)/nonmetal(s), in their various forms, is adjusted to pH between 6-7. This is followed by the addition and mixing of the anionic polymer with the aqueous media. The cationic polymer is then added to the aqueous media and mixed, resulting in the formation of a fibrillar aggregate. The fibrillar aggregate is then removed by filtration through a porous screen, flexible filter, fixed bed filter, geotextile bag, and the like. The metal(s)/nonmetal(s) and/or their various forms are contained within the fibrillar aggregate and the concentration of the metal(s) and/or their various forms are significantly reduced in the filtrate. This method can be applied to mining tailings, such as acid mine tailings (containing metals that need to be removed or significantly reduced in concentration), industrial wastewater such as metal pickling operations or computer chip board manufacturing where the water contains metals that need to be removed from the water before the water can be discharged to sewers.

As an alternative to the binding process of block 204 and the pH adjustment process of block 206, some substances can be rendered insoluble particles by oxidation or reduction reactions, which could be performed chemically or enzymatically in block 208. For example, noxious or poisonous dissolved gases such as hydrogen sulfide ($H_2S$) can be chemically or enzymatically treated such that the compound can be changed into another non-noxious compound that exhibits properties that allow it to be removed. For example, hydrogen sulfide can be oxidized in water and converted into sulfate and the sulfate can be removed from the water by precipitation with calcium ions to form insoluble calcium phosphate which could then be removed by fibrillar aggregation with the anionic and cationic polymers and filtration.

Alternatively, the soluble negatively charged sulfate ions could be adsorbed onto insoluble particles added to the water and formed into fibrillar aggregates using the anionic and cationic polymers. Hydrogen sulfide also reacts with metal ions to form insoluble metal sulfides that could be removed by treatment with the anionic and cationic polymers. Hydrogen sulfide can also be converted into insoluble elemental sulfur that can be removed by treatment with the anionic and cationic polymers. The insolubilization of soluble copper (II)chloride in water to insoluble cuprous chloride (I) by reduction with sulfur dioxide could be used for providing an insoluble particle. Another example is oxidation of ferrous (Fe+2) ions to Ferric (Fe+3) ions by sodium hypochlorite followed by reaction of Ferric (Fe+3) ions with hydroxide to form insoluble ferric hydroxide ($Fe(OH)_3$).

In other embodiments, two or more of the processes of blocks 204, 206, and 208 could be combined and used to provide an insoluble particle. For example, chloride is soluble and oxidation results in hypochlorous acid that is still soluble. However, hypochlorous acid can be removed by insoluble activated carbon, followed by fibrillar aggregation.

Another application for the need to create an insoluble product is when a substance is small, such as when the substance is submicron in size (less than 1 μm). Formation of a larger insoluble particle including the submicron substance can occur and will assist in aggregating the submicron substances by the anionic and cationic polymers, when the submicron particles are bound to a large insoluble particle.

After forming the insoluble particles in blocks 204, 206, and 208, the method then continues with blocks 106 and 108 described above.

In a first embodiment, a method for removing a substance from aqueous media is provided. The method includes treating a substance present in aqueous media to provide insoluble particles in the aqueous media, treating the aqueous media with an anionic polymer, and treating the aqueous media with a cationic polymer, wherein the anionic polymer and cationic polymer form aggregates comprising the insoluble particles, and collecting the aggregates to remove the substance from the aqueous media treated with the anionic and cationic polymers.

In a second embodiment, a method for forming aggregates in aqueous media is provided. The method includes treating a substance present in aqueous media to provide insoluble particles in the aqueous media, treating the aqueous media with an anionic polymer, and treating the aqueous media with a cationic polymer to form aggregates comprising the insoluble particles.

In the method of the first and second embodiments, the substance can be soluble in the aqueous media.

In the method of the first and second embodiments, the substance can be miscible in the aqueous media.

In the method of the first and second embodiments, the substance can be immiscible in the aqueous media, such as a liquid.

In the method of the first and second embodiments, the substance can be a submicron particle.

In the method of the first and second embodiments, the anionic polymer can be a xanthan or a mixture of xanthan and one or more different anionic polymers and/or nonionic polymers.

In the method of the first and second embodiments, the cationic polymer can be a chitosan or a mixture of chitosan and one or more different cationic polymers and/or nonionic polymers.

In the method of the first and second embodiments, the insoluble particle can comprise a water soluble substance, a water immiscible liquid, a water miscible liquid, or a submicron particle.

In the method of the first and second embodiments, the method may further comprises bonding the substance to removal media.

In the method of the first and second embodiments, the method may further comprise bonding the substance to removal medium, wherein the removal medium is an adsorbent.

In the method of the first and second embodiments, the method may further comprise bonding the substance to removal medium, wherein the removal medium is carbon.

In the method of the first and second embodiments, the method may further comprise bonding the substance to removal medium, wherein the removal medium is a metal oxide or hydrous metal oxide.

In the method of the first and second embodiments, the insoluble particle can comprise cyanuric acid and melamine.

In the method of the first and second embodiments, the insoluble particle can comprise carbon and a polychlorinated biphenyl compound.

In the method of the first and second embodiments, the insoluble particle can comprise arsenic and iron oxide hydroxide.

In the method of the first and second embodiments, the insoluble particle can comprise carbon and at least one of benzene, toluene and xylene.

In the method of the first and second embodiments, the insoluble particle can comprise carbon and naphthenic acid.

In the method of the first and second embodiments, the insoluble particle can comprise cerium oxide and a fluoride ion.

In the method of the first and second embodiments, the insoluble particle can comprise zirconium hydroxide and a fluoride ion.

In the method of the first and second embodiments, the method may further comprise adjusting the pH of the aqueous media to 6 or greater and the insoluble particle comprises a metal or a nonmetal.

In the method of the first and second embodiments, the method may further comprise adjusting the pH of the aqueous media to 6 or greater and the insoluble particle comprises a metal or a nonmetal, wherein the metal is one of lead, cadmium, beryllium, barium, thallium, iron, nickel, vanadium, copper, aluminum, zinc, manganese, chromium, cobalt, or any combination thereof.

In the method of the first and second embodiments, the method may further comprise adjusting the pH of the aqueous media to 6 or greater and the insoluble particle comprises a metal or a nonmetal, wherein the nonmetal is arsenic or selenium In the method of the first and second embodiments, the insoluble particle can comprise carbon and a hydrocarbon.

In the method of the first and second embodiments, the insoluble particle can comprise carbon and a hydrocarbon, wherein the hydrocarbon is an aromatic hydrocarbon.

In the method of the first and second embodiments, the insoluble particle can comprise carbon and a hydrocarbon, wherein the hydrocarbon is a halogenated hydrocarbon.

In the method of the first and second embodiments, the insoluble particle can comprise orthophosphate and a lanthanum compound.

In the method of the first and second embodiments, the insoluble particle can comprise carbon and a mercury compound.

In the method of the first and second embodiments, the insoluble particle can comprise a protein, immunoglobulin, antigen, lipid, or carbohydrate.

In the method of the first and second embodiments, the insoluble particle can comprise a bacterium, such as *E. coli* or *Entercoccus*, or a virus.

In the method of the first and second embodiments, the insoluble particle can comprise a bacterium, such as *E. coli* or *Entercoccus*, and dirt.

In the method of the first and second embodiments, the method may further comprise reducing or oxidizing the substance to provide the insoluble particle. In the method of the first and second embodiments, the method may further comprise adjusting the pH of the aqueous media to provide the insoluble particle.

In the method of the first and second embodiments, the method may further comprise flowing the aqueous media through a porous material and collecting the aggregates on the material.

In the method of the first and second embodiments, the method may further comprise flowing the aqueous media through a porous material and collecting the aggregates on the material, wherein the porous material comprises pores approximately 100 µm in size.

In the method of the first and second embodiments, the method may further comprise flowing the aqueous media through a porous material and collecting the aggregates on the material, wherein the porous material comprises pores approximately 100 µm to 2 mm in size.

In the method of the first and second embodiments, the method may further comprise flowing the aqueous media through a porous material and collecting the aggregates on the material, wherein the porous material comprises pores in the range of approximately 100 µm to 850 µm in size.

In the method of the first and second embodiments, the method may further comprise flowing the aqueous media through a porous material and collecting the aggregates on the material, wherein the porous material comprises pores in the range of approximately 850 µm to 2 mm in size.

In the method of the first and second embodiments, the method may further comprise allowing the aggregates to settle before collecting the aggregates.

In the method of the first and second embodiments, the method may further comprise treating the aqueous media with the anionic polymer followed by the cationic polymer.

In the method of the first and second embodiments, the method may further comprise treating the aqueous media with the cationic polymer followed by the anionic polymer.

In the method of the first and second embodiments, the method may further comprise treating the aqueous media with the anionic polymer simultaneously with the cationic polymer.

In the method of the first and second embodiments, the method may further comprise diluting the aqueous media to lower a concentration of the substance to less than 10% by weight before treating with the anionic and the cationic polymers.

In the method of the first and second embodiments, the method may further comprise performing two or more steps selected from bonding the substance to removal media, adjusting the pH of the aqueous media to 6 or greater, and reducing or oxidizing the substance to provide the insoluble particle.

In the method of the first and second embodiments, the aggregates can be any one or more of the fibrillar aggregates according the fifth embodiment.

In a third embodiment, a method for removing a substance from aqueous media is provided. The method includes treating aqueous media containing a substance with an anionic polymer, treating the aqueous media with a cationic polymer to form fibrillar aggregates comprising fibers formed from the anionic polymer and the cationic polymer, wherein the substance is adhered to the fibers, and collecting the aggregates to remove the substance from the aqueous media.

In a fourth embodiment, a method for forming fibrillar aggregates in aqueous media, is provided. The method includes treating aqueous media containing a substance with an anionic polymer and treating the aqueous media with a cationic polymer to form fibrillar aggregates comprising fibers formed from the anionic polymer and the cationic polymer to which the substance is adhered.

In the method of the third and fourth embodiments, the substance can be submicron in size.

In the method of the third and fourth embodiments, the substance can be water insoluble or water immiscible.

In the method of the third and fourth embodiments, the method may comprise treating the aqueous media with the anionic polymer followed by the cationic polymer.

In the method of the third and fourth embodiments, the method may comprise treating the aqueous media with the cationic polymer followed by the anionic polymer.

In the method of the third and fourth embodiments, the method may comprise treating the aqueous media with the anionic polymer simultaneously with the cationic polymer.

In the method of the third and fourth embodiments, the anionic polymer is a xanthan or a mixture of xanthan and one or more different anionic polymers and/or nonionic polymers.

In the method of the third and fourth embodiments, the cationic polymer is a chitosan or a mixture of chitosan and one or more different cationic polymers and/or nonionic polymers.

In the method of the third and fourth embodiments, the substance is one of oil, fats, grease, sand, coal, clay, dirt, bacterium, or virus.

In the method of the third and fourth embodiments, the method may further comprise retaining the aggregates on a sieve having pores of 2 mm.

In the method of the third and fourth embodiments, the method may further comprise retaining the aggregates on a sieve having pores of 850 µm or greater.

In the method of the third and fourth embodiments, the method may further comprise retaining the aggregates on a sieve having pores of 100 µm or greater. In the method of the third and fourth embodiments, the method may further comprise flowing water through a screen, mesh, or porous filter to collect the aggregates.

In the method of the third and fourth embodiments, the method may further comprise allowing the aggregates to settle before collecting.

In the method of the third and fourth embodiments, the method may further comprise diluting the aqueous media to lower a concentration of the substance to less than 10% by weight before treating with the anionic and the cationic polymers.

In the method of the third and fourth embodiments, the fibrillar aggregates can comprise fibers and fibrils.

In the method of the third and fourth embodiments, the fibrillar aggregates can be cohesive.

In the method of the third and fourth embodiments, at least one fibrillar aggregate can comprise at least one fiber with a width from 0.02 mm to 0.5 mm.

In the method of the third and fourth embodiments, at least one fibrillar aggregate can comprise at least one fiber with a width from 0.03 mm to 0.4 mm.

In the method of the third and fourth embodiments, at least one fibrillar aggregate can comprise at least one fiber with a length from 0.5 mm to 6 mm.

In the method of the third and fourth embodiments, at least one fibrillar aggregate can comprise at least one fiber with a length from 0.65 mm to 5.5 mm.

In a fifth embodiment, a fibrillar aggregate is disclosed. The fibrillar aggregate can include anionic polymers; cationic polymers; and insoluble particles or an immiscible liquid, wherein the anionic polymers and cationic polymers form fibers to which the insoluble particles or immiscible liquid is adhered. The fibrillar aggregate disclosed herein and all the features disclosed below can be formed from the method of the first, second, third, and fourth embodiments.

In the fifth embodiment, the fibrillar aggregate can have anionic polymers that are xanthan polymers.

In the fifth embodiment, the fibrillar aggregate can have anionic polymers that are chitosan polymers.

In the fifth embodiment, the fibrillar aggegate can comprise a mixture of a xanthan and one or more different anionic polymers and/or nonionic polymers.

In the fifth embodiment, the fibrillar aggregate can comprise a mixture of a chitosan and one or more different cationic polymers and/or nonionic polymers.

In the fifth embodiment, the fibrillar aggregate can have the insoluble particle comprising a submicron substance.

In the fifth embodiment, the fibrillar aggregate can have the insoluble particle formed from a removal medium and a substance that is bonded to the removal medium.

In the fifth embodiment, the fibrillar aggregate can have the insoluble particle formed from a removal medium and a substance that is bonded to the removal medium, wherein the removal medium is an adsorbent.

In the fifth embodiment, the fibrillar aggregate can have the insoluble particle formed from a removal medium and a substance that is bonded to the removal medium, wherein the removal medium is carbon.

In the fifth embodiment, the fibrillar aggregate can have the insoluble particle formed from a removal medium and a substance that is bonded to the removal medium, wherein the removal medium is a metal oxide or hydrous metal oxide.

In the fifth embodiment, the fibrillar aggregate can have the insoluble particle comprising cyanuric acid bound to melamine.

In the fifth embodiment, the fibrillar aggregate can have the insoluble particle comprising a polychlorinated biphenyl compound bound to carbon.

In the fifth embodiment, the fibrillar aggregate can have the insoluble particle comprising arsenic bound to iron oxide hydroxide.

In the fifth embodiment, the fibrillar aggregate can have the insoluble particle comprising benzene, toluene, or xylene bound to carbon.

In the fifth embodiment, the fibrillar aggregate can have the insoluble particle comprising carbon and naphthenic acid.

In the fifth embodiment, the fibrillar aggregate can have the insoluble particle comprising cerium oxide and a fluoride ion.

In the fifth embodiment, the fibrillar aggregate can have the insoluble particle comprising zirconium hydroxide and a fluoride ion.

In the fifth embodiment, the fibrillar aggregate can have the insoluble particle comprising a metal or a nonmetal.

In the fifth embodiment, the fibrillar aggregate can have the insoluble particle comprising a metal or a nonmetal, wherein the metal is one of lead, cadmium, beryllium, barium, thallium, iron, nickel, vanadium, copper, aluminum, zinc, manganese, chromium, cobalt, or any combination thereof.

In the fifth embodiment, the fibrillar aggregate can have the insoluble particle comprising a metal or a nonmetal, wherein the nonmetal is arsenic or selenium.

In the fifth embodiment, the fibrillar aggregate can have the insoluble particle comprising a hydrocarbon bound to carbon.

In the fifth embodiment, the fibrillar aggregate can have the insoluble particle comprising orthophosphate and a lanthanum compound.

In the fifth embodiment, the fibrillar aggregate can have the insoluble particle comprising a mercury compound bound to carbon.

In the fifth embodiment, the fibrillar aggregate can have the insoluble particle comprising a protein, immunoglobulin, antigen, lipid, or carbohydrate.

In the fifth embodiment, the fibrillar aggregate can have the insoluble particle being a bacterium, such as *E. coli* or *Enterococcus*, or virus.

In the fifth embodiment, the fibrillar aggregate can comprise a bacterium and dirt.

In the fifth embodiment, the fibrillar aggregate can comprise sand, coal, clay, dirt, a bacterium or a virus.

In the fifth embodiment, the fibrillar aggregate can comprise the immiscible liquid being oil, fats, or grease.

In the fifth embodiment, the fibrillar aggregate can comprise a size to be retained on a sieve having pores of 2 mm.

In the fifth embodiment, the fibrillar aggregate can comprise a size to be retained on a sieve having pores of 850 µm or greater.

In the fifth embodiment, the fibrillar aggregate can comprise a size to be retained on a sieve having pores of 100 µm or greater.

In the fifth embodiment, the fibrillar aggregate can have the insoluble particle comprise a immunoglobulin:antigen complex.

In the fifth embodiment, the fibrillar aggregate can have the insoluble particle comprise a first species and a second species bound to each other, which separately are water soluble and bound together are water insoluble.

In the fifth embodiment, the fibrillar aggregate can have the insoluble particle comprise a water soluble species bound to a water insoluble species.

In the fifth embodiment, the fibrillar aggregate can have the insoluble particle comprise a water miscible liquid and a water insoluble substance bound to each other. In the fifth embodiment, the fibrillar aggregate can have the insoluble particle comprise a water immiscible liquid and water insoluble substance bound to each other.

In the fifth embodiment, the fibrillar aggregate can comprise at least one fiber with a width from 0.02 mm to 0.5 mm.

In the fifth embodiment, the fibrillar aggregate can comprise at least one fiber with a width from 0.03 mm to 0.4 mm.

In the fifth embodiment, the fibrillar aggregate can comprise at least one fiber with a length from 0.5 mm to 6 mm.

In the fifth embodiment, the fibrillar aggregate can comprise at least one fiber with a length from 0.65 mm to 5.5 mm.

In the fifth embodiment, the fibrillar aggregate can comprise fibrils.

In a sixth embodiment, a method for removing fluoride ions from aqueous media, is provided. The method includes treating aqueous media containing fluoride ions with cerium oxide to provide particles, each particle comprising cerium oxide and a fluoride ion, and removing the particles from the aqueous media to remove fluoride ions from the aqueous media.

In a seventh embodiment, a method for removing fluoride ions from aqueous media, is provided. The method includes treating aqueous media containing fluoride ions with zirconium hydroxide to provide particles, each particle comprising zirconium hydroxide and a fluoride ion; and removing the particles from the aqueous media to remove fluoride ions from the aqueous media.

Oil Sands Tailings

Bitumen, a tar-like form of petroleum, abundant in the tar sands of, for example, Northern Alberta, Canada, is used for producing synthetic crude oil. Oil sands bitumen, harvested by surface mining, generates oil sands tailings, which is a byproduct of the bitumen extraction process. Oil sands tailings is composed of water, clay, sand, silt and residual bitumen. The extraction process utilizes large amounts of hot water to extract the bitumen that generates large quantities of an aqueous clay-rich fines suspension known as mature fine tailings (MFT), which is discharged and collected into large settling ponds. It is desired to have the solids contained in the settling ponds settle and the water recovered for reuse into the bitumen extraction process. The slow rate of sedimentation and consolidation of the solid fines contained in the mature fine tailings presents a significant challenge to low solids-containing water recovery and terrestrial land reclamation through solids deposition. A conventional process to enhance water recovery and speed solids deposition in mature fine tailings is the composite tailings or consolidated tailings (CT) process. The CT process describes mixing a coarse tailings (containing a lower percentage of fine particulates compared to mature fine tailings), from the underflow of a cyclone separator, with mature fine tailings (higher percentage of fine particulates compared to the coarse tailings) and an inorganic coagulant aid, such as gypsum (calcium sulfate, $CaSO_4 \cdot 2H_2O$), which is necessary in the CT process. The resulting mix is referred to as consolidated or composite tailings and the solids settle over the course of several hours and have been described as being "initially soft." However, both the recovered water and the water contained in the pores of the settled solids exhibit high concentrations of sulfate, which can be detrimental to future land reclamation management. Further, the use of inorganic coagulants results in high ion concentrations in recovered and recycled waters, which can negatively impact settling and stability of settled solids. It has been reported that organic flocculants do not increase ion concentrations but the performance of the composite or consolidated tailings was not acceptable.

Disclosed is a method for the removal of mature fine tailings from water by the addition of the anionic and cationic polymers. In one embodiment, the method includes reducing the solids concentration to approximately 0.1% or less, 1% or less, 3% or less, 5% or less, 8% or less, or 10% or less. Dilution can influence the ability of the anionic and cationic polymers to create fibrillar aggregates that are cohesive and thus, easier to remove. The method comprises adding the anionic polymer and the cationic polymer in any order or simultaneously. Mixing can be performed after addition of the anionic and cationic polymers In one embodiment, the amount of anionic polymer added is sufficient to raise the concentration to approximately 2 ppm by weight, or greater. In one embodiment, the amount of cationic polymer is sufficient to raise the concentration to approximately 40 ppm by weight, or greater. However, the cationic polymer concentration can be at least 2 ppm. Cohesive fibrillar aggregates can be formed comprising the solids from mature fine tailings. The cohesive fibrillar aggregates can be separated from water by passing through screens, meshes, and the like.

The disclosed method can rapidly separate the fine solids contained in mature fine tailings from the water without increasing the ion load or ion concentration. The disclosed method rapidly creates dense, stable, and cohesive large fibrillar aggregates of the fines contained in mature fine tailings that allows maximum water recovery and improved water quality. The disclosed method is beneficial in reducing production costs and improving land reclamation efforts.

Mining and Mineral Slurry Clarification

Water is used extensively in the mining of coal and mineral ores. In the recovery process, water is used to remove the mineral ore from its environment and also in the processing of the ore. In the case of coal, water is used to wash and size the coal. The coal is further slurried with water and sized by screening and settling. The water effluent slurry contains high concentrations of fine particulates that is difficult to recover during the washing operations and contains mined solids such as coal fines, sand and clay fines. Efficient separation of solids from liquid (dewatering) is desired in order to recycle the water for coal processing. The effluent slurries have been typically discharged into tailing ponds where the solids are allowed to settle under gravity. Because settling of the solid particulates is a challenge, polymers are added as clarification aids to the mining ponds where they aid in the settling of the mined solids through flocculation. Separation of the solids from the liquid slurry in the mining ponds is also desired for water reuse or discharge into the environment. Polymers that are conventionally useful in clarifying mining ponds include polydiallyldimethyl ammonium chloride (DADMAC), polyaluminum chloride/calcium chloride ($PAC/CaCl_2$), epichlorohydrin dimethylacrylate (EPI/DMA), anionic silica based colloids and cationic organic polymers.

Disclosed is a method for the removal of solids, such as from mining, from water by the addition of an anionic polymer followed by a cationic polymer. In one embodiment, the method includes reducing the solids concentration to approximately 0.1% or less, 1% or less, 3% or less, 5% or less, 8% or less, or 10% or less. The method comprises adding the anionic polymer and the cationic polymer in any order or simultaneously. Mixing can be performed after addition of the anionic polymer and the cationic polymer. In one embodiment, the amount of anionic polymer added is sufficient to raise the concentration to approximately 2 ppm by weight, or greater. In one embodiment, the amount of the cationic polymer is sufficient to raise the concentration to approximately 2 ppm by weight, or greater. Cohesive fibrillar aggregates can be formed comprising the solids. The cohesive fibrillar aggregates can be separated from water by passing through screens, meshes, and the like.

The disclosed method creates dense, stable, and cohesive large fibrillar aggregates of the fines contained in mining pond tailings and process slurries. The disclosed method enhances and improves water recovery.

Clarification of Construction Run-Off Water

Erosion of soil, sediment and clays caused by water running over land is a significant contributor to high turbidity of receiving waters. Increased turbidity of receiving waters due to high fine sediment concentrations is responsible for a variety of negative impacts on the environment particularly on aquatic life forms. Disturbances to the land such as construction activity dramatically increases erosion and the corresponding turbidity of receiving waters during rainfall events if the water is not treated before being discharged into the receiving water. Reduction of fine suspended sediments from high turbidity water is a means of controlling the quality of the receiving water and minimizing the negative impact on the environment. Sediment controls intended to capture suspended sediments in construction run-off include straw barriers, sand bags, biofilter bags, silt fences, sediment traps, and the like are often implemented as best management practices, but are limited in their effectiveness. Polymer dosing of turbid water run-off or turbid water collected in detention ponds is increasingly used as a means to flocculate and coagulate fine sediments so they can be removed by filtration or gravity settling. A variety of synthetic polymers are used with varying degrees of success. Their effectiveness is often dictated by the physicochemical properties of the suspended fine particulate matter unique to a particular geographic area and the chemical properties of the synthetic polymer used in a specific application. Examples of synthetic polymers used are polyacrylamides (neutral, and ionic), polydiallyldimethyl ammonium chloride, polyamines, and polyaluminum chloride polymers.

Disclosed is a method for the removal of solids, such as from construction run-off water by the addition of xanthan gum followed by chitosan. In one embodiment, the method includes reducing the solids concentration to approximately 0.1% or less, 1% or less, 3% or less, 5% or less, 8% or less, or 10% or less. The method comprises adding the anionic polymer and the cationic polymer in any order or simultaneously. Mixing can be performed after addition of each of the anionic and cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the solids. The cohesive fibrillar aggregates can be separated from water by passing through screens, meshes, and the like.

Separation of Oil from Water Such as Bilge Water

A simple means to separate oil from water can have many advantages in a number of applications including oil drilling (separation and recovery of oil from frac water and production water), oil spill containment and prevention of contamination of natural bodies of water such as lakes, streams, ponds, and oceans. The bilge of ships often contains oil and wastes that seep into the bilge compartment. Discharge of bilge water containing such wastes is undesirable without first separating the suspended particulates and water immiscible substances such as oil. Separation of the oil from the water can be economically appealing and offers the opportunity to sell the separated oil for further processing into a variety of value-added substances and materials.

Disclosed is a method to rapidly aggregate oil and/or other water immiscible substances contained in a body of water, into particles, agglomerates and enmeshed solids. The method comprises adding the anionic polymer and the cationic polymer in any order or simultaneously. Mixing can be performed after addition of each of the anionic and cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the oil and other immiscible substances. The cohesive fibrillar aggregates can be separated from water by passing through screens, meshes, and the like.

Wellbore, Production Water, Frac Water

Oil and natural gas drilling operations use significant amounts of water during processing. This water can contain a variety of substances including oil based fluids, petroleum, oil, organic esters, diesel, unsaturated olefins, drill cuttings, sand, sediment and clays, ammonium persulfate, guar gum, mineral oil, hydroxyethylcellulose, ammonium bisulfite, sodium carbonate, ethylene glycol, isopropanol, dissolved solids, salts, formaldehyde, algaecides, metals, benzene, glycol ethers, toluene, 2-(2-methoxyethoxy) ethanol, nonylphenols, sulfates, hydrogen sulfide, bacteria, fungi, suspended solids, sodium chloride and other organic and non-organic substances. Removal of suspended solids, oil and/or water immiscible substances is desired in order to recover water acceptable for reuse and/or disposal into the environment.

Disclosed is a method to rapidly aggregate oil, oil based fluids, hydrocarbons and/or other water immiscible substances and solids contained in water, into particles, agglomerates and enmeshed solids. The method comprises adding the anionic polymer and the cationic polymer in any order or simultaneously to the water. Mixing can be performed after addition of each of the anionic and cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the oil and other immiscible substances and the solids. The cohesive fibrillar aggregates can be separated from water by passing through screens, meshes, and the like.

Wastewater

Wastewater from municipal sewage treatment plants and food processing plants typically contain high concentrations of suspended particulate matter. The matter contained in food processing waste streams can be protein, carbohydrate, fats, oils, and phosphate-containing organics. Removal of suspended matter in wastewater streams is often accomplished through the use of chemical coagulants and flocculants. The suspended matter forms flocs and is removed by settling or a combination of settling and filtration. Improvements in the separation of solids are desired. Small floccules of suspended matter created by the use of polymers and/or coagulants can be difficult to separate due to size, density and stability.

Disclosed is a method to rapidly aggregate substances and solids contained in wastewater from municipal sewage treatment plants and food processing plants, into cohesive fibrillar aggregates. The method comprises adding the anionic polymer and the cationic polymer in any order or simultaneously to the water. Mixing can be performed after addition of each of the anionic and cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the substances and solids. The cohesive fibrillar aggregates can be separated from water by passing through screens, meshes, and the like.

Agricultural Wastewater

Concentrated animal and fish aquaculture feeding operations generate significant quantities of particulate suspended matter in the water and wastewater streams. Separation and removal of this material helps to reduce the turbidity and improve the quality of receiving waters and/or the water habitat of the fish contained therein. There is a need to improve the effectiveness of suspended solids separation from this aqueous media by causing the suspended solids to undergo rapid aggregation into large aggregated masses such that the aqueous media can be easily separated from the aggregated masses by filtration or settling.

Disclosed is a method to rapidly aggregate substances and solids contained in agricultural and aquaculture water, into cohesive fibrillar aggregates. The method comprises adding the anionic polymer and the cationic polymer in any order or simultaneously to the water. Mixing can be performed after addition of each of the anionic and cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the substances and solids. The cohesive fibrillar aggregates can be separated from water by passing through screens, meshes, and the like.

Fat/Oil/Grease

A variety of waste streams can contain various types of oil in differing concentrations existing as emulsions that may often contain other types of contaminants. These additional contaminants may be proteins, fats, grease, carbohydrates, metal particles, lubricants, surfactants, cutting fluids, cleaners, solvents, tars, crude oil, diesel fuel, light hydrocarbons, gasoline, jet fuel, chlorinated hydrocarbons (PCB's etc), soaps, phospholipids, sterols, stanols, dissolved organic solids, dissolved metal salts, dissolved inorganics, and a host of other contaminants. These waste streams can be generated from industrial, food, or sewage treatment processing streams. Oil in water emulsions are difficult to break and can exist where either phase is dispersed in the other. Oil can be emulsified in water (O/W emulsions) or water can be often emulsified in oil (W/O emulsions). Separation of the oily phase from the water phase or the water phase from the oily phase is a challenge. Dissolved air flotation is often used in these processes as well as chemical flocculation/coagulation but the separation efficiency is limited.

Disclosed is a method to rapidly aggregate substances and solids contained in waste streams generated from industrial, food, or sewage treatment processing streams, into cohesive fibrillar aggregates. The method comprises adding the anionic polymer and the cationic polymer in any order or simultaneously to the water. Mixing can be performed after addition of each of the anionic and the cationic polymers. In one embodiment, the amount of anionic polymer added is sufficient to raise the concentration to approximately 2 ppm by weight, or greater. In one embodiment, the amount of cationic polymer added is sufficient to raise the concentration to approximately 2 ppm by weight, or greater. Cohesive fibrillar aggregates can be formed comprising the fat, oil, and grease substances. The cohesive fibrillar aggregates can be separated from water by passing through screens, meshes, and the like.

Proteins/Immunoglobulin:Antigen Complexes

The treatment with the anionic and cationic polymers can also be used for the collection and/or removal of proteins, such as immunoglobulins, when bound to other proteins, antigens, lipids, or carbohydrates by forming fibrillar aggregates.

Soluble proteins often interact with other solutes, of a variety of chemical types, in aqueous media to create complexes. Depending on the ratio of the interacting components, these complexes may either stay in suspension, indefinitely, or reach a size that causes them to sediment spontaneously. In many instances the formation of these complexes is the key to diagnostic analytical procedures on biological samples, in clinical and investigative laboratories. Filtration of the complexes for separation is desirable, but not always possible, depending on the size, density and stability of the complexes formed.

Separation of the complexes is desirable to the analytical procedure, so as to be able to measure the amount of the targeted analyte that has participated in formation of the complex. This may be accomplished by having identifiable markers associated with a standard solution of the targeted analyte, such as radioisotopes, fluorescent labels, or enzyme-linked labels. These markers may be present on a known quantity of a standard preparation of the targeted analyte; quantification of the unknown amount of analyte in question in a biological fluid, such as blood, urine, saliva, is determined by its interference with the standard curve. There are many examples, but some of the most common would be immunoglobulins—large water-soluble glycoproteins—that have binding sites on them (so-called epitopes) that enable them to bind with varying degrees of affinity to ligands. The fit between the immunoglobulin (e.g., serum antibodies) and the target (an 'antigen', e.g., a unique constituent of a disease agent, such as, say, the influenza virus) may be highly specific, but whether or not the complex is separable depends on many additional factors. Being able to separate out the complexes rapidly as aggregates could be valuable in capturing the labeled analytes needed for successful quantification. This would be especially true in circumstances, comparable to the cyanuric acid/melamine complex, where the combined moieties are not always present in proportions that will lead to readily separable precipitates. Rather, they may form complexes that are more likely to remain in suspension, or only sediment spontaneously over a long period, or are not readily filterable in a practical way, tending to clog filtration medium pores.

Other soluble protein interactions of this nature—in addition to immunoglobulin antibody complexes with soluble antigens (which may be other proteins, carbohydrates, lipids, or even small molecules)—are useful in diagnostic and biomedical settings, and they also pose problems of separation. For example, Protein A, a component of *Staphylococcus* bacteria, has a very high affinity for certain immunoglobulins in serum of humans and animals. This interaction can be used to create complexes that will incorporate antibodies, and contribute to formation of insoluble complexes of various sizes. This reagent, Protein A, is popularly used as a constituent of diagnostic reagent arrays, but the challenge of successfully separating the macromolecular complexes again arises. Being able to tie these up rapidly in xanthan/chitosan or other anionic/cationic polymer aggregates that permit ready separation using coarse filtration procedures, instead of filtration membranes or high speed centrifugation methods, would be advantageous.

Similarly the family of soluble proteins known as Lectins show highly specific interactions with certain carbohydrate structures to create stable complexes. This phenomenon can also be the basis of quantitative procedures, sometimes diagnostic. These reactions take advantage of the availability of purified lectins with known specificities for carbohydrate constituents in biologically important mixtures (e.g., carbohydrate markers in cell membranes of cancerous cells, or in, say, stem cells targeted for separation from others in the population that do not bear the marker.) In all these instances, complexes that are problematic to separate quickly and conveniently may result. To be able to incorporate them into larger xanthan/chitosan or other anionic/cationic polymer induced fibrillar aggregates would be advantageous, and practically valuable.

Accordingly, a method is disclosed for the aggregation of protein complexes, such as immunoglobulin:antigen complexes, protein:carbohydrate complexes and the like. The method includes treating an aqueous media containing such complexes with anionic and cationic polymers, wherein the anionic and cationic polymers form fibrillar aggregates comprising fibrils to which the complexes are adhered.

EXAMPLES

Example 1

Removal of Cyanuric Acid Through Binding with Melamine Followed by Xanthan and Chitosan Treatment Cyanuric acid is added to recreational water to stabilize chlorine. Cyanuric acid can be toxic and the concentration is regulated in commercial pools. Cyanuric acid is also a byproduct of dichloroisocyanuric or trichloroisocyanuric acid used in recreational water. Cyanuric acid is soluble in water and when soluble melamine is added to the water, an insoluble cyanuric acid:melamine complex is formed that clouds the water. The water containing the insoluble cyanuric acid:melamine complex looks like skim milk depending on the concentration of the insoluble complex. The fine insoluble complex is difficult to remove using a standard pool filter. The addition of an anionic polymer such as xanthan and a cationic polymer such as chitosan to the water results in the formation of a fibrillar aggregate that can be easily removed by filtration such as through a coarse filter, screen, sand, diatomaceous earth, paper, etc. Alternatively, the fibrillar aggregate can be allowed to settle to the bottom of the pool and be vacuumed up by the pool vacuum system.

Procedure and Results:

A melamine solution was made by dissolving melamine at a concentration of 200 ppm in DI water. A cyanuric acid solution was made by dissolving cyanuric acid at a concentration of 200 ppm in DI water.

The melamine solution was added to the cyanuric acid solution at different stoichiometric ratios and the cyanuric acid concentration was performed using the commercially available RAINBOW LIFEGARD® #79 Cyanuric Acid Turbidity Test Kit, and following the protocol found in the General Information card provided under "DIRECTIONS FOR USE:".

Results:

Test-1 combined a 1:1 mixture of 200 ppm cyanuric acid aqueous solution and 200 ppm melamine aqueous solution and created a 100 ppm cyanuric acid:melamine complex. After brief mixing, a cloudy solution (resembling diluted skim milk) was observed and the initial cyanuric acid turbidity was measured and recorded in Table 1. The cyanuric acid concentration determined by the turbidity test kit, corresponding to an initial turbidity of 100 ppm, agreed with the calculated cyanuric acid concentration.

Stock solutions of 1% wt./wt. xanthan in water and of 1% wt./wt. chitosan acetate in water (1% chitosan, 1% glacial acetic acid, 98% water) were prepared. One drop of 1% wt./wt. xanthan in water stock solution was added to the turbid solution containing the cyanuric acid:melamine complex and mixed, followed by one drop of 1% wt./wt. chitosan acetate in water stock solution water and mixed. A significant amount of a white fibrillar aggregate formed immediately after being treated with the 1% chitosan acetate. See FIG. 4 showing a representation of the fibrillar aggregate structure. The fibrillar aggregate was removed by passing the water containing the fibrillar aggregate through a 20 mesh (850 micron) sieve. The concentration of cyanuric acid in the filtrate was measured using the RAINBOW LIFEGARD® #79 Cyanuric Acid Turbidity Test Kit and was found to be <20 ppm as recorded in Table 1 below.

To determine whether the xanthan/chitosan treatment removed all of the cyanuric acid, the remaining filtrate was once again treated with the 200 ppm melamine solution. No amount of visual turbidity could be detected and the test kit indicated that turbidity was still <20 ppm. This indicated that nearly all of the cyanuric acid had been removed by complexation with melamine followed by fibrillar aggregation and filtration using the xanthan and chitosan treatment.

Test-2 combined a 0.5:0.5:1 mixture of a 200 ppm cyanuric acid solution, DI water, and 200 ppm melamine solution, creating a 50 ppm cyanuric acid complex in 100 ppm melamine. After mixing, the initial cyanuric acid turbidity was measured and recorded in Table 1. The solution was treated with xanthan and chitosan, as described above in Test 1, and the final cyanuric acid turbidity was measured and recorded in Table 1.

Again, a significant amount of white fibrillar aggregate formed immediately after addition and mixing of 1% wt./wt. chitosan acetate in water. The amount of fibrillar aggregate formed was similar to the quantity produced in Test 1. The fibrillar aggregate was strained through a 20 mesh (850 micron) wire mesh sieve and the final cyanuric acid concentration was measured and recorded in Table 1. There was no measurable cyanuric acid in the filtrate.

The remaining filtrate was treated with 200 ppm melamine solution. No amount of visual turbidity could be seen and the test kit showed turbidity was still <20 ppm. This demonstrated that nearly all of the cyanuric acid had been removed by filtration of the fibrillar aggregate created using the xanthan/chitosan treatment after beginning with half the concentration used in Test-1.

Test-3 combined a 0.25:0.75:1 mixture of a 200 ppm cyanuric acid aqueous solution, DI water, and 200 ppm melamine aqueous solution, creating a 25 ppm cyanuric acid complex in 100 ppm melamine. After mixing, the initial cyanuric acid turbidity was measured and recorded in Table 1. The final cyanuric acid turbidity was measured and recorded in Table 1.

A 1% wt./wt. xanthan in water solution was added as described for tests 1 & 2. A 1% wt./wt. chitosan acetate in water solution was added next and a significant amount of white fibrillar aggregate formed immediately. The amount of fibrillar aggregate formed was similar to the quantity produced in Test-1 & 2. The fibrillar aggregate was strained through a wire mesh sieve as described for tests 1 & 2, and the final cyanuric acid turbidity of the filtrate was measured and recorded in Table 1. There was no measurable turbidity following filtration.

The remaining filtrate was treated with 200 ppm melamine solution. No amount of visual turbidity could be seen using the cyanuric test kit revealing that the cyanuric acid concentration was <20 ppm. This indicated that nearly all of the cyanuric acid had been removed by complexation with melamine followed by fibrillar aggregation and filtration using the xanthan/chitosan treatment after beginning with half the cyanuric acid concentration used in Test-2, and ¼ of the cyanuric acid concentration used in Test-1.

TABLE 1

Cyanuric Acid Turbidity Test Results

| Test | Cyanuric Acid Soln. (ppm) | Melamine Soln. (ppm) | Initial Cyanuric Acid Turbidity Reading (ppm) | Final Cyanuric Acid Turbidity Reading (ppm) |
|---|---|---|---|---|
| 1 | 100 | 100 | 100 | <20 |
| 2 | 50 | 100 | 60 | <20 |
| 3 | 25 | 100 | 30 | <20 |

Example 2

Removal of Pcb's with/without Adsorption on Carbon Followed By Xanthan and Chitosan Treatment

1. PCB

Stock solutions of 1% wt./wt. xanthan in water and of 1% wt./wt. chitosan acetate in water (1% chitosan, 1% glacial acetic acid, 98% water) were prepared. Water samples were spiked with a PCB standard, Aroclor 1248 in isooctane (100 µg/L in a total volume of 4 L of water. Concentration of PCB is 100 µg/L=100 ppb). To 1 L of PCB-spiked water is added 40 drops of the 1% wt./wt. xanthan stock solution, and mixed. This was followed by 20 drops of the 1% wt./wt. chitosan acetate stock solution, and mixed. Water samples were treated with or without the DPS (xanthan and chitosan solutions). A fibrillar aggregate formed after treatment of the samples with the solution of 1% wt./wt. xanthan in water and the solution of 1% wt./wt. chitosan acetate in water, which was then filtered through a 20 mesh metal screen. Some water samples contained dirt and/or powdered activated carbon (PAC). Water samples were filtered through a coarse metal screen (1 mm pore size kitchen sieve) and the filtrates were analyzed for quantitative determination of PCB's concentrations in Aroclor 1248.

TABLE 2

PCB Test Results

| Sample | PCB in Filtrate (ppb) |
|---|---|
| T206p6—51.56 g of dirt to 4 L of tap water plus DPS | 6.6 |
| C206p6—51.56 g of dirt to 4 L of tap water | 27 |
| T206p7—51.56 g of dirt and 2.22 g of PAC to 4 L of tap water plus DPS | ND |
| C206p7—51.56 g of dirt and 2.22 g of PAC to 4 L of tap water | 34 |

TABLE 2-continued

PCB Test Results

| Sample | PCB in Filtrate (ppb) |
|---|---|
| T206p8—2.22 g of PAC to 4 L of tap water plus DPS | 1 |
| C206p8—2.22 g of PAC to 4 L of tap water | 38 |
| T206p9—4 L of stream water plus DPS | 18 |
| C206p9—4 L of stream water | 57 |

ND is <0.56 µg/L

The results from Table 2 in this example show that xanthan and chitosan alone can remove PCB from water (compare C206p9 to T206p9). The use of powdered activated carbon (PAC) and xanthan and chitosan is significantly better compared to powdered activated carbon alone (compare C206p8 to T206p8). The combination of dirt, PAC and DPS is very effective in reducing PCB (compare C206p7 to T206p7).

Example 3

Removal of Arsenic Through Binding with Iron Oxide Hydroxide Followed by Xanthan and Chitosan Treatment 1. Arsenic Stock solutions of 1% wt./wt. xanthan in water and of 1% wt./wt. chitosan acetate in water (1% chitosan, 1% glacial acetic acid, 98% water) were prepared. Water samples were spiked with an arsenic standard containing both Na Arsenate and Na Arsenite. 7.1 mg of sodium arsenate and 5.4 mg of sodium arsenite were added to 10 ml of water to create a spike solution. 1 ml of this spike solution was added to 1 L of water to provide a concentration of ~480 µg of Arsenic species per 1 L of water. This 1 L of water was used to add the drops of xanthan and chitosan stock solutions. Water samples were treated with or without the DPS (dual polymer system of xanthan and chitosan) and then filtered through a 1 mm pore size kitchen sieve. Some water samples contained added powdered iron oxide hydroxide PURA Phoslock (0.5 g in the 1 L=500 mg/L=500 ppm). Other samples contained added slurry of iron hydroxide (Noah iron hydroxide (0.5 g in the 1 L=500 mg/L=500 ppm). A fibrillar aggregate formed after treatment of the samples with a solution of 1% wt./wt. xanthan in water and a solution of 1% wt./wt. chitosan acetate in water. The water samples were filtered through a coarse metal screen (1 mm pore size kitchen sieve), and the filtrates were analyzed for metal concentration.

TABLE 3

Arsenic Test Results

| Sample | Arsenic (ppb) |
|---|---|
| Control 206p14—1 L of DI water | 440 |
| PuraC 206p14—1 L of DI water with 0.5 g of PURA PhosLock (powdered iron oxide hydroxide) | 370 |
| PuraT 206p14—1 L of DI water with 0.5 g of PURA PhosLock (powdered iron oxide hydroxide) and DPS | ND |

TABLE 3-continued

Arsenic Test Results

| Sample | Arsenic (ppb) |
|---|---|
| Noah C 206p14—1 L of DI water with 0.5 g of Noah iron Hydroxide slurry | 410 |
| Noah T 206p14—1 L of DI water with 0.5 g of Noah iron hydroxide slurry and DPS | 410 |

All values are in µg/L
ND is <60 ug/L

Results demonstrate that the combination of iron oxide hydroxide (PuraPhoslock) 500 ppm solution and the xanthan/chitosan treatment reduces arsenic below detectable levels and is more effective than iron oxide hydroxide alone.

Example 4

Removal of Benzene and Xylene Through Adsorption Followed By Xanthan and Chitosan Treatment Stock solutions of 1% wt./wt. xanthan in water and of 1% wt./wt. chitosan acetate in water (1% chitosan, 1% glacial acetic acid, 98% water) were prepared. Water samples were spiked with a standard mixture containing benzene and m,p-xylene (~400 ppb in a volume of 125 ml). Some water samples received added dirt (12.9 mg dirt/ml water) and powdered activated carbon (PAC) (560 µg/ml) and were treated with or without the DPS (xanthan and chitosan solutions). 5 drops of the xanthan stock solution and 3 drops of the chitosan solution were added to 125 ml of spiked water. Other water samples received only powdered activated carbon and no dirt and were treated with or without powdered activated carbon. A fibrillar aggregate formed after treatment of the samples with the solution of 1% wt./wt. xanthan in water and the solution of 1% wt./wt. chitosan acetate in water. Water samples were filtered through a coarse metal screen (1 mm pore size kitchen sieve) and the filtrates were analyzed for metal concentration.

TABLE 4

Benzene and Xylene Test Results

| Sample | Benzene (ppb) | m, p-Xylene (ppb) |
|---|---|---|
| T206p3—3.22 g of dirt and 0.14 g of PAC to 250 ml of tap water plus DPS | ND | ND |
| C206p3—3.22 g of dirt and 0.14 g of PAC to 250 ml of tap water | 310 | 710 |
| T206p4—0.14 g of PAC to 250 ml of tap water plus DPS | ND | ND |
| C206p4—0.14 g of PAC to 250 ml of tap water | 290 | 700 |

All values are in µg/Kg.
ND is <150 µg/Kg for benzene and <400 µg/Kg for xylene

Results demonstrate that the use of xanthan and chitosan in combination with PAC was effective in significantly reducing concentrations of benzene and xylene in water compared to PAC alone. The combination of PAC and dirt was also effective in reducing the concentrations of benzene and xylene using the Dual Polymer System (DPS) of xanthan and chitosan polymer.

Example 5

Removal of Metals/Nonmetals from Water Using pH Adjustment Followed by Xanthan and Chitosan Treatment Stock solutions of 1% wt./wt. xanthan in water and of 1% wt./wt. chitosan acetate in water (1% chitosan, 1% glacial acetic acid, 98% water) were prepared. Water samples (190 ml) were spiked with a metal standard solution obtained from Fluka. The pH of the acidic solution was adjusted with dilute 50% NaOH to pH 6-7. Some water samples were treated with or without DPS (xanthan and chitosan polymers). Some samples were treated with dirt and DPS or a combination of dirt and powdered activated carbon (PAC) and DPS or PAC and DPS in which the dirt was 13.5 mg/ml and PAC was 579 µg/ml. A fibrillar aggregate formed after treatment of the samples with a solution of 1% wt./wt. xanthan in water and a solution of 1% wt./wt. chitosan acetate in water. 10 drops of the xanthan solution and 5 drops of the chitosan solution were added. The water samples were filtered through a coarse metal screen that trapped the fibrillar aggregates formed by the xanthan/chitosan and the filtrates were analyzed for metal concentration.

TABLE 5

Metals Test Results

| Analyte | (RL) | Control | Test 1 | Test 2 | Test 3 | Test 4 |
|---|---|---|---|---|---|---|
| Arsenic | (0.060) | 1.8 | 0.11 | 0.63 | 0.75 | 0.54 |
| Lead | (0.030) | 1.9 | 0.068 | 0.040 | 0.53 | ND |
| Cadmium | (0.010) | 0.48 | 0.36 | 0.12 | 0.28 | 0.20 |
| Beryllium | (0.0050) | 0.41 | 0.072 | 0.010 | 0.14 | 0.11 |
| Barium | (0.010) | 1.9 | 1.8 | 1.8 | 1.7 | 1.7 |
| Thallium | (0.10) | 4.6 | 4.0 | 1.6 | 3.1 | 1.7 |
| Iron | (0.20) | 4.6 | ND | 1.4 | 1.4 | ND |
| Nickel | (0.020) | 0.99 | 0.52 | 0.47 | 0.43 | 0.58 |
| Vanadium | (0.010) | 1.9 | 0.34 | 0.94 | 0.89 | 0.77 |
| Copper | (0.020) | 0.93 | 0.16 | 0.033 | 0.30 | ND |
| Boron | (2.5) | 4.5 | 4.8 | 4.6 | 4.8 | 4.6 |
| Aluminum | (1.0) | 1.8 | ND | 2.3 | 1.1 | ND |
| Zinc | (0.040) | 4.6 | 3.6 | 0.68 | 2.8 | 1.5 |
| Selenium | (0.10) | 4.5 | 2.8 | 3.8 | 3.7 | 3.7 |
| Manganese | (0.020) | 0.47 | 0.30 | 0.50 | 0.24 | 1.5 |
| Chromium | (0.025) | 0.92 | 0.027 | 0.032 | 0.27 | ND |
| Cobalt | (0.010) | 0.48 | 0.33 | 0.19 | 0.26 | 0.29 |

All values are in mg/L
ND values are no detect below the RL

Control—190 ml of water and 10 ml of Fluka metals std

Test 1—190 ml of water and 10 ml of Fluka metals std+DPS

Test 2—190 ml of water and 10 ml of Fluka metals std+2.57 g of Arizona dirt+DPS

Test 3—190 ml of water and 10 ml of Fluka metals std+0.11 g of powdered activated carbon+DPS Test 4—190 ml of water and 10 ml of Fluka metals std+2.57 g Arizona dirt+0.11 g powdered activated carbon+DPS Results demonstrated that xanthan/chitosan in combination with powdered activated carbon and dirt was effective in reducing concentrations of a variety of metals. It was also demonstrated that xanthan/chitosan alone was effective in reducing the concentration of a variety of metals. It was also demonstrated that xanthan/chitosan in combination with powdered activated carbon and no dirt was effective in reducing the concentration of a variety of metals.

Example 6

Removal of Fines from Mine Tailings by Treatment with Xanthan and Chitosan

A sample of mature fine tailings was obtained from a tar sands operation located in Alberta, Canada. The turbidity of the mature fine tailings sample was estimated to be about 181,000 NTU. The pH of the sample was about 7 as measured by pH paper. The sample was too concentrated (measured solids was 30%), so it was diluted 10× to a solids content of 3% using produced water obtained from the same source. The produced or make up water used exhibited a turbidity of 32-172 NTU. The 10× diluted mature fine tailings exhibited an approximate turbidity of 18,000 NTU. The pH of this diluted sample was 6.5-7.2 as measured by pH probe. The samples were stored at 4 C when not in use.

Method 1:

Stock solutions of 1% wt./wt. xanthan in water and of 1% wt./wt. chitosan acetate in water (1% chitosan, 1% glacial acetic acid, 98% water) were prepared. A small scale floccing test of a well mixed 10× diluted sample was conducted. 20 ml of the well mixed test sample was added to a test vial. This was followed by the addition of a small amount of 1% wt./wt. chitosan acetate in water solution to the vial and mixed. Gentle mixing was performed about two times in 5 minutes to allow the floc to develop. The vials were then allowed to stand over a period of time to determine the efficacy of flocculation. If no floc was formed, then additional chitosan solution was added until flocs developed.

At 5000 ppm of StormKlear Liquifloc (50 ppm soluble chitosan), small floccules was observed. As additional StormKlear Liquifloc (soluble chitosan) was added (up to 15,000 ppm), a more stable floc developed but did not increase much in size.

Method 2:

An experiment involving the addition of the anionic biopolymer, xanthan gum, in conjunction with 1% wt./wt. chitosan acetate in water solution was conducted. 20 ml vials were filled with 10× diluted sample as before. A 1% wt./wt. xanthan in water solution was added first followed by the addition of StormKlear Liquifloc (soluble chitosan). The sample was mixed and then observed for the formation of fibrillar aggregates.

Figure 18:
FIG. 18 is a photograph of samples of mine tailings treated with different concentrations of xanthan gum and chitosan.

Table 6 below and FIG. 18 show the results for different concentrations of the xanthan gum and chitosan. The soluble chitosan was added stepwise in 10 ppm increments following the addition of xanthan gum. At first, at the lower concentrations the floc that developed was large and bordered on the granular side. Then as more xanthan gum was added the floc became "curd" like and was very substantial.

TABLE 6

| Xanthan Polymer ppm | Chitosan ppm | Comments |
|---|---|---|
| 2.5 | 50 | Large floc/small curd |
| 5 | 40 | Small curd |
| 7.5 | 50 | Small curd |
| 10 | 60 | Medium curd |

Since more of xanthan gum seemed to work the best, additional testing was performed using higher concentrations of xanthan gum. A concentration of 50 ppm of xanthan gum was tested. Chitosan was added stepwise in 10 ppm increments, at 50 ppm chitosan produced floc that was curd like, very large in size (10 mm) and strong and resistant to shearing.

Figure 19:
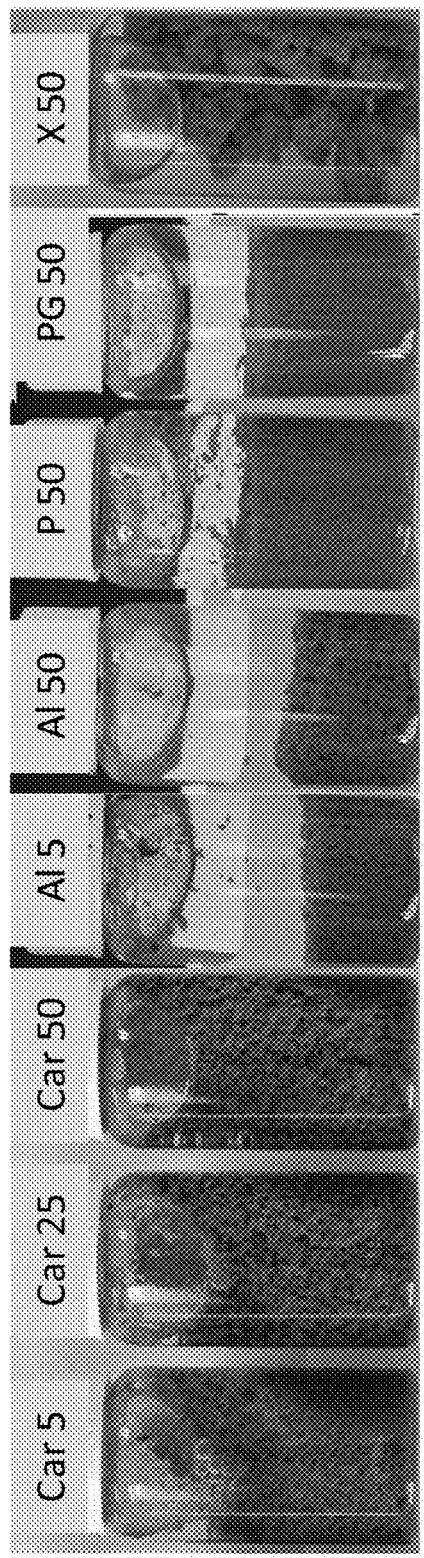
FIG. 19 is a photograph of samples of mine tailings treated with different anionic biopolymers and chitosan.

Other anionic biopolymers such as carrageenan, alginate, pectin, and polygalacturonic acid were also tested by sequential addition with soluble chitosan for their flocculation performance properties using the diluted mature fine tailings sample. The order of addition was anionic biopolymer first followed by addition of the soluble chitosan second. The soluble chitosan was added stepwise in 10 ppm increments. See Table 7 and FIG. 19 for the results.

TABLE 7

| Polymer | Polymer Concentration ppm | Chitosan Concentration ppm | Comments |
|---|---|---|---|
| Carrageenan | 5 | 60 | very small curd-like floc |
| Carrageenan | 25 | 90 | small curd-like floc |
| Carrageenan | 50 | 70 | medium curd-like floc |
| Alginate | 5 | 100 | possibly small curd/large floc |
| Alginate | 50 | 80 | small + medium curd-like floc |
| Pectin | 50 | 80 | typical floc |
| Polygalacturonic Acid | 50 | 90 | typical floc |
| Xanthan | 50 | 50 | very large rock-like aggregates |

The anionic biopolymers tested in combination with soluble chitosan exhibited very different types of floccules. Most pronounced was the size of floccules and volume of the floccules. For example, the carrageenan-soluble chitosan combination (Car5 & Car25) caused the formation of small to medium sized curd-like floccules that exhibited a significantly larger volume and average size compared to the floccules formed by the alginate-soluble chitosan combination (Al5 & Al50). The floccules produced by the pectin-soluble chitosan combination (P50) were similar in both volume and size to the floccules produced by the polygalacturonic acid-soluble chitosan combination (PG50). The floccules produced by the alginate-soluble chitosan combination (Al5 & Al50) occupied less volume and were larger in size compared to the floccules produced by both the pectin-soluble chitosan combination (P50) and the polygalacturonic acid-soluble chitosan combination (PG50). A larger volume of floccules can be expected to express a lower solid to liquid ratio compared to a smaller volume of floccules. The xanthan gum-soluble chitosan combination, surprisingly, did not exhibit floccules but a very large stable aggregated mass of rock-like solids, which could not be described as floccules (X50). Since the size and stability of floccules and the solid to liquid ratio influence the filtration efficiency, settling volume and subsequent water recovery efficiency, it could be expected that the very large stable aggregated mass of rock-like solids, comprising fibrillar aggregates, produced by the xanthan gum-soluble chitosan combination would be easier and more efficient to separate from the aqueous media. Faster flow rates and easier dewatering could be expected with less back pressure and a higher recovery of the aqueous media.

It is likely that the efficacy and degree of performance of the other polymers to create fibrillar aggregates may not be as dramatic as xanthan at the same concentrations used. However, better performance might be seen at higher concentrations and/or higher molecular weights of the other polymers. Combinations of the other polymers are also possible and their combinations may increase the efficacy and performance to match that of xanthan.

Method 3.

Figure 20A:
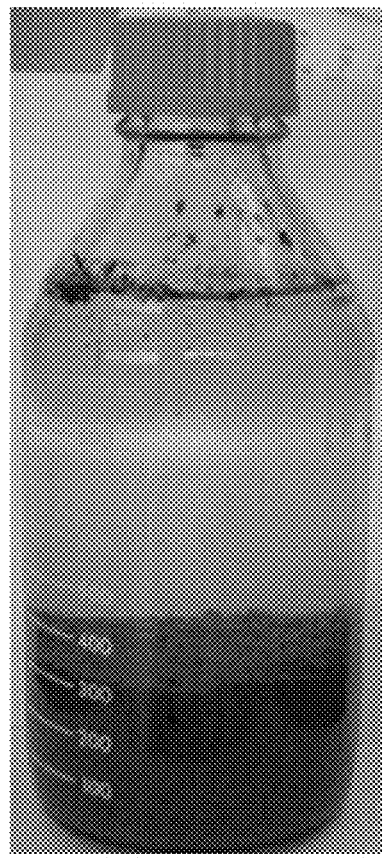
FIG. 20A is a photograph of a 1 L sample of mine tailings treated with xanthan and chitosan.
Figure 20B:
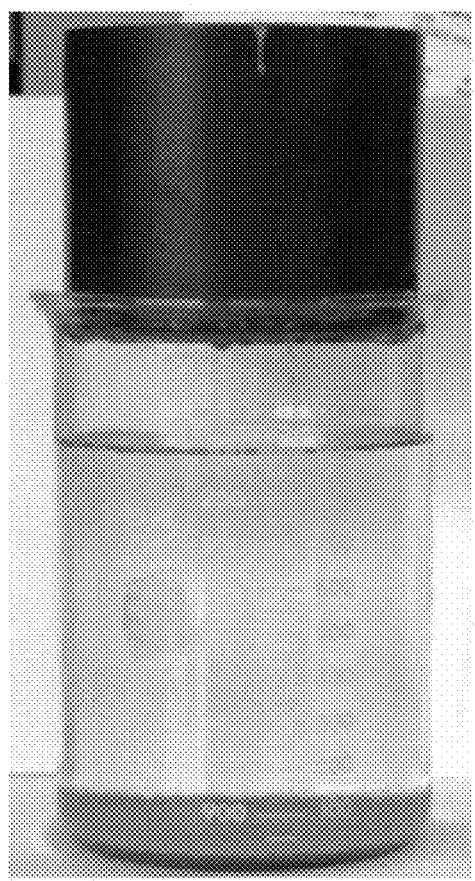
FIG. 20B is a photograph of filtrate collected from the sample of FIG. 11A after passing through a geotextile fabric.

The filtration efficiency of diluted mature fine tailings was examined using a xanthan gum-soluble chitosan combination. A 1 liter 10× diluted mature fine tailings sample was treated with 50 ppm of xanthan gum (from a 1% wt./wt. xanthan in water solution) followed by 60 ppm of chitosan (from a 1% wt./wt. chitosan acetate in water solution) added stepwise, with mixing, in 10 ppm increments. The 1 L treated sample containing settled solids was then filtered through a geotextile fabric obtained from a Tencate Geotube textile bag and collected in a beaker. About 900 ml of the filtrate was collected and the turbidity was less than 100 NTUs. FIG. 20A shows the treated diluted mature fine tailing containing the settled solids. FIG. 20B shows the geotextile holder on top of the collection beaker. The filtrate from the diluted treated mature fine tailings has passed through the geotextile and is shown in the beaker. As can be seen, the separation of the solids from the aqueous media was highly efficient with high water recovery and low turbidity.

Discussion:

From the results described above, chitosan, added to mature fine tailing alone is capable of causing the formation of floccules. However, this is in contrast to the sequential combination of xanthan gum followed by soluble chitosan which causes the formation of very large stable aggregated mass of rock-like solids that are easy to separate from the aqueous media resulting in high aqueous media recovery and an excellent dewatering process. The solids are likely a highly cohesive mass of fibrillar aggregates compacted together. Fibrillar aggregates are formed at lower solids concentrations and same doses. The observed fibrillar aggregates can be collected on a 20 mesh (850 µm screen) and picked up with fingers. The "ball" of aggregate is very cohesive and gummy-like. Chitosan alone can floc the diluted tar sands treatment water but a xanthan/chitosan treatment works much better in floccing and treating the water. At the dosage, M.W. charge distribution along the polymer chain, and concentrations tested, not all anionic biopolymers used in sequential combination with soluble chitosan, exhibit the same ability to cause the formation of very large stable aggregated mass of rock-like solids. This is true for pectin but alginates and carageenans produce curd-like aggregations which may be indicative of fibrillar aggregate formation particularly since fine fibrils formation is observed at low sediment concentrations (~1%) under the same xanthan and chitosan concentrations and ratios.

Example 7

Removal of Suspended Particles of Soils with Xanthan and Chitosan

The xanthan gum-soluble chitosan sequential addition method (dual polymer system) was tested on a water sample containing suspended sediment sample obtained from North Carolina State University. This particular sediment sample was difficult to separate by flocculation when using soluble chitosan alone. The soil sample could be flocced but the floccules would not hold together well while being filtered through a Tencate geotextile fabric. A xanthan/chitosan treatment comprising 0.8 ppm of xanthan gum added first followed by 0.4 ppm of soluble chitosan was used in a suspension created using the North Carolina State University sediment sample (8 grams of soil sediment in 100 ml of water), the treated suspension containing rock-like, fibrillar aggregates of sediment could be filtered through the geotextile. The resulting water exhibited a clarity value of 0.55 NTUs.

Example 8

Removal of Algae Using Xanthan and Chitosan

Figure 21:
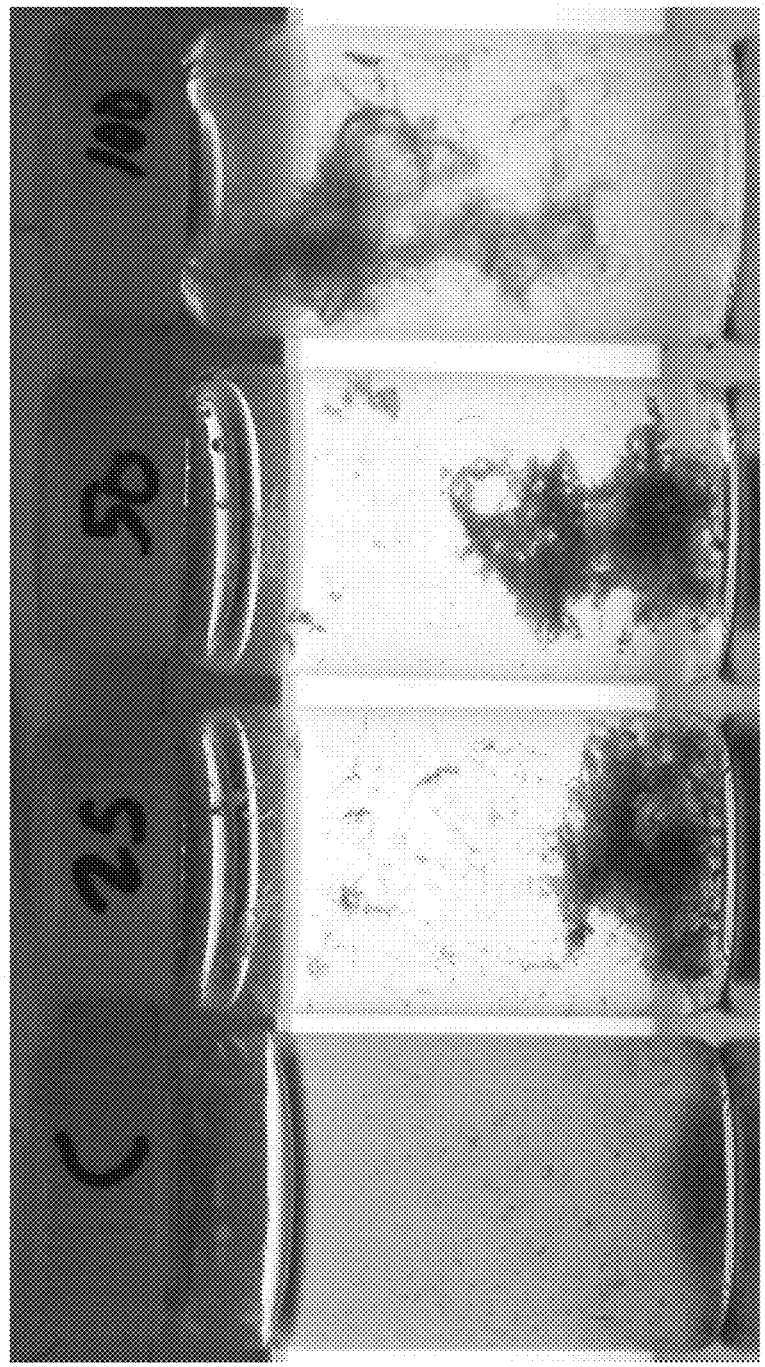
FIG. 21 is a photograph of samples of algae treated with varying concentrations of xanthan and chitosan.

Stock solutions of 1% wt./wt. xanthan in water and of 1% wt./wt. chitosan acetate in water (1% chitosan, 1% glacial acetic acid, 98% water) were prepared. A water sample containing algae that was difficult to floc using chitosan alone, was tested using the xanthan gum-soluble chitosan sequential addition method. With the use of 25 ppm of xanthan gum and 100 ppm of chitosan a very strongly clumping and strand forming floc (fibrillar aggregates) was produced. This represented a 33% reduction in the quantity of soluble chitosan normally used alone to form floccules and the strand-like microalgae clump was more stable. An experiment was conducted to determine if the microalgae aggregate could be affected by dose and xanthan to soluble chitosan ratio. The anionic polymer, xanthan gum, was added at differing concentrations from 25 ppm to 100 ppm, to vials of water containing equal suspensions of microalgae. The microalgae containing control vial labeled "C" received no xanthan gum. Soluble chitosan was then added to each vial in a stepwise addition to a final concentration of 100 ppm. As shown in FIG. 21, strong, large clumped aggregates of microalgae were formed following addition of the chitosan to the microalgae mixtures containing the anionic polymer, xanthan gum. This was in contrast to the control mixtures that did not contain xanthan gum. The nature of the large aggregates of microalgae suggests that it would be easy to collect and harvest.

This example demonstrates that by using an anionic polymer such as xanthan gum and a cationic polymer such as chitosan, added sequentially with the anionic polymer added to the algae suspension first followed by a cationic polymer, such as soluble chitosan, added second, excellent strand-like clumpy aggregation could be achieved. The aggregation of the microalgae observed appears different than what is typically observed for flocculation. The observation with the xanthan gum-soluble chitosan sequential addition method (dual polymer system) is indicative of a clump-like stringy mass that forms interconnected/intertwined structures that would very stable to disruption unlike typical floccules observed in a flocculated suspension of suspended matter.

Example 9

Clean Up of Bilge Water Using Xanthan and Chitosan

Bilge water was tested using the xanthan gum-soluble chitosan sequential addition treatment. The water from a ships bilge contained oil and a variety of other unknown materials. Three 20 ml samples were tested containing 25, 50, or 100 ppm of xanthan gum. Soluble chitosan was added in stepwise increments.

Figure 22A:
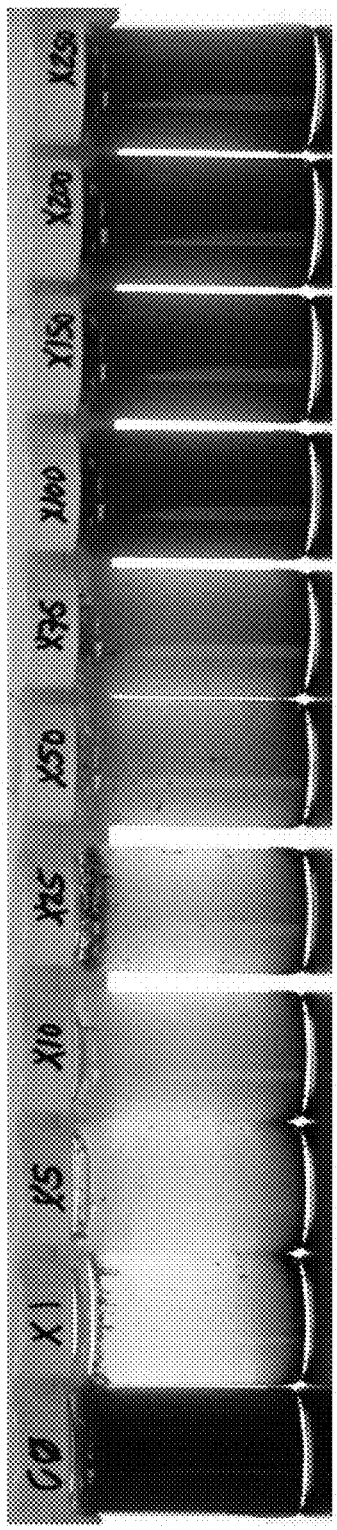
FIG. 22A is a photograph of samples of bilge water treated with varying concentrations of xanthan and chitosan.

FIG. 22A shows the results of adding xanthan gum at concentrations ranging from 0 to 250 ppm from left to right followed by the addition of 10,000 ppm of 1% 100 ppm soluble chitosan. The numerical value at the top of each vial shows the amount of xanthan gum in each vial (i.e. X1=1 ppm, X5=5 ppm, etc.).

Figure 22B:
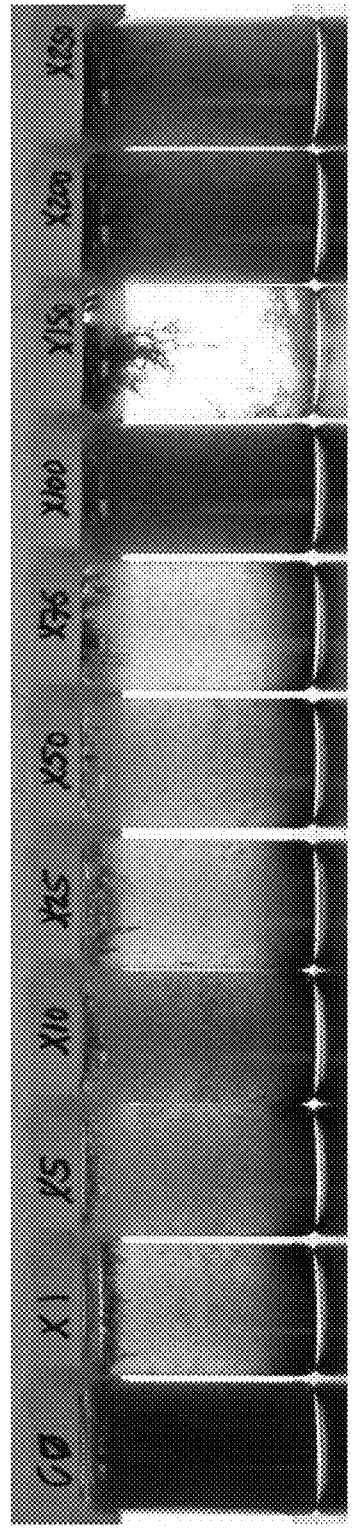
FIG. 22B is a photograph of samples of bilge water treated with varying concentrations of xanthan and chitosan.

FIG. 22B shows the results of treatment with xanthan at the various concentrations but with 200 ppm of chitosan.

Enhanced aggregation of suspended materials was observed using 200 ppm of soluble chitosan following the addition of various concentrations of xanthan gum compared to 100 ppm soluble chitosan. Surprisingly, at 150 ppm xanthan gum followed by 200 ppm of soluble chitosan (X150), the suspended oil particulates or emulsion aggregated into a large strand-like clumps (fibrillar aggregates) similar to the microalgae. This oil material could be easily filtered and/or skimmed from the surface of the bilge water. This clarity of the water is much improved over all other dose combinations tested.

Example 10

Removal of Fat/Oil/Grease with Xanthan and Chitosan Treatment

Experimental Procedure

Preparation of Fat/Oil/Grease Stock 1.3 lbs of beef stew meat was stir fried in 2-3 tablespoons of canola oil along with 1 large chopped onion. After the meat and onions were sautéed, 2.5 cups of water was added. The mixture was brought to a boil, approximately 2 cups of peeled baby carrots was added and heat was reduced. The solution was covered and simmered for approximately 15 minutes. After simmering, 100 grams of Golden Curry Sauce Mix (S&B-medium hot) containing the following ingredients: wheat flour, edible oils (palm oil, soy oil, canola oil), salt, sugar, curry powder, spices, caramel color, monosodium glutamate, malic acid, disodium guanylate, disodium inosinate was broken up and added to the simmering mix and constantly stirred under low heat to melt the curry sauce into the mixture for approximately 10 minutes. The meat, onions and carrots were then strained out using a kitchen strainer. This constituted the oil/fat/grease stock.

Preparation of the Fat/Oil/Grease Water Emulsion

Add 10 grams of the oil/fat/grease stock to 900 ml of water. Shake vigorously for 10 seconds and then stir for 20 minutes. Filter through 50 micron nylon monofilament mesh bag.

Comparison of Xanthan/Chitosan Treatment to Conventional Flocculants for Separation or Breaking of Fat/Oil/Grease Emulsion Xanthan/Chitosan Protocol Stock solutions of 1% wt./wt. xanthan in water and of 1% wt./wt. chitosan acetate in water (1% chitosan, 1% glacial acetic acid, 98% water) were prepared. 20 ml aliquots of the fat/oil/grease water emulsion (FOG) were dispensed into glass vials. Xanthan biopolymer aqueous stock solution was added first to the FOG and the contents were shaken to allow the xanthan polymer to react with the FOG components. The second biopolymer solution comprising soluble chitosan was added to the vial and the contents shaken again. The control received water alone. After shaking, the vials were viewed and the turbidity of each solution was measured using a turbidity meter approximately halfway down from the surface of the solution contained within the vial.

Alum Protocol 20 ml aliquots of the fat/oil/grease water emulsion (FOG) were dispensed into glass vials. Aqueous solution of alum (aluminum sulfate) was added to the vial and the vial contents shaken to allow the alum to react with the FOG components. The control received water alone. After shaking, the vials were viewed and the turbidity of each solution was measured using a turbidity meter approximately halfway down from the surface of the solution contained within the vial.

Anionic Polyacrylamide Protocol 20 ml aliquots of the fat/oil/grease water emulsion (FOG) were dispensed into glass vials. Anionic polyacrylamide A150 solution was added to the vial and the vial contents shaken to allow the anionic polyacrylamide polymer to react with the FOG components. The control received water alone. After shaking, the vials were viewed and the turbidity of each solution was measured using a turbidity meter approximately halfway down from the surface of the solution contained within the vial.

Cationic Polyacrylamide Protocol 20 ml aliquots of the fat/oil/grease water emulsion (FOG) were dispensed into glass vials. Cationic polyacrylamide 9909 solution was added to the vial and the vial contents shaken to allow the cationic polyacrylamide polymer to react with the FOG components. The control received water alone. After shaking, the vials were viewed and the turbidity of each solution was measured using a turbidity meter approximately halfway down from the surface of the solution contained within the vial.

Sequential Combination of Anionic Polyacrylamide Followed by Cationic Polyacrylamide Protocol 20 ml aliquots of the fat/oil/grease water emulsion (FOG) were dispensed into glass vials. Anionic polyacrylamide A150 solution was added first to the FOG and the contents were shaken to allow the anionic polyacrylamide A150 polymer to react with the FOG components. The second solution comprising cationic polyacrylamide 9909 was added to the vial and the contents shaken again. The control received water alone. After shaking, the vials were viewed and the turbidity of each solution was measured using a turbidity meter approximately halfway down from the surface of the solution contained within the vial.

Results and Discussion

Figure 23:
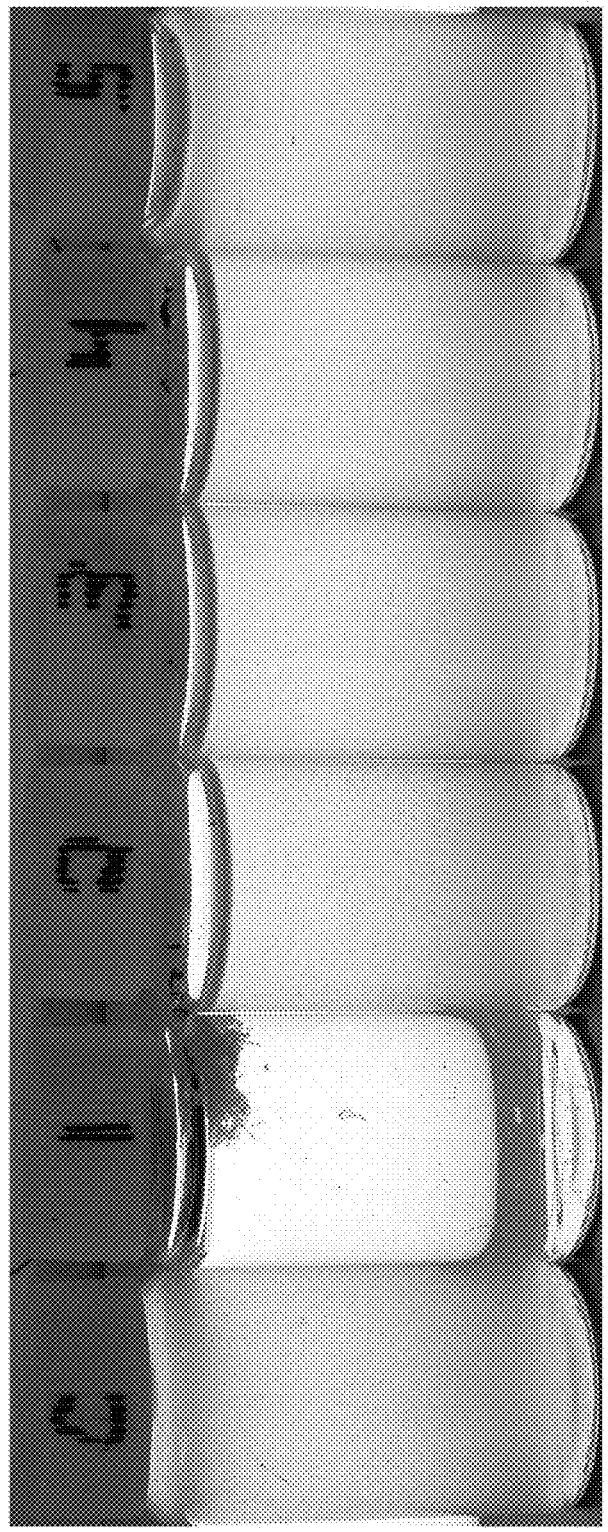
FIG. 23 is a photograph of samples of a fat/oil/grease emulsion treated with varying polymers alone and in combination.

As shown in FIG. 23 vial numbered 1, the sequential addition of xanthan biopolymer followed by soluble chitosan biopolymer resulted in aggregation of the FOG components into a coherent clump (fibrillar aggregate) at the surface of the aqueous phase and clearing of the aqueous phase. This was in contrast to aluminum sulfate alone, cationic polyacrylamide alone, anionic polyacrylamide alone, or anionic polyacrylamide followed by cationic polyacrylamide that did not demonstrate the ability to separate the FOG components from the aqueous phase. The solutions remained turbid with no visible aggregation of FOG components at the surface of the aqueous phase.

C—control, no addition of biopolymer or polymer or alum
1—Xanthan biopolymer added first (25-50 ppm) followed by chitosan (25-50 ppm)
2—Aluminum sulfate added alone (25-50 ppm)
3—Cationic polyacrylamide 9909 added alone (25-50 ppm)

4—Anionic polyacrylamide A150 added alone (25-50 ppm)

5—Anionic polyacrylamide added anionic (25-50 ppm) followed by cationic polyacrylamide (25-50 ppm)

Figure 24A:
FIG. 24A is a photograph of samples of a fat/oil/grease emulsion treated with anionic and cationic polyacrylamide polymers alone and in combination at a high dosage.
Figure 24B:
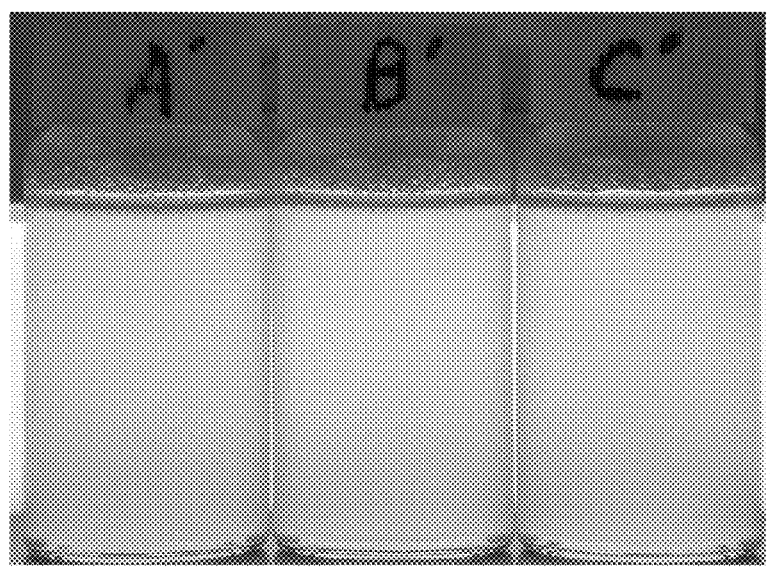
FIG. 24B is a photograph of samples of a fat/oil/grease emulsion treated with anionic and cationic polyacrylamide polymers alone and in combination at a low dosage.

In order to determine if the inability of the alum, cationic polyacrylamide and anionic polyacrylamide to separate the FOG from the aqueous phase was due to concentration, the experiment was repeated using a higher and lower concentration of each chemical. Representative results using 125-250 ppm are shown in FIG. 24A and 5-10 ppm are shown in FIG. 24B.

A—Anionic polyacrylamide A150 added alone (125-250 ppm)

B—Cationic polyacrylamide 9909 added alone (125-250 ppm)

C—Anionic polyacrylamide added first (125-250 ppm) followed by cationic polyacrylamide (125-250 ppm)

A'—Anionic polyacrylamide A150 added alone (5-10 ppm)

B'—Cationic polyacrylamide 9909 added alone (5-10 ppm)

C'—Anionic polyacrylamide added first (5-10 ppm) followed by cationic polyacrylamide (5-10 ppm)

The turbidity of treated solutions from above was measured using a DRT-15CE Turbidimeter manufactured by HF Scientific of Fort Myers, Fla. Readings were taken halfway down from the surface of the solution contained within each vial. Results are shown in Table 8 below.

TABLE 8

| Sample | Treatment | Conc. Stage 1 (ppm) | Conc. Stage 2 (2 ppm) | Turbidity (Nephelometric units) |
|---|---|---|---|---|
| 1 | Dual biopolymers | Xanthan 25-50 | Chitosan 25-50 | 5.79 |
| 2 | Aluminum sulfate | 25-50 | NA | 198 |
| 3 | Cationic polyacrylamide 9909 | 25-50 | NA | 188 |
| 4 | Anionic polyacrylamide A150 | 25-50 | NA | 162 |
| 5 | Anionic polyacrylamide A150 followed by cationic polyacrylamide | 25-50 | 25-50 | 170 |
| A | Anionic polyacrylamide A150 | 125-250 | NA | 168 |
| B | Cationic polyacrylamide 9909 | 125-250 | NA | 256 |
| C | Anionic polyacrylamide A150 followed by cationic polyacrylamide | 125-250 | 125-250 | 110 |
| A' | Anionic polyacrylamide A150 | 5-10 | NA | 231 |
| B' | Cationic polyacrylamide 9909 | 5-10 | NA | 295 |
| C' | Anionic polyacrylamide A150 followed by cationic polyacrylamide | 5-10 | 5-10 | 222 |

N/A—Not applicable

As the results in Table 8 show, the sequential use of xanthan biopolymer followed by chitosan resulted in significant reduction of turbidity and clearing of the aqueous phase in contrast to alum and polyacrylamides. The sequential use of anionic polyacrylamide followed by cationic polyacrylamide at low and high concentrations was not effective at reducing turbidity and separating a fat/oil/grease emulsion from the aqueous phase compared to the sequential use of the anionic biopolymer xanthan followed by the cationic biopolymer chitosan. The data indicates that other polymers are not as effective for this type of suspension.

The sequential use of xanthan biopolymers followed by chitosan would have significant advantages over more traditional flocculants in breaking oil emulsions. It may be possible to use other anionic biopolymer polysaccharides (carrageenan, low methoxy pectin, alginate, agar) in combination with chitosan. It may also be possible to use in sequence anionic biopolymers such as xanthan, alginate, carrageenan, low methoxy pectin, and agar followed by cationic polyacrylamides. It may be possible to use in sequence, anionic polyacrylamides followed by chitosan.

Also, the order of addition where chitosan is added first followed by xanthan second gave the same result as compared to the order of addition where the xanthan is added first and the chitosan second. Both orders of addition formed fibrillar aggregates and broke the emulsion to provide clear solutions with the FOG floating on top. Simultaneous addition of xanthan and chitosan and saw the same results.

Example 11

Removal of Fluoride by Bonding to Removal Media Followed by Treatment with Xanthan and Chitosan Standard Preparation:

A 37 ppm fluoride standard was created by adding 0.0252 g of NaF to a 250 ml graduated ball flask and filling the flask with DI water to the mark.

Testing Method:

Stock solutions of 1% wt./wt. xanthan in water and of 1% wt./wt. chitosan acetate in water (1% chitosan, 1% glacial acetic acid, 98% water) were prepared. The fluoride was measured in accordance with HACH method 10225 using the SPADNS 2 reagent. 10 ml of the fluoride standard was placed into a scintillation vial with a particular mass of media. 2 drops of the 1% wt./wt. xanthan in water solution was added and the vial was shook vigorously, then 2 drops of 1% wt./wt. chitosan acetate in water solution was added and the vial was shook again. 200 µl was taken from the supernatant and added to 9.8 ml of DI water. 2 ml of the SPADNS2 reagent was added to the 1:50 dilution and the sample was read on a DR/4000 HACH analyzer. The results are shown in Table 9 below

TABLE 9

| (Removal of Fluoride) | | |
|---|---|---|
| Treatment media | Fluoride in ppm | Percent Removal |
| 0.1 g bone char (24 hr)* | 15 | 59% |
| 0.05 g bone char (24 hr)* | 20 | 46% |
| 0.1 g bone char | 23 | 38% |
| 0.1 g lanthanum carbonate | 10 | 73% |
| 0.1 g lanthanum oxide | 7 | 81% |
| 0.1 g zirconium oxide | 35 | 5% |
| 0.1 g calcium carbonate | 37 | 0% |
| 0.1 g calcium phosphate | 39 | 0% |
| 0.1 g cerium oxide | 0.04 | 100% |
| 0.1 g FeO(OH) | 25 | 32% |
| 0.025 g PAC | 30.5 | 18% |
| 0.1 g zirconium hydroxide | 3.3 | 91% |

*bone char sat in the 10 ml of standard solution overnight

The lanthanum oxide and cerium oxide look to be promising within the application of removing the fluoride ion from water.

Example 12

Formation of Fibrillar Aggregates

Polymers demonstrating fibrillar cohesive aggregation. Percents are in weight percent. "Liquifloc 1%" is a chitosan acetate solution (1% chitosan in 1% glacial acetic acid in 98% water).

TABLE 10

| Stage 1 Polymer | Stage 2 Polymer |
| --- | --- |
| *Glucomannan 1% | Liquifloc 1% |
| Carrageenan 1% | Liquifloc 1% |
| Carbomer 940 (Spectrum, C1184) acrylic acid polymer) 1% | Liquifloc 1% |
| Cellulose Gum (sodium carboxymethylcellulose, Aqualon) 1% | Liquifloc 1% |
| Anionic Polyacrylamide 0.5% | Liquifloc 1% |
| Xanthan 1% | Liquifloc 1% |
| Liquifloc 1% | *Glucomannan 1% |
| Liquifloc 1% | Carrageenan 1% |
| Liquifloc 1% | Carbomer 940 (Spectrum, C1184) acrylic acid polymer) 1% 1% |
| Liquifloc 1% | Cellulose Gum 1% |
| Liquifloc 1% | Anionic Polyacrylamide 0.5% |
| Cationic polyacrylamine 1% | Xanthan 1% |
| Xanthan 1%/Liquifloc 1% (simultaneous addition) | (simultaneous addition) |
| Liquidfloc 1%/xanthan 1% (reverse addition) | (reverse addition) |
| Control-no polymers added | control-no polymer added |

*neutrally charged polymer

~5.8 g of Arizona dirt (sieved through 20 mesh screen) was added to 450 ml of water. 20 drops of stage 1 polymer was added and the sample solution was shaken. This was followed by 10 drops of stage 2 polymer and the dirt sample solution was again shaken. In one case, both stage 1 and stage 2 polymers were added to the dirt solution simultaneously. The treated dirt sample solution was then poured through a stack of metal screen filters of defined mesh size (U.S.A. Standard Testing Sieve, A.S.T.M.E.-11 specification) that were stacked onto a collection basin with decreasing mesh size [#10 mesh (2 mm), #14 mesh (1.4 mm), #20 mesh (0.850 mm), descending from top to bottom so as the solutions are poured through the stack, the largest fibrillar cohesive aggregates are caught on the top uppermost metal screen (#10 mesh) followed by the next metal screen (#14), followed by the next metal screen (#20) and the smallest size particles falls through into the collection basin below. The fibrillar cohesive aggregated dirt sediment contained on each filter was dried by placing the metal screen in a 55° C. oven, and the dried material was weighed. The filtrate in the collection basin was evaporated to dryness, and the weight of any material remaining in the collection basin was also obtained. Dried material, if any, on each screen was expressed as a percentage of the total weight collected on all screens and in the collection basin. Data presented in the Tables below.

TABLE 11

| Xanthan 1% Stage 1 | | | | |
| --- | --- | --- | --- | --- |
| Mesh size | Tare weight (g) | Final weight (g) | Weight collected | % collected (of total collected) |
| #10 | 154.99 | 160.44 | 5.45 | 96.50% |
| #14 | 154.98 | 155.00 | 0.02 | 0.35% |

TABLE 11-continued

| Xanthan 1% Stage 1 | | | | |
| --- | --- | --- | --- | --- |
| Mesh size | Tare weight (g) | Final weight (g) | Weight collected | % collected (of total collected) |
| #20 | 154.79 | 154.83 | 0.04 | 0.71% |
| Basin | 155.02 | 155.16 | 0.14 | 2.48% |

TABLE 12

| Glucomannan 1% Stage 1 | | | | |
| --- | --- | --- | --- | --- |
| Mesh size | Tare weight | Final weight | Weight collected | % collected (of total collected) |
| #10 | 154.99 | 155.11 | 0.12 | 2.23% |
| #14 | 155.00 | 155.09 | 0.09 | 1.67% |
| #20 | 154.82 | 154.99 | 0.17 | 3.15% |
| Basin | 155.03 | 160.04 | 5.01 | 92.95% |

TABLE 13

| Carrageenan 1% Stage 1 | | | | |
| --- | --- | --- | --- | --- |
| Mesh size | Tare weight | Final weight | Weight collected | % collected (of total wt. collected) |
| #10 | xxx | xxx | xxx | Xxx |
| #14 | 155.01 | 155.14 | 0.13 | 2.50% |
| #20 | 154.80 | 155.00 | 0.20 | 3.85% |
| Basin | 155.03 | 159.90 | 4.87 | 93.65% |

10 mesh was contaminated in the oven while drying

TABLE 14

| Carbomer 940 (Spectrum, C1184) acrylic acid polymer) 1% carbomer 940 Stage 1 | | | | |
| --- | --- | --- | --- | --- |
| Mesh size | Tare weight | Final weight | Weight collected | % collected (of total wt. collected) |
| #10 | 154.99 | 156.71 | 1.72 | 31.11% |
| #14 | 155.00 | 155.13 | 0.13 | 2.35% |
| #20 | 154.79 | 154.92 | 0.13 | 2.35% |
| Basin | 155.03 | 158.58 | 3.55 | 64.20% |

TABLE 15

| Anionic Polyacrylamide 0.5% Stage 1 | | | | |
| --- | --- | --- | --- | --- |
| Mesh size | Tare weight | Final weight | Weight collected | % collected (of total weight collected) |
| #10 | 155.00 | 155.03 | 0.03 | 0.55% |
| #14 | 155.01 | 155.03 | 0.02 | 0.36% |
| #20 | 154.81 | 154.88 | 0.07 | 1.28% |
| Basin | 155.04 | 160.41 | 5.37 | 97.81% |

TABLE 16

Cellulose Gum (sodium carboxymethylcellulose, Aqualon 1%) Stage 1

| Mesh size | Tare weight | Final weight | Weight collected | % collected (of total weight collected) |
|---|---|---|---|---|
| #10 | 154.99 | 155.08 | 0.09 | 1.60% |
| #14 | 155.00 | 155.01 | 0.01 | 0.18% |
| #20 | 154.81 | 154.90 | 0.09 | 1.60% |
| Basin | 155.03 | 160.47 | 5.44 | 96.63% |

TABLE 17

Cationic Polyacrylamide 1% Stage 1

| Mesh size | Tare weight | Final weight | Weight collected | % collected (of total weight collected) |
|---|---|---|---|---|
| #10 | 154.99 | 155.05 | 0.06 | 1.08% |
| #14 | 155.00 | 155.04 | 0.04 | 0.72% |
| #20 | 154.81 | 154.90 | 0.09 | 1.62% |
| Basin | 155.03 | 160.39 | 5.36 | 96.58% |

TABLE 18

Liquifloc 1% Stage 1/xanthan 1% stage 2 (reverse addition)

| Mesh size | Tare weight | Final weight | Weight collected | % collected (of total weight collected) |
|---|---|---|---|---|
| #10 | 154.71 | 155.61 | 0.90 | 16.0% |
| #14 | 154.96 | 155.09 | 0.13 | 2.32% |
| #20 | 154.79 | 156.27 | 1.52 | 27.09% |
| Basin | 154.97 | 158.03 | 3.06 | 54.55% |

TABLE 19

Xanthan 1% Stage 1/Liquifloc 1% (simultaneous addition)

| Mesh size | Tare weight | Final weight | Weight collected | % collected (of total weight collected) |
|---|---|---|---|---|
| #10 | 154.99 | 159.91 | 4.85 | 86.61% |
| #14 | 120.26 | 120.28 | 0.02 | 0.36% |
| #20 | 120.11 | 120.14 | 0.03 | 0.54% |
| Basin | 118.47 | 119.17 | 0.70 | 12.5% |

TABLE 20

Control (no polymers added)

| Mesh size | Tare weight | Final weight | Weight collected | % collected (of total weight collected) |
|---|---|---|---|---|
| #10 | 154.76 | 154.77 | 0.01 | 0.02% |
| #14 | 154.97 | 155.03 | 0.06 | 1.23% |
| #20 | 154.79 | 154.79 | 0.00 | 0% |
| Basin | 155.01 | 159.82 | 4.81 | 98.57% |

5.8 grams of Arizona dirt (−60 mesh) was aggregated with 10 ppm chitosan followed by 20 ppm xanthan. Aggregates were poured on stacked 20 mesh and 80 mesh screens in order to determine if an 80 mesh screen could remove the fibrillar cohesive aggregate sufficiently to achieve a reasonable reduction of turbidity on a reverse addition. The turbidity values are presented below.

TABLE 21

| Dirt (g) | Water (ml) | Chitosan (ppm) | Xanthan (ppm) | Pre-Treatment Turbidity (NTU) | Turbidity of Filtrate (NTU) | Percent Turbidity Reduction |
|---|---|---|---|---|---|---|
| 5.8 | 450 ml | 10 | 20 | 950 | 14.1 | 98.52% |

TABLE 22

Liquifloc 1% Stage 1/xanthan 1% stage 2 (reverse addition)

| Mesh size | Tare weight | Final weight | Weight collected | % collected (of total weight collected) |
|---|---|---|---|---|
| #20 | 155.21 | 159.83 | 4.62 | 79.70% |
| #80 | 154.78 | 155.09 | 0.31 | 5.34% |

Example 13

Removal of MS2 and *E. coli* from Water Using Xanthan and Chitosan

Summary Description of Method:

Two filter sizes, 1 mm sieve and 100 μm filter, were tested in sequence using the same GTW1 sample water. The removal of bacteria by formation and filtration or settling of a fibrillar cohesive aggregate using a combination of xanthan and chitosan were tested using a 3/3-log suspension of MS2 and *E. coli* in GTW1 water. The polymers xanthan and chitosan were added to a bacterial (*E. coli*) and Viral (MS2) suspension contained in GTW1 water and mixed. The fibrillar cohesive aggregates that formed were removed by filtration, and the filtrate was examined for MS2 and *E. coli* removal efficacy.

Reagents & Equipment:
  3-logs MS2
  3-logs *E. coli*
  GTW1 water (USEPA General Test Water-dechlorinated tap water)
  Xanthan polymer solution (1% wt./wt.) in water
  Chitosan acetate polymer solution (1% wt./wt., 1% wt./wt. glacial acetic acid, 98% wt./wt. water)
  1 mm pore size stainless steel kitchen sieve
  100 μm mesh nylon monofilament filter
  0.22 um filter Procedure: Test #1
  1. The day before testing start a 10 ml overnight TSB culture of *E. coli* #11229, incubate overnight at 37° C.
  2. In the morning pellet the bacteria for 20 min at 3,000 rpm. Wash pellet 1× in 10 ml of DPBS.
  3. Suspend washed pellet in 5 ml of DPBS.
  4. Make a 1:1000 dilution of MS2 and *E. coli*, using 1 ml of stock solution in 9 ml DPBS and diluting accordingly.
  5. Prep for sample filtration.

6. Label 1 L bottle:
   i. Xanthan and chitosan
7. Dose bottle with 3/3 logs per milliliter of MS2 and *E. coli*
   a) Dilute MS2 bacteriophage 1:1000 in DPBS and dilute *E. coli* 1:100 in DPBS and
   b) Add 250 μL of the 1:1000 and 1:100 dilutions respectively to 500 ml to achieve a 3/3-log concentration of MS2 and *E. coli*.
   c) Collect 10 ml challenge sample from one of the 500 ml flasks.
8. Collect 10 ml challenge sample and plate onto Bottom agar and Endo agar −0 through −2
9. Add 20 drops of xanthan polymer solution and shake vigorously.
10. Add 10 drops of chitosan acetate solution and shake vigorously.
11. Following steps 6-8 allow for the sample to settle at least 10 mins before collecting 10 ml for plating.
12. After 10 minutes filter the sample containing the settled aggregate through the 1 mm sieve.
13. Collect 10 ml sample and plate onto Bottom agar and Endo agar −0 through −2. Incubate plates overnight at 37° C.
14. After filtering sample through 1 mm sieve collect flow through and filter through 100 um filter.
15. Collect 10 ml sample and plate dilute onto Bottom agar and Endo agar −0 through −2. Incubate plates overnight at 37° C.
16. After filtering sample through 1 mm sieve, collect flow through and filter through a 0.22 μm filter.
    Collect 10 ml sample and plate dilute onto Bottom agar and Endo agar −0 through −2. Incubate plates overnight at 37° C.

Example 14

Reduction of *E. coli* and MS2 in the Presence of Dirt Using Xanthan and Chitosan Polymers Summary Description:

One filter size, a 1 mm pore size sieve, will be tested using the GTW1 sample water. The removal of bacteria and virus was tested by treating an aqueous dirt suspension of *E. coli* bacteria and the MS2 virus with a combination of xanthan and chitosan polymers followed by settling or filtration of a fibrillar cohesive aggregate. A 3/3-log suspension of MS2 and *E. coli* in GTW1 water containing dirt was prepared. A soluble xanthan polymer was added to the suspension followed by a soluble chitosan polymer after mixing. The microbial suspension containing dirt and both polymers was mixed and the formed fibrillar cohesive aggregates were allowed to settle. The uppermost water layer away from the settled aggregate was sampled and plated for both bacterial and viral quantitation. The polymer treated suspension of microbes and dirt was also filtered through a 1 mm pore size sieve and the filtrate evaluated for MS2 and *E. coli* removal efficacy.

Reagents & Equipment:
- 3-logs MS2
- 3-logs *E. coli*
- GTW1 water
- Polymer B (Biopolymer LBP 2101)
- Polymer C (StormKlear Natural Clarifier)
- 1 mm kitchen sieve
- 100 µm mesh filter
- 5.8 g of −60 mesh screened Bellevue Dirt Procedure: Test #1

17. The day before testing start a 10 ml overnight TSB culture of *E. coli* #11229, incubate overnight at 37° C.

TABLE 23

| Challenge | *E. Coli* Counts Following Treatment with Xanthan and Chitosan | | | | | | | | |
|---|---|---|---|---|---|---|---|---|---|
| *E. coli* Chall cfu/ml | *E. coli* cfu/ml Settling | *E. coli* cfu/ml Sieve | *E. coli* cfu/ml 100 µm | *E. coli* LRV Settling | *E. coli* % Red Settling | *E. coli* LRV Sieve | *E. coli* % Red Sieve | *E. coli* LRV 100 µm | *E. coli* % Red 100 µm |
| 2.60E+03 | 5.00E+02 | 3.50E+02 | 5.96E+02 | 0.72 | 80.77 | 0.87 | 86.54 | 0.64 | 77.08 |

| | MS2 Counts Following Treatment of MS2 Suspension with xanthan and chitosan | | | | | | | | | | | |
|---|---|---|---|---|---|---|---|---|---|---|---|---|
| MS2 Chall cfu/ml | MS2 cfu/ml Settling | MS2 cfu/ml Sieve | MS2 cfu/ml 100 µm | MS2 cfu/ml Filter | MS2 LRV Settling | MS2 % Red Settling | MS2 LRV Sieve | MS2 % Red Sieve | MS2 LRV 100 µm | MS2 % Red 100 µm | MS2 LRV 0.22 um Filter | MS2 % cfu/ml Filter |
| 1.61E+03 | 8.00E+00 | 1.10E+01 | 3.00E+00 | 2.00E+00 | 2.30 | 99.50 | 2.17 | 99.32 | 2.73 | 99.32 | 2.91 | 99.88 |

Conclusion

Addition of the xanthan and chitosan polymers to a bacterial and viral suspension followed by settling and/or filtration demonstrates that the number of bacteria and virus can be reduced. An average LRV (log reduction value) of 0.74 was observed for *E. coli* across sampling methods that included settling alone without filtration or filtration through a 1 mm sieve or a 100 µm filter. Removal of the MS2 virus was also demonstrated. Using a 3 log MS2 challenge, an average LRV of 2.53 was observed across sampling methods that included settling alone without filtration or filtration through a 1 mm sieve and a 100 µm filter and a 0.22 um filter.

18. In the morning pellet the bacteria for 20 min at 3,000 rpm. Wash pellet 1× in 10 ml of DPBS.
19. Suspend washed pellet in 5 ml of DPBS.
20. Make a 1:1000 dilution of MS2 and *E. coli*, using 1 ml of stock solution in 9 ml DPBS and diluting accordingly.
21. Prep for sample filtration.
22. Label 2×1 L bottles:
    ii. Polymer B (xanthan addition) and Polymer C (chitosan addition)
    iii. Control
23. Each bottle was dosed with MS2 and *E. coli* to a final concentration of 3/3 logs per ml as described as follows:

d) Dilute MS2 bacteriophage 1:1000 in DPBS and dilute E. coli 1:100 in DPBS and
e) Add 250 μL of the 1:1000 and 1:100 dilutions respectively into 500 ml to achieve a 3/3-log concentration of MS2 and E. coli.
f) Collect 10 ml challenge sample from one of the 500 ml flasks.

24. Collected 10 ml challenge sample and plate onto Bottom agar and Endo agar −0 through −2
25. To each 1 L bottle added 5.8 g of Bellevue dirt.
26. 35 drops of xanthan solution was added to the bottle labeled Polymer B & Polymer C followed by vigorous shaking.
27. This was followed by addition of 10 drops of Polymer C and the bottle was again vigorously shaken.
28. Following steps 6-8, the samples were allowed to settle at least 10 minutes before collecting 10 mL into conical vials.
29. After 10 minutes the samples were filtered through the 1 mm sieve.
30. 10 ml of samples were collected into conical vials and plated onto Bottom agar and Endo agar −0 through −2. Plates were incubated overnight at 37° C.

TABLE 24

Results

| Date | Challenge E. Coli | E. coli Chall cfu/ml | E. coli cfu/ml Settling | E. coli cfu/ml Sieve | E. coli LRV Settling | E. coli % Red Settling | E. coli LRV Sieve | E. coli % Red Sieve |
|---|---|---|---|---|---|---|---|---|
| | | | | Polymer B + C | | | | |
| Apr. 7, 2010 | EC | 6.20E+03 | 1.30E+01 | 1.50E+01 | 2.68 | 99.79 | 2.62 | 99.76 |
| | | | | Control | | | | |
| | | | 5.80E+03 | 4.70E+03 | 7.40E+03 | 0.03 | 6.45 | 0.12 |

| Date | Challenge MS2 | E. coli Chall cfu/ml | MS2 cfu/ml Settling | MS2 cfu/ml Sieve | MS2 LRV Settling | MS2 % Red Settling | MS2 LRV Sieve | MS2 % Red Sieve |
|---|---|---|---|---|---|---|---|---|
| | | | | Polymer B + C | | | | |
| Apr. 7, 2010 | MS2 | 6.80E+03 | 1.00E+00 | 0.00E+00 | 3.83 | 99.99 | 3.83 | 100.00 |
| | | | | Control | | | | |
| | | — | 7.60E+03 | 7.40E+03 | — | — | −0.05 | |

Conclusion

Addition of a xanthan solution followed by a chitosan solution to a dirt suspension of E. coli and MS2 virus, resulted in formation of a fibrillar cohesive aggregate that settled to the bottom of a bottle and could removed by gravity filtration onto a 20 mesh sieve. Bacterial and viral counts of the filtrate and non-filtered upper aqueous layer ("supernatant" obtained after settling) showed a reduction in microbial counts compared to a non-polymer treated controls.

Example 15

Reduction of Enterococcus Bacteria in a Dirt Suspension Using Xanthan and Chitosan with Filtration Through a 1 Mm Sieve Summary Description:
The removal of Enterococcus bacteria, contained in a suspension of dirt, by fibrillar cohesive aggregation using a sequential combination of a xanthan solution and a chitosan solution was tested using a 3/3-log suspension of *Enterococcus* in GTW1 water. Xanthan and Chitosan were sequentially added to a dirt suspension containing *Enterococcus*, and mixed to form an aggregate that could be removed over a coarse 20 mesh screen by gravity filtration. The filtrate was examined for *Enterococcus* to determine the efficacy of removal using this system.

Reagents & Equipment:

3-logs *Enterococcus faecalis,*
GTW1 water
Polymer B (Xanthan in water 1% wt./wt.)
Polymer C (Chitosan 1% wt./wt. in 1% wt./wt. glacial acetic acid in 98% wt./wt. in water)
1 mm kitchen sieve
5.8 g −60 mesh sieved Bellevue, Wash., Dirt
BHI Agar Procedure: Test #1

31. The day before testing a 10 ml overnight BHI culture of *Enterococcus faecalis*, was incubated overnight at 37° C.
32. In the morning, the bacteria was pelleted for 20 min at 3,000 rpm. Pellet was washed 1× in 10 ml of DPBS.
33. Washed pellet was then suspended in 10 ml of DPBS.
34. A 1:100 dilution of *Enterococcus*, was prepared using 1 ml of stock solution in
9 ml DPBS and diluting accordingly.
35. Prep for sample filtration.
36. 2×1 L bottles were labeled as described below and 500 ml of GTW1 water was added to each bottle:
iv. Polymer B and Polymer C
v. Control
37. Each 1 L bottle was dosed with *Enterococcus* to give a solution of −3 logs per milliliter of *Enterococcus* as follows:
g) *Enterococcus* was diluted 1:100 in DPBS and
h) 250 uL of the 1:100 dilution was added to each 1 L bottle to achieve a final 3-log/ml concentration of *Enterococcus.* i) 10 ml of the challenge sample from one of the 500 ml bottles was removed to a conical vial, vortexed before plating onto BHI agar −0 through −2 to determine the challenge count.
38. 5.8 g Bellevue dirt was added to each 1 L bottle and the contents shaken.
39. This was followed by 35 drops of xanthan solution to the bottle labeled Polymer B & Polymer C after which the bottle was vigorously shaken.
40. 10 drops of chitosan solution was then added and the bottle vigorously shaken.
41. Following steps 6-10 samples in the bottles were allowed to settle at least 10 mins.
42. After 10 minutes, a 10 ml sample was collected from each bottle into a 15 ml conical vial and vortexed prior to plating onto BHI agar −0 through −2. The remaining sample solution in each bottle was filtered through a 1 mm sieve.
43. The filtrates from the control bottle and the polymer treatment bottle were collected and 10 ml samples were placed into 15 ml conical vials, vortexed and plated onto BHI agar −0 through −2
44. Agar plates were incubated 48 hrs at 37° C.

TABLE 25

| Date | Challenge *Enterococcus* cfu/ml | *Enterococcus* cfu/ml Sieve | *Enterococcus* LRV Sieve | *Enterococcus* % Reduction Sieve |
|---|---|---|---|---|
| Apr. 21, 2010 | 5.00E+03 | Polymer B & C | | |
| | | 2.70E+01 | 2.27 | 99.46 |
| | | Control w/o Polymer B & C | | |
| | | 4.90E+03 | 0.0088 | 2.00 |

Conclusion

Sequential treatment of a dirt solution containing *Enterococcus* with a xanthan solution and a chitosan solution followed by filtration over a 1 mm sieve resulted in a 2.27 LRV of *Enterococcus* compared to the control non-polymer treated.

Example 16

Naphthenic Acid Removal from an Aqueous Media Containing Powdered Activated Carbon and/or Dirt/Clay Using Xanthan and Chitosan Polymers and Filtration General Description:

Tap water was spiked with naphthenic acid alone or naphthenic acid in combination with the following: Arizona dirt; powdered activated carbon; Arizona dirt plus powdered activated carbon; kaolin clay. An aliquot of a soluble solution of xanthan polymer was added and the mixture vigorously mixed followed by the addition of an aliquot of a soluble chitosan solution again followed by additional vigorous mixing. The solution was then filtered through a 20 mesh sieve (850 um pore size), and the filtrate from the various treatments was tested for naphthenic acid by Texas Oil Tech using method UOP 565.

TABLE 26

| Sample | Naphthenic acid (mg KOH/g) | Percent removal |
|---|---|---|
| Control | 0.48 | — |
| Arizona Dirt | 0.34 | 29% |
| Powdered Activated Carbon | 0.22 | 54% |
| Arizona Dirt + Powdered Act. Carbon | 0.34 | 29% |
| DPS | 0.43 | 10% |
| Kaolin Clay | 0.66 | — |

Control water samples were spiked with a commercial source of naphthenic acid solution (Aldrich Chemical, catalog #70340-250) by adding 2.5 ml of the naphthenic acid solution to 250 ml of tap water to prepare an approximately 1% solution.

Arizona Dirt Sample:

495 ml of tap water was spiked with 5 ml of a 1% solution of naphthenic acid and 5.8 g of Arizona dirt (−60 mesh sieved). The solution was vigorously shaken and poured into 250 ml portions. One portion served as a control (this was not analyzed, see below). The other portion was treated sequentially with a soluble xanthan solution to a final xanthan concentration of 20 ppm and vigorously mixed. This was followed by the addition of a soluble chitosan solution to a final chitosan concentration of 10 ppm. The solution was again vigorously mixed and then poured through a 20 mesh (850 μm) sieve by gravity flow into a sample bottle. A fibrillar cohesive aggregate was isolated on the screen and the aggregate-free filtrate was analyzed for naphthenic acid.

Activated Carbon:

495 ml of tap water was spiked with 5 ml of a 1% solution of naphthenic acid and 275 μg of powdered activated carbon (Calgon). The solution was vigorously mixed and poured into 250 ml portions. One portion served as a control (this was not analyzed, see below). The other portion was treated sequentially with a soluble xanthan solution to a final xanthan concentration of 40 ppm and vigorously mixed. This was followed by the addition of a soluble chitosan solution to a final chitosan concentration of 20 ppm. The solution was again vigorously mixed and then poured through a 20 mesh (850 μm) sieve by gravity flow into a sample bottle. A "carbon powder particulate in an oil-like aggregate" was isolated on the screen and the "carbon powder particulate in an oil-like aggregate"-free filtrate was analyzed for naphthenic acid.

Arizona Dirt+Powdered Activated Carbon:

495 ml of tap water was spiked with 5 ml of a 1% solution of naphthenic acid, 6.4 g of Arizona dirt and 275 μg of activated carbon. The solution was vigorously mixed and poured into 250 ml portions. One portion was a control (this was not analyzed, see below). The other portion was treated sequentially with a soluble xanthan solution to a final xanthan concentration of 20 ppm and vigorously mixed. This was followed by the addition of a soluble chitosan solution to a final chitosan concentration of 10 ppm. The solution was again vigorously mixed and then poured through a 20 mesh (850 μm) sieve by gravity flow into a sample bottle. A dirt and "light" carbon powder fibrillar cohesive aggregate and a "carbon powder particulate in an oil-like aggregate" was formed and both composites were isolated on the screen and the filtrate was analyzed for naphthenic acid.

DPS:

250 ml of tap water was spiked with 2.5 ml of 1% solution of naphthenic acid. The solution was vigorously mixed and poured into 250 ml portions. One portion was a control (this was not analyzed, see below). The other portion was treated sequentially with a soluble xanthan solution to a final xanthan concentration of 40 ppm and vigorously mixed. This was followed by the addition of a soluble chitosan solution to a final chitosan concentration of 20 ppm. The solution was again vigorously mixed and then poured through a 20 mesh (850 µm) sieve by gravity flow into a sample bottle. An oily-like sheen was observed on the surface of the water and could not be isolated onto the screen. The filtrate was analyzed for naphthenic acid.

Kaolin Clay:

250 ml of tap water was spiked with 2.5 ml of a 1% solution of naphthenic acid and 3.2 g of Kaolin clay powder. The solution was vigorously shaken and poured into 250 ml portions. One portion served as a control (this was not analyzed, see below). The other portion was treated sequentially with a soluble xanthan solution to a final xanthan concentration of 70 ppm and vigorously mixed. This was followed by the addition of a soluble chitosan solution to a final chitosan concentration of 34 ppm. The solution was again vigorously mixed and then poured through a 20 mesh (850 µm) sieve by gravity flow into a sample bottle. A fibrillar cohesive aggregate was isolated on the screen and the filtrate was analyzed for naphthenic acid.

The Arizona dirt, activated carbon, and the Arizona dirt+ activated carbon samples each had a control portion that was created, but not analyzed.

Conclusion

The results demonstrate that powdered activated carbon in combination with sequential addition of a xanthan solution and a chitosan solution followed by filtration through a 850 µm pore screen can effectively reduce the concentration of naphthenic acid in the filtered water. Arizona dirt or Arizona dirt plus powdered activated carbon also reduced the naphthenic acid concentration following sequential treatment with a xanthan solution and a chitosan solution followed by filtration through a 20 mesh (850 µm) sieve. The Arizona dirt or the Arizona dirt powdered activated carbon combination was not as effective as powdered activated carbon.

Example 17

Measurement of Fibrillar Dimensions

Solutions of fibrillar aggregates were poured through a Millipore Milliflex filtration funnel with a filter paper. The filter paper used in the funnel is 22 µm and has dotted grids printed on the filter paper representing 3 mm squares.

Once the fibrillar matter was collected on the filter paper, it was removed from the filter funnel unit and viewed with a Bausch and Lomb dissecting microscope. A 2 mm American Optical Company micro ruler having divisions of 0.01 mm was used to take length and width measurements of the fibrillar strands or "fibers".

Fibrillar aggregates were prepared using 0.1 g of powdered activated carbon in 450 ml DI water and adding 20 ppm xanthan gum and 10 ppm chitosan. A fiber was isolated and is shown in FIGS. 12A and 12B. The fiber has a length of 1.4 mm and a width of 0.04 mm, for a length to width ratio of 35:1.

Fibrillar aggregates were prepared using 0.1 g of (−)120 mesh iron oxide hydroxide in 450 ml DI water and adding 20 ppm xanthan gum and 10 ppm chitosan. A fiber was isolated and is shown in FIGS. 13A and 13B. The fiber has a length of 2.6 mm and a width of 0.04 mm, for a length to width ratio of 65:1.

Fibrillar aggregates were prepared using 0.1 g of titanium dioxide in 450 ml DI water and adding 20 ppm xanthan gum and 10 ppm chitosan. A fiber was isolated and is shown in FIGS. 14A and 14B. The fiber has a length of 0.65 mm and a width of 0.04 mm, for a length to width ratio of 16.25:1.

Fibrillar aggregates were prepared using 5.8 g of Arizona clay in 450 ml DI water and adding 20 ppm xanthan gum and 10 ppm chitosan. A first fiber was isolated and is shown in FIGS. 15A and 15B. The first fiber has a length of 4 mm and a width of 0.4 mm, for a length to width ratio of 10:1. A second fiber was isolated and is shown in FIGS. 15C and 15D. The second fiber has a length of 2 mm and a width of 0.25 mm, for a length to width ratio of 8:1.

Fibrillar aggregates were prepared using 1 ml of 30% Mature Fine Tailings solids in 9 ml of DI water and adding 300 ppm of xanthan gum and 175 ppm of chitosan. A fiber was isolated and is shown in FIGS. 16A and 16B. The fiber has a length of 5.5 mm and a width of 0.4 mm, for a length to width ratio of 13.75:1.

Fibrillar aggregates were prepared using 450 ml of an algae solution and adding 40 ppm xanthan gum and 20 ppm chitosan. A fiber was isolated and is shown in FIG. 17. The fiber has a length of 3.4 mm and a width of 0.03 mm for a length to width ratio of 113:1.

Example 18

Comparison of Cohesive Aggregates and Floccules

Data was gathered for demonstrating the difference between a "cohesive aggregate" created by the anionic and cationic polymers via "aggregation" versus a floccule created by the traditional process known as "coagulation and flocculation"

A suspension of dirt (Bellevue) will floc when an aliquot of soluble chitosan acetate is added. The floccules will settle under gravity resulting in a clear (lower turbidity) supernatant. If this flocculated suspension is poured through a kitchen sieve or strainer (1 mm pore size opening), the floccules tend to break up and pass through the screen into the filtrate resulting in filtrate water that is not clear. This likely is due to weak cohesive forces holding the floccule together.

In contrast, when anionic and cationic polymers, such as xanthan and chitosan polymers, are used according to the method disclosed herein on a dirt suspension, a rapidly formed fibrillar cohesive entangled aggregate of fibrils (almost gummy-like) is created and appears significantly different compared to a more typical floccule. This entangled aggregate can appear rocklike as if the entangled aggregate forms stronger tighter cohesions as if the fibrils collapse into a tighter ball when a higher dose of the xanthan and chitosan is used. This is also observed when the order of addition is reversed.

Two plastic bottles each containing 40 g of Bellevue dirt (sieved through 60 mesh screen) and 475 ml of DI water were prepared and vigorously mixed to homogeneously suspend the sediment. 5 drops of Liquifloc 1% (chitosan acetate solution) was added to one of the bottles and it was then vigorously shaken. Nothing was added to the second container which served as a control. The samples were allowed to sit for 5 minutes to allow the sediment to settle.

Figure 25:
FIG. 25 is a photograph of floccules compared to a control.

After 5 minutes, the chitosan treated suspension resulted in formation of floccules that settled under gravity resulting in a clear upper solution (see FIG. 25, bottle on right). This was in contrast to the control (see FIG. 25, bottle on the left) that exhibited suspended sediment and a highly turbid suspension. The turbidity was read by taking 10 ml of solution from the upper third of the top of each container. The Control had to be diluted by a factor of 15 with water before taking the turbidity reading because it was so high. See Table

TABLE 27

Results

| Sample | Dilution | Upper Bottle Turbidity (NTU) |
|---|---|---|
| Control | 15 | 23,100 (corrected for dilution) |
| Liquifloc 1% treated | 0 | 63.4 |

Figure 26:
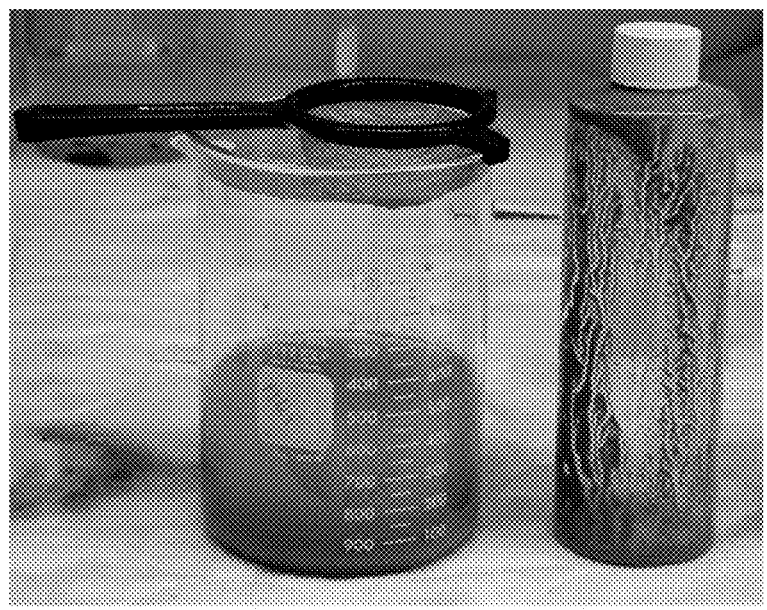
FIG. 26 is a photograph of floccules passing through a 1 mm sieve.

After allowing the floccules to settle for 5 minutes, the Liquifloc 1%-treated solution was poured through a 1 mm pore size kitchen sieve and the turbidity of the filtrate was immediately determined. See FIG. 26 wherein the absence of floccules on the screen can be noticed. The settled floccules passed through the screen into the filtrate and were not able to be retained.

TABLE 28

Results

| Sample | Dilution | Filtrate Turbidity (NTU) |
|---|---|---|
| Liquifloc 1%-Treated | 0 | 1,310 |

Xanthan and Chitosan

Figure 27:
FIG. 27 is a photograph of cohesive aggregates retained on a 1 mm sieve.

A new bottle of dirt suspension was prepared (5.8 g of Bellevue dirt and 475 ml of DI) and vigorously shaken to suspend the dirt/sediment. 20 drops (20 ppm final) of a 1% xanthan gum solution was added to the solution and the container was vigorously shaken. This was followed by the addition of then 10 drops (10 ppm) of Liquifloc 1% (chitosan acetate) was added and the container was again vigorously shaken. Immediately, large fibrillar cohesive aggregates were formed that rapidly settled to the bottom of the plastic bottle. The contents of the solution was then poured through a kitchen sieve (1 mm pore opening) and the turbidity determined on the filtrate. See FIG. 27. As can be seen in the FIG. 27, a large fibrillar cohesive mass of aggregate was collected on the screen which was not observed when only Liquifloc 1% was used as in the previous experiment. The turbidity of the filtrate was significantly improved compared to when only Liquifloc 1% was used. This is attributed to the more effective removal of suspended sediment when it is formed into a fibrillar cohesive aggregated mass that is then capable of being retained on a coarse 1 mm open mesh sieve. Judging from the size of the aggregate, it is likely a significant portion could be retained on a larger size open pore sieve.

TABLE 29

Results

| Sample | Dilution | Turbidity (NTU) |
|---|---|---|
| Xanthan/Chitosan | 0 | 120 |

This experiment demonstrates the difference between flocculation and fibrillar cohesive aggregation.

While illustrative embodiments and examples have been illustrated and described, it will be appreciated that various changes can be made therein without departing from the spirit and scope of the invention.

The invention claimed is:

1. A method for removing a substance from aqueous media, comprising:
    combining an aqueous solution of xanthan gum, and a 1% aqueous solution of chitosan containing 1% acetic acid, in an aqueous media comprising a substance,
        wherein the chitosan has a degree of deacteylation from 70% to 90% and a molecular weight in the range from 20,000 Daltons to 2 million Daltons,
    in respective amounts sufficient to form cohesive fibrillar aggregates having a length greater than 0.65 mm in the aqueous media, and
    forming said fibrillar aggregates comprising said substance entrapped in the fibers, and
    separating said fibrillar aggregates from the aqueous media thereby removing the fiber-entrapped substance from the aqueous media.

2. The method of claim 1, wherein the separating step comprises a filtration step.

3. The method of claim 1, wherein the separating step comprises a settling step.

4. The method of claim 1, wherein the separating step comprises a centrifugation step.

5. The method of claim 1, wherein the aqueous solution of xanthan gum is added to the aqueous media before adding the acidified aqueous solution of chitosan to the aqueous media.

6. The method of claim 1, wherein the substance comprises dirt.

7. The method of claim 1, wherein the substance comprises mine tailings.

8. The method of claim 1, wherein the substance comprises algae.

9. The method of claim 1, wherein the substance comprises bilge water.

10. The method of claim 1, wherein the substance comprises a material selected from the group consisting of fat, oil, and grease.

11. The method of claim 1, wherein the substance comprises a material selected from the group consisting of a virus and a bacterium.

12. The method of claim 1, wherein the amount of xanthan gum by weight is equal to or greater than the amount of chitosan by weight.

13. The method of claim 1, wherein fibers comprising the fibrillar aggregates have a length to width ratio from 113:1 to 8:1.

14. A method for removing a substance from aqueous media, comprising:
    treating aqueous media containing said substance with an aqueous cationic polymer solution comprising 1% glacial acetic acid and 1% chitosan, by weight;

treating the aqueous media with an anionic polymer solution consisting essentially of an aqueous solution of xanthan;

combining the anionic polymer solution and cationic polymer solution in the aqueous media in amounts to form cohesive, rock-like fibrillar aggregates having a length greater than 0.65 mm comprising polymer fibers in the aqueous media, wherein the substance is entrapped by the fibers; and separating said fibrillar aggregates from the aqueous media to remove a majority of the substance from the aqueous media.

15. The method of claim 14, wherein the anionic solution comprises an aqueous solution comprising 1% xanthan, by weight.

* * * * *